US012464435B2

(12) United States Patent
Griot et al.

(10) Patent No.: US 12,464,435 B2
(45) Date of Patent: Nov. 4, 2025

(54) DISCOVERY IN A SERVICE-BASED WIRELESS SYSTEM

(71) Applicant: QUALCOMM Incorporated, San Diego, CA (US)

(72) Inventors: Miguel Griot, La Jolla, CA (US); Aziz Gholmieh, Del Mar, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 17/948,051

(22) Filed: Sep. 19, 2022

(65) Prior Publication Data
US 2024/0098625 A1  Mar. 21, 2024

(51) Int. Cl.
*H04W 48/12* (2009.01)
*H04W 40/24* (2009.01)
*H04W 84/04* (2009.01)

(52) U.S. Cl.
CPC ......... *H04W 48/12* (2013.01); *H04W 40/246* (2013.01); *H04W 84/047* (2013.01)

(58) Field of Classification Search
CPC ... H04W 48/12; H04W 48/16; H04W 40/246; H04W 84/047; H04W 8/00; H04W 76/25;
(Continued)

(56) References Cited

U.S. PATENT DOCUMENTS 8,682,786 B2 * 3/2014 Li ................ G06Q 20/12
705/40
10,159,082 B1 * 12/2018 Park ................ H04W 76/11
(Continued)

FOREIGN PATENT DOCUMENTS

WO  WO-2020014214 A1   1/2020
WO  WO-2022256754 A2  12/2022

OTHER PUBLICATIONS

International Search Report and Written Opinion—PCT/US2023/073937—ISA/EPO—Dec. 14, 2023.
(Continued)

*Primary Examiner* — David Q Nguyen
(74) *Attorney, Agent, or Firm* — Holland & Hart LLP

(57) ABSTRACT

Methods, systems, and devices for wireless communications are described. Described techniques relate to signaling between user equipments (UEs), distributed units, and a discovery service of a service-based network that provides service information about other core network services of the service-based network. The service information may enable the UE to establish and maintain connections with the various core network services offered by the service-based network. A UE may indicate requested capabilities for the core network services, and the discovery service may return service information indicating core network services that match the requested capabilities. The UE may request information regarding specific core network services in the discovery request, and the discovery service may return information regarding the specific core network services. For example, the service information may include dependency information between core network services, service capabilities, or a network location associated with the core network services.

30 Claims, 28 Drawing Sheets

(58) Field of Classification Search
CPC .......... H04W 8/24; H04W 8/28; H04W 4/50; H04W 84/042; H04W 76/10; H04W 4/70; H04L 67/51
USPC ........................................ 370/328, 329, 330
See application file for complete search history.

(56) References Cited

U.S. PATENT DOCUMENTS

| | | | |
|---|---|---|---|
| 2014/0086177 A1* | 3/2014 | Adjakple | H04W 74/04 370/329 |
| 2017/0078140 A1* | 3/2017 | Gibson | H04L 41/0886 |
| 2019/0053216 A1* | 2/2019 | Park | H04W 76/11 |
| 2020/0107322 A1* | 4/2020 | Lunttila | H04W 72/0453 |

OTHER PUBLICATIONS

Li N., et al., "Micro-Service-Based Radio Access Network", China Communications, China Institute of Communications, Piscataway, NJ, USA, vol. 19, No. 3, Mar. 30, 2022, pp. 1-15, XP011904427, p. 2.

* cited by examiner

DISCOVERY IN A SERVICE-BASED WIRELESS SYSTEM

FIELD OF TECHNOLOGY

The following relates to wireless communications, including discovery in a service-based wireless system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, fifth generation (5G) systems which may be referred to as New Radio (NR) systems, and sixth generation (6G) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a radio access network (RAN) that supports wireless communication for communication devices, which may be known as user equipment (UE).

SUMMARY

The described techniques relate to improved methods, systems, devices, and apparatuses that support discovery in a service-based wireless system. For example, the described techniques provide for signaling and other mechanisms enabling a user equipment (UE) to establish wireless connections in a service-based network (e.g., a 6G network). Described techniques relate to signaling between UEs, distributed units (DUs), and a discovery service of a service-based network that provides service information about other core network services of the service-based network. The service information may enable the UE to establish and maintain connections with the various core network services offered by the service-based network. In some cases, a UE may indicate requested capabilities for the core network services, and the discovery service may return service information indicating core network services that match the requested capabilities. In some cases, the UE may request information regarding specific core network services in the discovery request, and the discovery service may return information regarding the specific core network services. For example, the service information may include dependency information between core network services, service capabilities, or a network location associated with the core network services.

A method for wireless communication at a user equipment (UE) is described. The method may include receiving, from a DU, control information indicating routing information associated with a core network discovery service for a set of core network services offered by a service-based network configured to interface with a radio access network (RAN) associated with the DU, transmitting, to the DU and in response to the control information, a discovery request including the routing information, and receiving, from the DU and in response to the discovery request, service information associated with the set of core network services.

An apparatus for wireless communication at a UE is described. The apparatus may include a processor, memory coupled with the processor, and instructions stored in the memory. The instructions may be executable by the processor to cause the apparatus to receive, from a DU, control information indicating routing information associated with a core network discovery service for a set of core network services offered by a service-based network configured to interface with a RAN associated with the DU, transmit, to the DU and in response to the control information, a discovery request including the routing information, and receive, from the DU and in response to the discovery request, service information associated with the set of core network services.

Another apparatus for wireless communication at a UE is described. The apparatus may include means for receiving, from a DU, control information indicating routing information associated with a core network discovery service for a set of core network services offered by a service-based network configured to interface with a RAN associated with the DU, means for transmitting, to the DU and in response to the control information, a discovery request including the routing information, and means for receiving, from the DU and in response to the discovery request, service information associated with the set of core network services.

A non-transitory computer-readable medium storing code for wireless communication at a UE is described. The code may include instructions executable by a processor to receive, from a DU, control information indicating routing information associated with a core network discovery service for a set of core network services offered by a service-based network configured to interface with a RAN associated with the DU, transmit, to the DU and in response to the control information, a discovery request including the routing information, and receive, from the DU and in response to the discovery request, service information associated with the set of core network services.

Some examples of the method, apparatuses, and non-transitory computer-readable medium described herein may further include operations, features, means, or instructions for transmitting, to the DU and in response to the service information indicating the set of core network services, a service request indicating a core network service of the set of core network services, receiving, from the DU and in response to the service request, second control information indicating a service context for communicating with the core network service, and communicating, via the DU in accordance with the service context, a message with the core network service.

In some examples of the method, apparatuses, and non-transitory computer-readable medium described herein, the service information includes an indication of a dependency of the core network service on a second core network service and the method, apparatuses, and non-transitory computer-readable medium may include further operations, features, means, or instructions for transmitting, to the DU and based on the dependency, a second service request indicating the second core network service of the set of core network services, receiving, from the DU and in response to the second service request, third control information indicating a second service context for communicating with the second core network service, and communicating, via the DU and in accordance with the second service context, a second message with the second core network service, where communicating the message may be based on communicating the second message.

In some examples of the method, apparatuses, and non-transitory computer-readable medium described herein, transmitting the discovery request may include operations, features, means, or instructions for transmitting an indication of one or more requested service capabilities, where the service information includes a list of a subset of core network services of the set of core network services associated with the one or more requested service capabilities.

Some examples of the method, apparatuses, and non-transitory computer-readable medium described herein may further include operations, features, means, or instructions for transmitting, to the DU and in response to the service information, a service request indicating a selected core network service of the subset of core network services, receiving, from the DU in response to the service request, second control information indicating a service context for communicating with the selected core network service, and communicating, via the DU in accordance with the service context, a message with the selected core network service.

In some examples of the method, apparatuses, and non-transitory computer-readable medium described herein, transmitting the discovery request may include operations, features, means, or instructions for transmitting an indication of a subset of core network services of the set of core network services, where the service information includes, for each of the subset of core network services, one or more of core network service dependency information, a service capability, a network address, or a network location.

In some examples of the method, apparatuses, and non-transitory computer-readable medium described herein, receiving the service information may include operations, features, means, or instructions for receiving an indication of one or more of core network service dependency information, a service capability, or a network location associated with one or more of core network services of the set of core network services.

In some examples of the method, apparatuses, and non-transitory computer-readable medium described herein, the routing information may be associated with a proxy service that may be configured to route the discovery request to the core network discovery service.

In some examples of the method, apparatuses, and non-transitory computer-readable medium described herein, receiving the control information may include operations, features, means, or instructions for receiving a system information block message including the control information.

In some examples of the method, apparatuses, and non-transitory computer-readable medium described herein, the discovery request may be transmitted to the DU for relay to a network address associated with the core network discovery service, the network address based on the routing information.

In some examples of the method, apparatuses, and non-transitory computer-readable medium described herein, each core network service of the set of core network services may be associated with a respective application programming interface of a set of multiple application programming interfaces.

A method for wireless communications at a DU is described. The method may include transmitting, to a UE, control information indicating routing information associated with a core network discovery service for a set of core network services offered by a service-based network configured to interface with a RAN associated with the DU, communicating, to the core network discovery service, a discovery request including routing information received from the UE, and communicating, to the UE, service information received from the core network discovery service in response to the discovery request, the service information associated with the set of core network services.

An apparatus for wireless communications at a DU is described. The apparatus may include a processor, memory coupled with the processor, and instructions stored in the memory. The instructions may be executable by the processor to cause the apparatus to transmit, to a UE, control information indicating routing information associated with a core network discovery service for a set of core network services offered by a service-based network configured to interface with a RAN associated with the DU, communicate, to the core network discovery service, a discovery request including routing information received from the UE, and communicate, to the UE, service information received from the core network discovery service in response to the discovery request, the service information associated with the set of core network services.

Another apparatus for wireless communications at a DU is described. The apparatus may include means for transmitting, to a UE, control information indicating routing information associated with a core network discovery service for a set of core network services offered by a service-based network configured to interface with a RAN associated with the DU, means for communicating, to the core network discovery service, a discovery request including routing information received from the UE, and means for communicating, to the UE, service information received from the core network discovery service in response to the discovery request, the service information associated with the set of core network services.

A non-transitory computer-readable medium storing code for wireless communications at a DU is described. The code may include instructions executable by a processor to transmit, to a UE, control information indicating routing information associated with a core network discovery service for a set of core network services offered by a service-based network configured to interface with a RAN associated with the DU, communicate, to the core network discovery service, a discovery request including routing information received from the UE, and communicate, to the UE, service information received from the core network discovery service in response to the discovery request, the service information associated with the set of core network services.

Some examples of the method, apparatuses, and non-transitory computer-readable medium described herein may further include operations, features, means, or instructions for receiving, from the UE and in response to the service information indicating the set of core network services, a service request indicating a core network service of the set of core network services, transmitting, to the UE and in response to the service request, second control information indicating a service context for communications between the UE and the core network service, and communicating, to the core network service, a message received from the UE in accordance with the service context.

Some examples of the method, apparatuses, and non-transitory computer-readable medium described herein may further include operations, features, means, or instructions for receiving, from the UE and in response to the service information, a second service request indicating a second core network service of the set of core network services, where the service information includes an indication of a dependency of the core network service on the second core network service, transmitting, to the UE and in response to the second service request, third control information indicating a second service context for communications between the UE and the second core network service, and communicating, to the second core network service, a second message received from the UE in accordance with the second service context, where communicating the message may be based on communicating the second message.

In some examples of the method, apparatuses, and non-transitory computer-readable medium described herein, communicating the discovery request may include operations, features, means, or instructions for receiving, from the UE, an indication of one or more requested service capabilities, where the service information includes a list of a subset of core network services of the set of core network services associated with the one or more requested service capabilities.

Some examples of the method, apparatuses, and non-transitory computer-readable medium described herein may further include operations, features, means, or instructions for receiving, from the UE and in response to the service information, a service request indicating a selected core network service of the subset of core network services, transmitting, to the UE in response to the service request, second control information indicating a service context for communications between the UE and the selected core network service, and communicating, to the selected core network service, a message received from the UE in accordance with the service context.

In some examples of the method, apparatuses, and non-transitory computer-readable medium described herein, communicating the discovery request may include operations, features, means, or instructions for receiving, from the UE, an indication of a subset of core network services of the set of core network services, where the service information includes, for each of the subset of core network services, one or more of core network service dependency information, a service capability, a network address, or a network location.

In some examples of the method, apparatuses, and non-transitory computer-readable medium described herein, communicating the service information may include operations, features, means, or instructions for transmitting, to the UE, an indication of one or more of core network service dependency information, a service capability, or a network location associated with one or more of core network services of the set of core network services.

In some examples of the method, apparatuses, and non-transitory computer-readable medium described herein, the routing information may be associated with a proxy service that may be configured to route the discovery request to the core network discovery service and to route the service information from the core network discovery service to the UE via the DU, and communicating the discovery request to the core network discovery service includes transmitting the discovery request to the proxy service, and communicating the service information includes receiving the service information via the proxy service.

In some examples of the method, apparatuses, and non-transitory computer-readable medium described herein, transmitting the control information may include operations, features, means, or instructions for transmitting a system information block message including the control information.

In some examples of the method, apparatuses, and non-transitory computer-readable medium described herein, each core network service of the set of core network services may be associated with a respective application programming interface of a set of multiple application programming interfaces.

A method for wireless communications at a core network discovery service is described. The method may include receiving, from a UE via a DU, a discovery request including routing information associated with the core network discovery service, the core network discovery service for a set of core network services offered by a service-based network configured to interface with a RAN associated with the DU and transmitting, to the DU for relay to the UE and in response to the discovery request, service information associated with the set of core network services.

An apparatus for wireless communications at a core network discovery service is described. The apparatus may include a processor, memory coupled with the processor, and instructions stored in the memory. The instructions may be executable by the processor to cause the apparatus to receive, from a UE via a DU, a discovery request including routing information associated with the core network discovery service, the core network discovery service for a set of core network services offered by a service-based network configured to interface with a RAN associated with the DU and transmit, to the DU for relay to the UE and in response to the discovery request, service information associated with the set of core network services.

Another apparatus for wireless communications at a core network discovery service is described. The apparatus may include means for receiving, from a UE via a DU, a discovery request including routing information associated with the core network discovery service, the core network discovery service for a set of core network services offered by a service-based network configured to interface with a RAN associated with the DU and means for transmitting, to the DU for relay to the UE and in response to the discovery request, service information associated with the set of core network services.

A non-transitory computer-readable medium storing code for wireless communications at a core network discovery service is described. The code may include instructions executable by a processor to receive, from a UE via a DU, a discovery request including routing information associated with the core network discovery service, the core network discovery service for a set of core network services offered by a service-based network configured to interface with a RAN associated with the DU and transmit, to the DU for relay to the UE and in response to the discovery request, service information associated with the set of core network services.

In some examples of the method, apparatuses, and non-transitory computer-readable medium described herein, receiving the discovery request may include operations, features, means, or instructions for receiving an indication of one or more requested service capabilities, where the service information includes a list of a subset of core network services of the set of core network services associated with the one or more requested service capabilities.

In some examples of the method, apparatuses, and non-transitory computer-readable medium described herein, receiving the discovery request may include operations, features, means, or instructions for receiving an indication of a subset of core network services of the set of core network services, where the service information includes, for each of the subset of core network services, one or more of core network service dependency information, a service capability, a network address, or a network location.

In some examples of the method, apparatuses, and non-transitory computer-readable medium described herein, transmitting the service information may include operations, features, means, or instructions for transmitting an indication of one or more of core network service dependency information, a service capability, or a network location associated with one or more of core network services of the set of core network services.

In some examples of the method, apparatuses, and non-transitory computer-readable medium described herein, the routing information may be associated with a proxy service that may be configured to route the discovery request to the core network discovery service and to route the service information to the UE via the DU, receiving the discovery request includes receiving the discovery request from the DU via the proxy service, and transmitting the service information to the DU includes transmitting the service information via the proxy service.

A method for wireless communications at a proxy service is described. The method may include receiving, from a UE via a DU, a discovery request including routing information associated with the proxy service, transmitting the discovery request to a core network discovery service associated with a set of core network services offered by a service-based network configured to interface with a RAN associated with the DU, receiving, from the core network discovery service and in response to the discovery request, service information associated with the set of core network services, and transmitting the service information to the DU for relay to the UE.

An apparatus for wireless communications at a proxy service is described. The apparatus may include a processor, memory coupled with the processor, and instructions stored in the memory. The instructions may be executable by the processor to cause the apparatus to receive, from a UE via a DU, a discovery request including routing information associated with the proxy service, transmit the discovery request to a core network discovery service associated with a set of core network services offered by a service-based network configured to interface with a RAN associated with the DU, receive, from the core network discovery service and in response to the discovery request, service information associated with the set of core network services, and transmit the service information to the DU for relay to the UE.

Another apparatus for wireless communications at a proxy service is described. The apparatus may include means for receiving, from a UE via a DU, a discovery request including routing information associated with the proxy service, means for transmitting the discovery request to a core network discovery service associated with a set of core network services offered by a service-based network configured to interface with a RAN associated with the DU, means for receiving, from the core network discovery service and in response to the discovery request, service information associated with the set of core network services, and means for transmitting the service information to the DU for relay to the UE.

A non-transitory computer-readable medium storing code for wireless communications at a proxy service is described. The code may include instructions executable by a processor to receive, from a UE via a DU, a discovery request including routing information associated with the proxy service, transmit the discovery request to a core network discovery service associated with a set of core network services offered by a service-based network configured to interface with a RAN associated with the DU, receive, from the core network discovery service and in response to the discovery request, service information associated with the set of core network services, and transmit the service information to the DU for relay to the UE.

In some examples of the method, apparatuses, and non-transitory computer-readable medium described herein, receiving the discovery request may include operations, features, means, or instructions for receiving an indication of one or more requested service capabilities, where the service information includes a list of a subset of core network services of the set of core network services associated with the one or more requested service capabilities.

In some examples of the method, apparatuses, and non-transitory computer-readable medium described herein, receiving the discovery request may include operations, features, means, or instructions for receiving an indication of a subset of core network services of the set of core network services, where the service information includes, for each of the subset of core network services, one or more of core network service dependency information, a service capability, a network address, or a network location.

In some examples of the method, apparatuses, and non-transitory computer-readable medium described herein, the service information includes one or more of core network service dependency information, a service capability, or a network location associated with one or more of core network services of the set of core network services.

DETAILED DESCRIPTION

Figure 1:
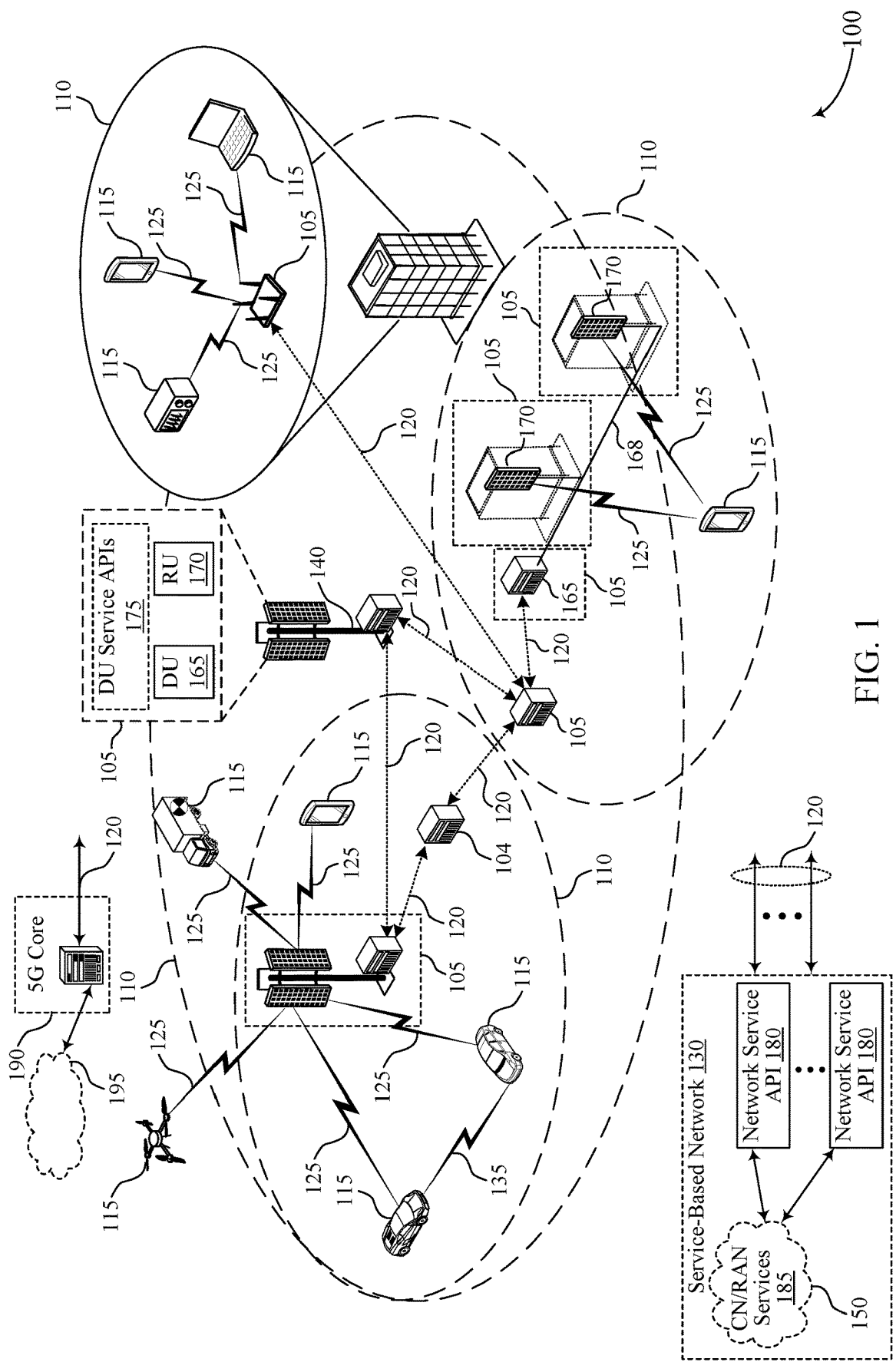
FIG. 1 illustrates an example of a wireless communications system that supports discovery in a service-based wireless system in accordance with one or more aspects of the present disclosure.

Some wireless systems may exhibit a relatively vertical, hierarchical architecture that includes many "layers" of different devices that perform functions for the system. For example, a wireless system may include user equipments (UEs), base stations/network entities, and numerous back-end (e.g., core network) devices associated with one or more functions for the system. Such a hierarchical structure may result in processing and other functions being performed at multiple devices (e.g., duplicative processing or capabilities across multiple back-end devices), thereby leading to wasted resources and excess power consumption. Additionally, the back-end architecture of some wireless systems may be owned and maintained by a small handful of operators, which may make it difficult for other parties/entities to integrate with the systems and may complicate the ability of the systems to offer customized services and functionality to wireless devices.

Comparatively, some wireless systems, such as Sixth Generation (6G) systems, may exhibit a flatter, service-based architecture in which a radio access network (RAN) (e.g., network entities) interfaces with a service-based network in order to connect UEs to core network services maintained at various network addresses within the service-based network. In the context of a service-based system, operations and functions that may otherwise be performed by a few centralized back-end components (e.g., in some systems) may be distributed across a number of core network services that may be hosted at different network addresses, such as in a cloud-based architecture. As a result, UEs in a service-based system may be able to establish and maintain connections with (e.g., "subscribe" to) different core network services or groups thereof on an a la carte basis, where each core network service offers or provides a respective network functionality or service. For example, a service-based system may include a mobility service, a security service, a privacy service, a location service, and the like. In this regard, each UE within a service-based system may be able to select to which core network services the UE will subscribe based on the individualized characteristics or needs of the respective UE.

Aspects of the present disclosure relate to signaling and other mechanisms enabling UEs to establish wireless connections in a service-based network. Described techniques relate to signaling between UEs, distributed units (DUs), and a discovery service of a service-based network that provides service information about other core network services of the service-based network. The service information may enable the UE to establish and maintain connections with the various core network services offered by the service-based network.

In some examples, a DU may transmit control information (e.g., via a system information block (SIB)) that indicates routing information for a discovery service associated with a service-based network. The UE may transmit a discovery request to the DU, and the DU may route the discovery request to the discovery service based on the routing information included with the discovery request. The routing information may include a network address for the discovery service or a proxy address associated with (e.g., for) a proxy that routes information between the DU and the discovery service (and/or other core network services). The DU may route the discovery request to the discovery service (e.g., directly or indirectly via a proxy service) based on the routing information associated with the discovery service, and the discovery service may return service information for core network services offered by the network. The DU may route the service information to the UE. In some cases, the discovery request may indicate requested capabilities for the core network services, and the discovery service may return service information indicating services that match the requested capabilities. In some cases, the UE may request information regarding specific core network services in the discovery request, and the discovery service may return information regarding the specific core network services. For example, the service information may include dependency information for the core network services, service capabilities, or a network location associated with the core network services.

Aspects of the disclosure are initially described in the context of wireless communications systems. Aspects of the disclosure are further illustrated by and described with reference to process flows apparatus diagrams, system diagrams, and flowcharts that relate to discovery in a service-based wireless system.

FIG. 1 illustrates an example of a wireless communications system 100 that supports discovery in a service-based wireless system in accordance with one or more aspects of the present disclosure. The wireless communications system 100 may include one or more network entities 105, one or more UEs 115, and a service-based network 130. In some examples, the wireless communications system 100 may implement aspects of a 6G network, a 5G network (e.g., a New Radio (NR) network), a 4G network (e.g., a Long Term Evolution (LTE) network, an LTE-Advanced (LTE-A) network, an LTE-A Pro network), or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a RAN node, access point, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the service-based network 130, or with one another, or both. For example, network entities 105 may communicate with the service-based network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a service-based network 130). In some examples, network entities 105 may communicate with one another via one or more communication links such as a fronthaul communication link 168 (e.g., between a radio unit 170 and a DU 165). The backhaul communication links 120 or fronthaul communication links 168, or other communication links between network entities 105, may be or include one or more wired links (e.g., an electrical link, an optical fiber link), one or more wireless links (e.g., a radio link, a wireless optical link), among other examples or various combinations thereof.

In some examples, network entities 105 may communicate with a service platform 150 (e.g., a cloud platform) that provides one or more core network services (CN services), one or more RAN services), or any combinations thereof (CN/RAN services 185). The CN/RAN services may be provided via the service-based network 130, using one or more application programming interfaces (APIs). For example, one or more DU service APIs 175 may provide an interface for one or more services at a UE 115. The services at the UE 115 may correspond to one or more CN/RAN services 185 at service platform 150. For example, network service APIs 180 at service-based network 130 may interface with corresponding DU service APIs 175 at a DU 165, which interface with corresponding APIs at a UE 115 to provide service connectivity between the one or more UE 115 services and corresponding CN/RAN services 185. In some cases, a common API framework may be defined for both CN/RAN services 185 and UEs 115. CN/RAN services 185 may be restricted to be available only to UEs 115 or only to other network services based on authorizations.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, a 6G NB, or other suitable terminology). In some examples, a network entity 105 (e.g., a base station 140) may be implemented in an aggregated (e.g., monolithic, standalone) base station architecture, which may be configured to utilize a service-based architecture and provide radio access within a single network entity 105 (e.g., a single RAN node, such as a base station 140, may include a RU 170, a DU 165, and DU APIs 175 for CN/RAN services 185). An RU 170 may also be referred to as a radio head, a smart radio head, a remote radio head (RRH), a remote radio unit (RRU), or a transmission reception point (TRP).

Additionally, in some examples, one or more network entities 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), a DU 165, RU 170, a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between components (e.g., CU, DU, and RU) is flexible and may support different functionalities depending on which functions (e.g., network layer functions, protocol layer functions, baseband functions, RF functions, and any combinations thereof) are performed at a component. For example, a functional split of a protocol stack may be employed between a CU and a DU 165 such that the CU may support one or more layers of the protocol stack and the DU 165 may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). In some examples, the CU may host one or more service APIs for one or more CN/RAN services 185 via corresponding network service APIs 180 of service-based network 130. The CU may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU and a DU 165, or between a DU 165 and an RU 170 may be within a protocol layer (e.g., some functions for a protocol layer may be performed by one of a CU, a DU 165, or an RU 170, while other functions of the protocol layer are performed by a different one of the CU, the DU 165, or the RU 170). A DU 165 may be connected to one or more RUs 170 via a fronthaul communication link 168 (e.g., open fronthaul (FH) interface). In some examples, a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a service-based network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for capability indication to multiple services in a service-based wireless system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs, RUs 170, RIC, SMO).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., 4G, 5G, 6G radio access technology). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In examples of the wireless communications system 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

In some deployments, multiple RANs may be accessed by one or more UEs 115 or network entities 105 such as, for example, a 6G RAT and a 5G RAT. In some examples, the 6G RAT may be associated with service-based network 130 and the 5G RAT may be associated with a 5G Core 190. The 5G core 190 may provide user authentication, access authorization, tracking, Internet Protocol (IP) connectivity, and other access, routing, or mobility functions. The 5G core 190 may be an evolved packet core (EPC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the 5G core 190. User IP packets may be transferred through the user plane entity, which may provide IP address allocation as well as other functions. The user plane entity may be connected to IP services 195 for one or more network operators. The IP services 195 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may include a packet-based network that operates using a cloud platform, such as service platform 150, that provides CN/RAN services 185. The CN/RAN services 185, in some examples, may be hosted based on a deployment topology and capabilities for service parameters associated with each service. Providing CN/RAN services 185 allows for separation of particular services (e.g., mobility, connection state management, security, paging, radio access services, quality of service (QoS) configuration and data services, UE capability management, location, messaging, among others) from transport functions (e.g., data radio bearer (DRB) and logical channel (LC) management, data service configuration, among others). Service-based functions (e.g., a message broker decouple radio network procedures from network delivery mechanisms) may allow for flexibility of some functions (e.g., layer 2 (L2) functions) to be hosted anywhere in the cloud, and may enable enhanced scalability, resiliency, elasticity, agility, reuse, visibility, automation, failover, or any combinations thereof (e.g., each service across RAN and core network may scale independently by increasing or decreasing resources allocated across functions independently). Further, efficiency may be enhanced through providing real-time link management to the RAN edge and by allowing for adaptation at the DU 165 for more efficient activation, deactivation, or selection of features based on UE conditions.

Figure 2:
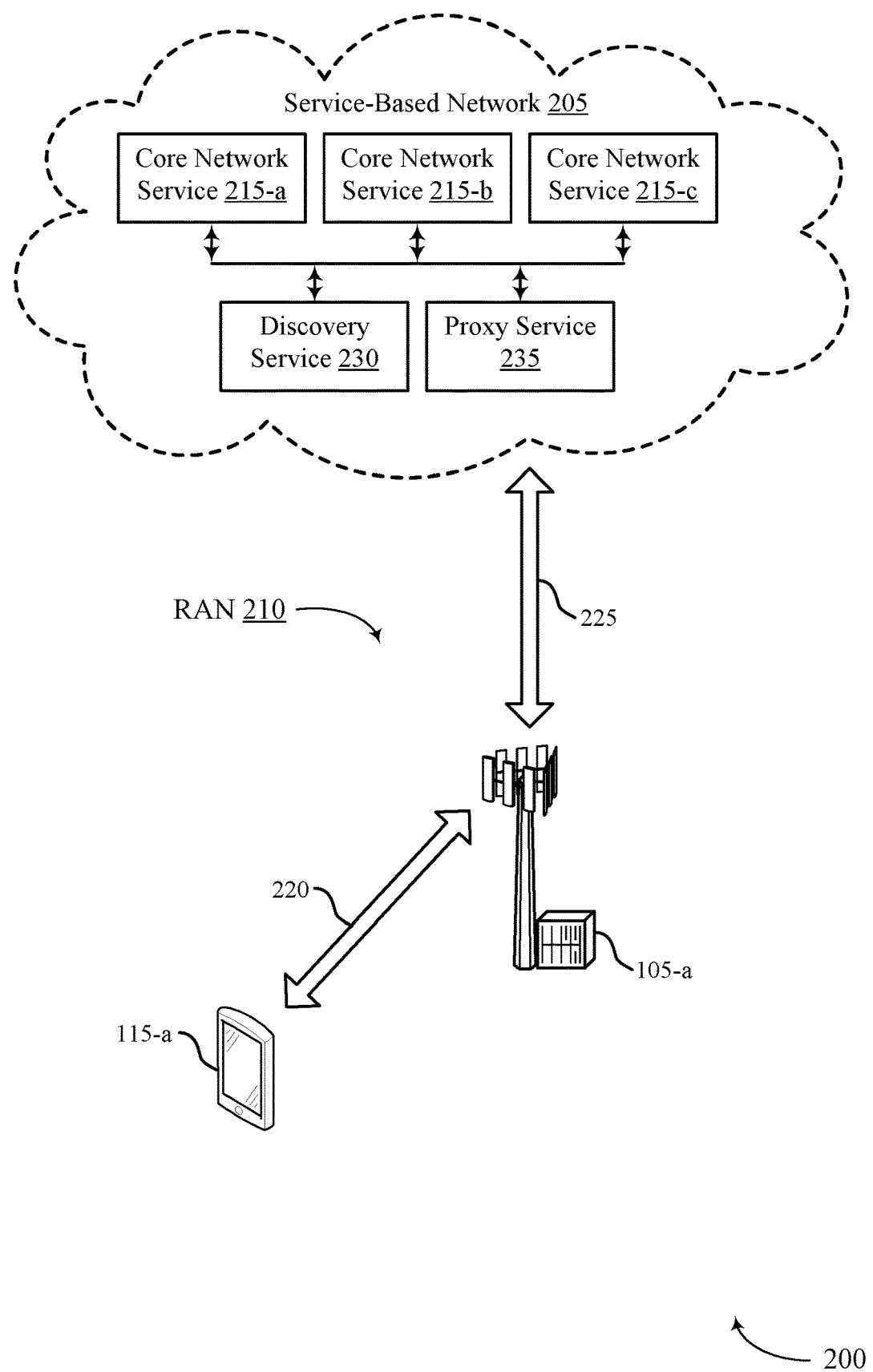
FIG. 2 illustrates an example of a wireless communications system that supports discovery in a service-based wireless system in accordance with one or more aspects of the present disclosure.

FIG. 2 illustrates an example of a wireless communications system 200 that supports discovery in a service-based wireless system in accordance with one or more aspects of the present disclosure. Aspects of the wireless communications system 200 may implement, or be implemented by, aspects of the wireless communications system 100. In some implementations, the wireless communications system 200 illustrates an example architecture of a service-based wireless communications system, such as the system described with reference to FIG. 1.

The wireless communications system 200 may include one or more UEs 115 (e.g., UE 115-a), one or more network entities (e.g., network entity 105-a), and a service-based network 205. In some aspects, the service-based network 205 may be configured to communicate or interface with a RAN 210 of the wireless communications system 200, where the RAN 210 includes the one or more network entities (e.g., network entity 105-a). The service-based network 205 may support or offer a set of core network services 215 (e.g., a first core network service 215-a, a second core network service 215-b, and a third core network service 215-c). In some implementations, the service-based network 205 may include or be associated with a cloud platform, where the respective core network services 215 are hosted at respective network addressees in the cloud platform.

The UE 115-*a* may communicate with the network entity 105-*a* using one or more communication links 220, which may include an example of an access link (e.g., a Uu link). The communication link 220 may include a bi-directional link that can include both uplink and downlink communication. Similarly, the network entity 105-*a* of the RAN 210 may be configured to communicate with (e.g., interface with) the service-based network 205 via one or more communication links (e.g., communication link 225), where the communication link 225 may be configured to facilitate bi-directional communications between the network entity 105-*a* and each of the respective core network services 215 of the service-based network 205.

As shown in FIG. 2, the wireless communications system 200 may exhibit a service-based architecture where the entities of the RAN 210 (e.g., network entity 105-*a*) are configured to connect the UE 115-*a* to core network services 215 of the service-based network 205. In particular, the RAN 210 (e.g., network entity 105-*a*) may be configured to relay communications between the UE 115-*a* and the various core network services 215 of the service-based network 205 to enable the UE 115-*a* to establish and maintain wireless connections with the respective core network services 215 in order to exchange communications associated with the various network functionalities that are supported by the respective core network services 215. In other words, the wireless communications system 200 may enable the UE 115-*a* to "subscribe" to the respective core network services 215 on an ala carte basis depending on the needs or requirements of the UE 115-*a*. In this regard, different UEs 115 within the wireless communications system 200 may be able to subscribe to different subsets of core network services 215 depending on the capabilities of the UEs 115, applications executed at the UEs 115, a mobility of the UEs 115, etc.

Each core network service 215 may be associated with a respective network address within the service-based network 205. Stated differently, each core network service 215 may be hosted at one or more components of a cloud-based network, where the components of each core network service 215 may be associated with a respective network address. The respective core network services 215 may be provided by network providers, third-party entities, etc., where each core network service 215 is configured to support a respective service or functionality offered to the components of the wireless communications system 200 (e.g., UE 115-*a*, network entity 105-*a*).

Different services, functionalities, and core network functions that may be supported or offered by the respective core network services 215 may include, but are not limited to, a mobility service, a security service, a privacy service, a location service, etc. For example, the first core network service 215-*a* may include a core network mobility service that that hosts information and provides signaling that facilitate the geographical movement of the UE 115-*a* throughout wireless communications system. By way of another example, the second core network service 215-*b* may include a security service that provides security and encryption services to subscribing UEs 115 within the wireless communications system 200.

The service-based network 205 may provide subscription and policy services (e.g., one core network service 215 may be a subscription service and another one core network service 215 may be a policy service). Subscription and/or policy services may be offered for other core network services to receive relevant information (e.g., network subscription or operator policy information) pertaining to a given UE (e.g., the UE 115-*a*). If the UE 115-*a* is authorized, the subscription and/or policy services may provide network subscription or policy information to the UE 115-*a*, or the UE 115-*a* may request to create or modify network subscription or policy information.

In some aspects, each core network service 215 may include a respective API configured to facilitate wireless communications with the network entity 105-*a* and the UE 115-*a*, such as the network service APIs 180 illustrated in FIG. 1. APIs at the respective core network services 215 may include routing APIs, configuration APIs, or both. Routing APIs may be configured for service data unit communications between the UE 115-*a* and the respective core network services 215. Comparatively, configuration APIs may be configured to facilitate communications between the network entity 105-*a* and the respective core network services 215 to negotiate service requirements and service-specific operation.

In some aspects, the network entity 105-*a* (e.g., a DU 165) may facilitate traffic routing (e.g., service data unit routing) from the UE 115-*a* to the core network services 215, and vice versa. The network entity 105-*a* may facilitate traffic routing between the respective devices directly, via other network entities 105-*a*, via proxy, or any combination thereof. Moreover, in some cases, the UE 115-*a* may be communicatively coupled to multiple network entities 105 (e.g., dual connectivity), where the multiple network entities 105 facilitate traffic routing with the same or different sets of core network services 215. Additionally, the network entity 105-*a* may support service configurations or service contexts associated with communications parameters within the system, such as QoS flows, security, and UE 115 service contexts. In some aspects, the communication link 220 between the network entity 105-*a* and the UE 115-*a* may be associated with an AS configuration that facilitates over-the-air service awareness. The AS configuration may include including logical channels, AS security, AS context, and the like. For example, the AS configuration may be associated with a service-specific configuration (e.g., logical channels corresponding to QoS flows for each respective core network service 215) and a service-agnostic configuration (e.g., parameters which are common to all core network services 215).

The service-based wireless communications system 200 illustrated in FIG. 2 may exhibit several differences and advantages as compared to some other types of wireless systems, such as networks that instead exhibit a relatively more vertical, hierarchical architecture that includes many "layers" of different devices that perform functions for the network. A more hierarchical structure may result in processing and other functions being performed at multiple devices (e.g., network entity 105 and one or more back-end devices), thereby leading to inefficient use of resources and excessive power consumption. Additionally, the back-end architecture of a network with a more vertical, hierarchical architecture may be owned and maintained by a small handful of operators, which may render it difficult for other parties/entities to integrate with such systems, and services offered to UEs 115 and other devices may be difficult to customize within such systems.

Comparatively, service-based wireless communications system 200 illustrated in FIG. 2 exhibits a flatter, horizontal architecture which enables the respective functions of wireless communications systems to be distributed across different components (e.g., core network services 215) of the system. For example, such functions and protocols may be divided up and distributed across the set of core network services 215 such that each core network service 215 may support or enable a small portion of the capabilities and functionality of conventional wireless communications systems. In other words, the service-based architecture may enable functions and protocols to be split into self-contained services (e.g., core network services 215) as compared to components that provide all-encompassing network functions and protocols (e.g., modularization of network services/functionality across multiple core network services 215).

In this regard, the wireless communications system 200 may illustrate an example of a cloud-native platform configured to host a merger of CN and RAN services, which may simplify protocols and reduce a duplication of processing operations across CN and RAN (e.g., redistribution of CN and RAN 210 services). In other words, the convergence of RAN 210 and CN functions may reduce repeated operations and functionality to serve one UE at different layers.

The wireless communications system 200 may extend benefits associated with the service-based architecture of the service-based network 205 to the RAN 210, including benefits of increased scalability, resiliency, elasticity, agility, reuse, visibility, automation, and failover. Additionally, the service-based architecture may enable each core network service 215 across RAN 210 and CN to scale independently by increasing or decreasing resources allocated across the respective core network services 215 independently.

The core network services 215 and the UE 115-a may share a common discovery framework for discovery of core network services 215 offered by the service-based network 205. Discovery of and access to the core network services 215 may be independent. The UE 115-a may discovery or access core network services directly (e.g., using a respective network address associated with a given core network service 215) or indirectly (e.g., via a proxy which routes communications to a given core network service).

For example, a discovery service 230 associated with the service-based network 205 may provide service information about other core network services 215 of the service-based network 205. The service information may enable the UE 115-a to establish and maintain connections with the various core network services 215 offered by the service-based network 205.

In some examples, the network entity 105-a may transmit control information (e.g., via an SIB) that indicates routing information for the discovery service 230. The UE 115-a may transmit a discovery request to the network entity 105-a, and the network entity 105-a may route the discovery request to the discovery service 230 based on the routing information included with the discovery request. The routing information may include a network address for the discovery service or a proxy address associated with (e.g., for) a proxy service 235 that routes information between the network entity 105-a and the discovery service 230 (and/or other core network services 215). The network entity 105-a may route the discovery request to the discovery service 230 (e.g., directly or indirectly via a proxy service 235) based on the routing information associated with the discovery service 230.

The discovery service 230 may return service information for core network services 215 offered by the service-based network. The network entity 105-a may route the service information to the UE 115-a. In some cases, the discovery request may indicate requested capabilities for the core network services 215, and the discovery service 230 may return service information indicating core network services 215 that match the requested capabilities. In some cases, the UE 115-a may request information regarding specific core network services 215 in the discovery request, and the discovery service 230 may return information regarding the specific core network services 215. For example, the service information may include dependency information for the core network services 215, service capabilities of the core network services 215, or a network location associated with the core network services 215.

Figure 3:
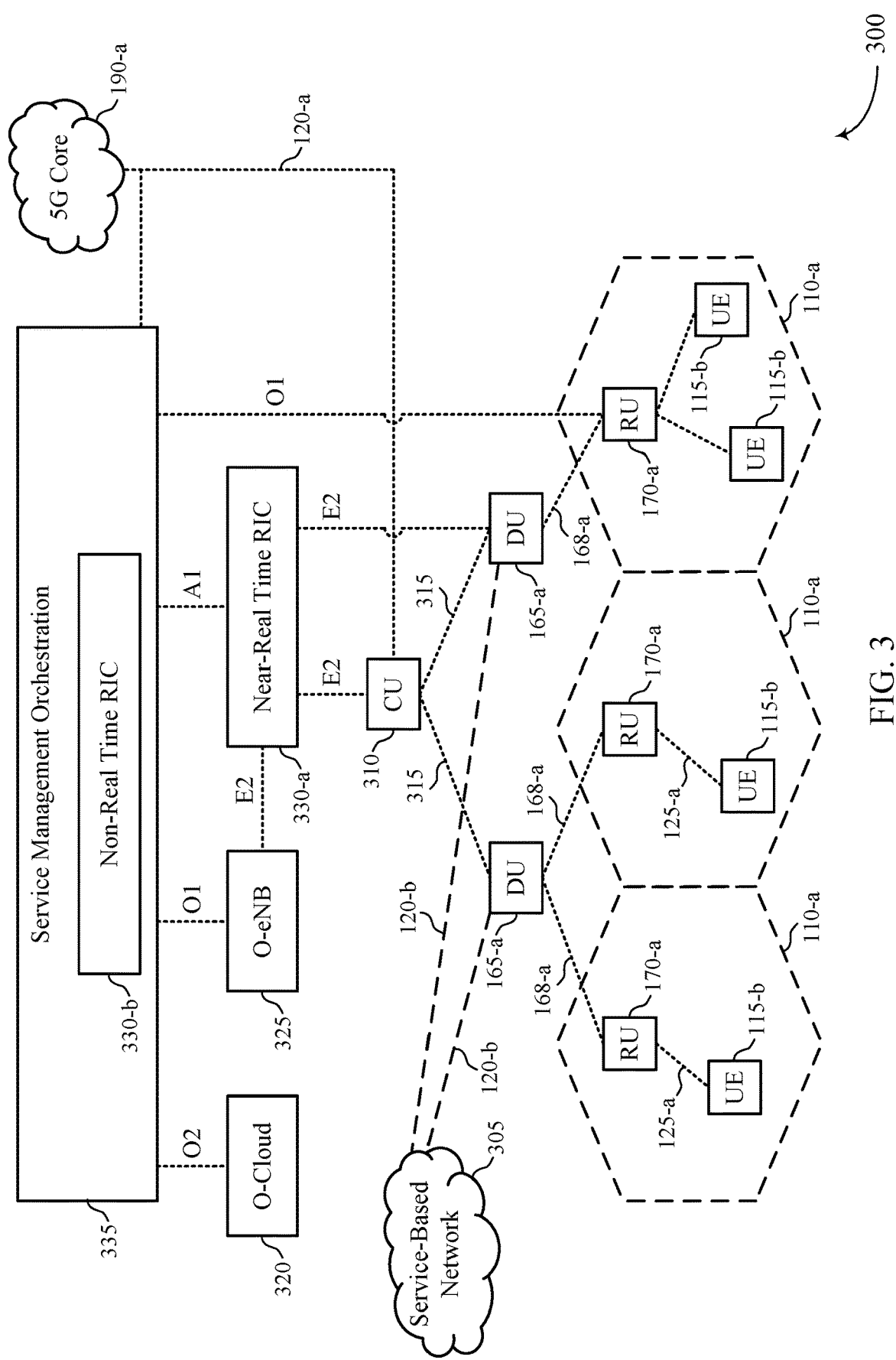
FIG. 3 illustrates an example of a network architecture that supports discovery in a service-based wireless system in accordance with one or more aspects of the present disclosure.

FIG. 3 illustrates an example of a network architecture 300 that supports discovery in a service-based wireless system in accordance with one or more aspects of the present disclosure. The network architecture 300 may illustrate an example for implementing one or more aspects of the wireless communications system 100. The network architecture 300 may include a service-based network 305, which may be an example of a service-based network 130 or 205, that communicates with DUs 165-a via links 120-b. In this example, DUs 165 may also communicate with one or more CUs 310 that may communicate directly with a 5G core 190-a via a backhaul communication link 120-a, or indirectly with the 5G core 190-a through one or more disaggregated network entities 105 (e.g., a Near-RT RIC 330-a via an E2 link, or a Non-RT RIC 330-b associated with an SMO 335 (e.g., an SMO Framework), or both). A CU 310 may communicate with one or more DUs 165-a via respective midhaul communication links 315 (e.g., an F1 interface). The DUs 165-a may communicate with one or more RUs 170-a via respective fronthaul communication links 168-a. The RUs 170-a may be associated with respective coverage areas 110-a and may communicate with UEs 115-b via one or more communication links 125-a. In some implementations, a UE 115-b may be simultaneously served by multiple RUs 170-a.

Each of the network entities 105 of the network architecture 300 (e.g., CUs 310, DUs 165-a, RUs 170-a, Non-RT RICs 330-a, Near-RT RICs 330-b, SMOs 335, Open Clouds (O-Clouds) 320, Open eNBs (O-eNBs) 325) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 310 may host one or more higher layer control functions. Such control functions may include RRC, PDCP, SDAP, or the like. Each control function may be implemented with an interface configured to communicate signals with other control functions hosted by the CU 310. A CU 310 may be configured to handle user plane functionality (e.g., CU-UP), control plane functionality (e.g., CU-CP), or a combination thereof. In some examples, a CU 310 may be logically split into one or more CU-UP units and one or more CU-CP units. A CU-UP unit may communicate bidirectionally with the CU-CP unit via an interface, such as an E1 interface when implemented in an O-RAN configuration. A CU 310 may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, when interfacing with service-based network 305, a DU 165-*a* may host one or more APIs for one or more services of the service-based network 305 and one or more corresponding services at one or more UEs 115-*b*. In some examples, when interfacing with CUs 310, a DU 165-*a* may host, at least partially, one or more of an RLC layer, a MAC layer, and one or more aspects of a PHY layer (e.g., a high PHY layer, such as modules for forward error correction (FEC) encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 310.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*b*. In some implementations, real-time and non-real-time aspects of control and user plane communication with the RU(s) 170-*a* may be controlled by the corresponding DU 165-*a*. In some examples, such a configuration may enable a DU 165-*a* and a CU 310 to be implemented in a cloud-based RAN architecture, such as a vRAN architecture.

The SMO 335 may be configured to support RAN deployment and provisioning of non-virtualized and virtualized network entities 105. For non-virtualized network entities 105, the SMO 335 may be configured to support the deployment of dedicated physical resources for RAN coverage requirements which may be managed via an operations and maintenance interface (e.g., an O1 interface). For virtualized network entities 105, the SMO 335 may be configured to interact with a cloud computing platform (e.g., an O-Cloud 320) to perform network entity life cycle management (e.g., to instantiate virtualized network entities 105) via a cloud computing platform interface (e.g., an O2 interface). Such virtualized network entities 105 can include, but are not limited to, CUs 310, DUs 165-*a*, RUs 170-*a*, and Near-RT RICs 330-*a*. In some implementations, the SMO 335 may communicate with components configured in accordance with a 4G RAN (e.g., via an O1 interface). Additionally, or alternatively, in some implementations, the SMO 335 may communicate directly with one or more RUs 170-*a* via an O1 interface. The SMO 335 also may include a Non-RT RIC 330-*b* configured to support functionality of the SMO 335.

The Non-RT RIC 330-*b* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 330-*a*. The Non-RT RIC 330-*b* may be coupled to or communicate with (e.g., via an A1 interface) the Near-RT RIC 330-*a*. The Near-RT RIC 330-*a* may be configured to include a logical function that enables near-real-time control and optimization of RAN elements and resources via data collection and actions over an interface (e.g., via an E2 interface) connecting one or more CUs 310, one or more DUs 165-*a*, or both, as well as an O-eNB 325, with the Near-RT RIC 330-*a*.

In some examples, to generate AI/ML models to be deployed in the Near-RT RIC 330-*b*, the Non-RT RIC 330-*b* may receive parameters or external enrichment information from external servers. Such information may be utilized by the Near-RT RIC 330-*a* and may be received at the SMO 335 or the Non-RT RIC 330-*b* from non-network data sources or from network functions. In some examples, the Non-RT RIC 330-*b* or the Near-RT RIC 330-*a* may be configured to tune RAN behavior or performance. For example, the Non-RT RIC 330-*b* may monitor long-term trends and patterns for performance and employ AI or ML models to perform corrective actions through the SMO 335 (e.g., reconfiguration via O1) or via generation of RAN management policies (e.g., A1 policies).

Figure 4:
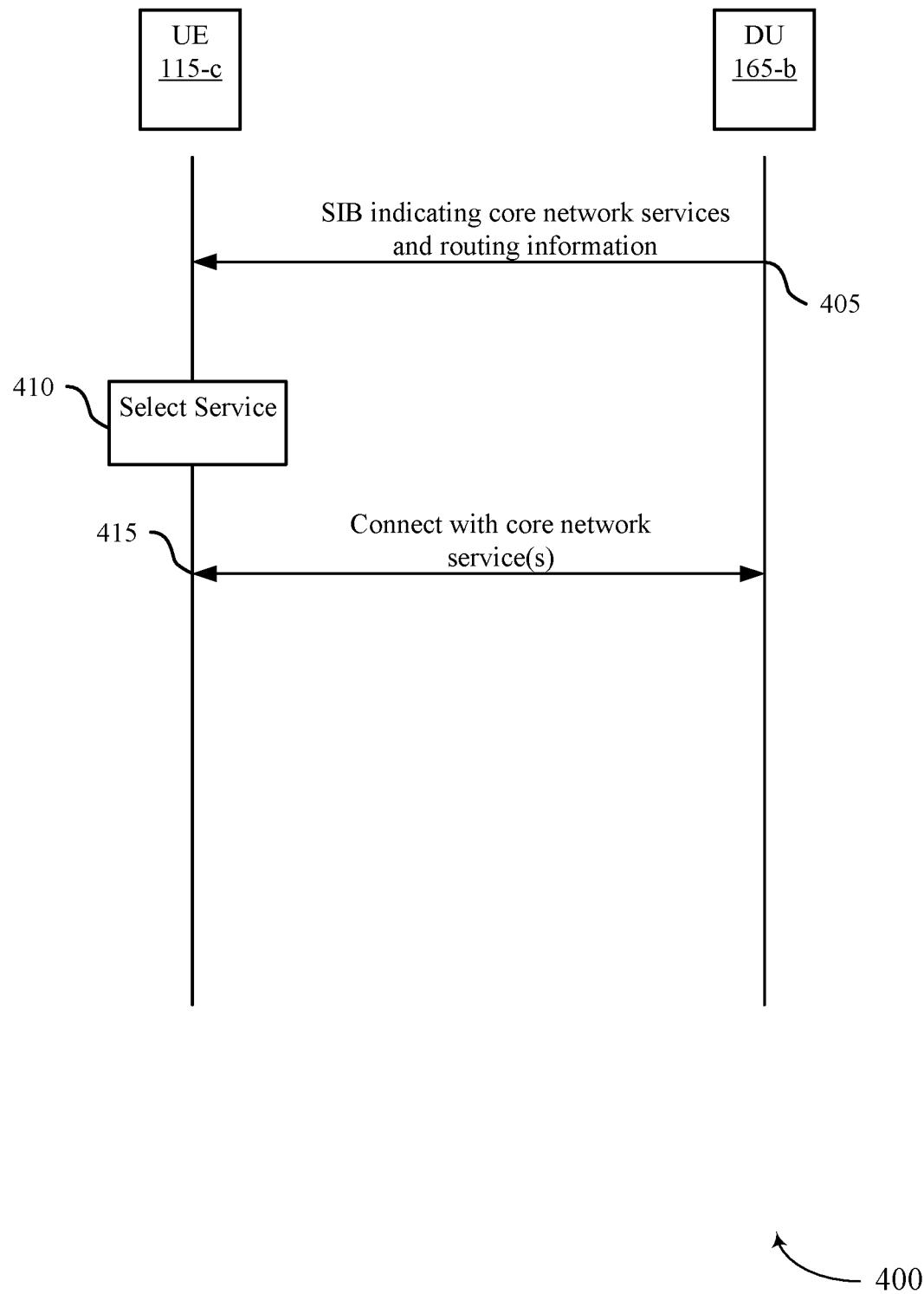
FIG. 4 illustrates an example of a process flow that supports discovery in a service-based wireless system in accordance with one or more aspects of the present disclosure.

FIG. 4 illustrates an example of a process flow 400 that supports discovery in a service-based wireless system in accordance with one or more aspects of the present disclosure. The process flow 400 may include a UE 115-*c*, which may be an example of a UE 115 as described herein. The process flow 400 may include a DU 165-*b*, which may be an example of a DU 165 as described herein. In the following description of the process flow 400, the operations between the UE 115-*c* and the DU 165-*b* may be transmitted in a different order than the example order shown, or the operations performed by the UE 115-*c* and the DU 165—may be performed in different orders or at different times. Some operations may also be omitted from the process flow 400, and other operations may be added to the process flow 400.

The process flow 400 illustrates an example broadcast based discovery mode. At 405, the DU 165-*b* may broadcast an SIB indicating a set of core network services offered by a service-based network. The SIB may indicate routing information (e.g., network addresses for) the core network services, as well as service information associated with the core network services. In some cases, each core network service of the set of core network services is associated with a respective API of a set of multiple APIs.

For example, the service information may include: a service type (e.g., mobility, security, paging, registration, data service, short message service (SMS), location services, data service); specific type service information (e.g., certain capabilities of the core network services); information regarding how to enable the core network service (e.g., routing information/network address (e.g., an IP address, transmission control protocol (TCP) port, or Hypertext Transfer Protocol (HTTP) port associated with each core network service)); dependency on other core network services (e.g., a data service may depend on security and/or registration services); or whether further discovery information is available (e.g., routing information for a discovery service 230 that may provide additional information regarding the set of core network services).

At 410, the UE 115-*c* may select one or more core network services of the set of core network services indicated by the SIB. For example, the UE 115-*c* may automatically select one or more core network services based on capabilities required by the UE 115-*c*, preferences of the UE 115-*c*, and service information indicated by the SIB. In some cases, the UE 115-*c* may automatically select additional core network services that the selected core network service is dependent upon (e.g., based on the service information). In some cases, a user may manually select services. For example, the UE 115-c may display a list of available core network services based on the service information. The order of displayed core network services and the display of the service information may be determined based on a configuration received from the user (e.g., a user preference or based on a home network).

At 415, the UE 115-c may connect with the selected core network service(s) via the DU 165-b. For example, the UE 115-c may transmit, to the DU 165-b a service request indicating a core network service of the set of core network services. The DU 165-b may communicate the service request to the indicated core network service. The DU 165-b may transmit, to the UE 115-c, control information indicating a service context for communications between the UE 115-c and the indicated core network service. The UE 115-c may then communicate a message with the indicated core network service via the DU 165-b in accordance with the service context.

Figure 5:
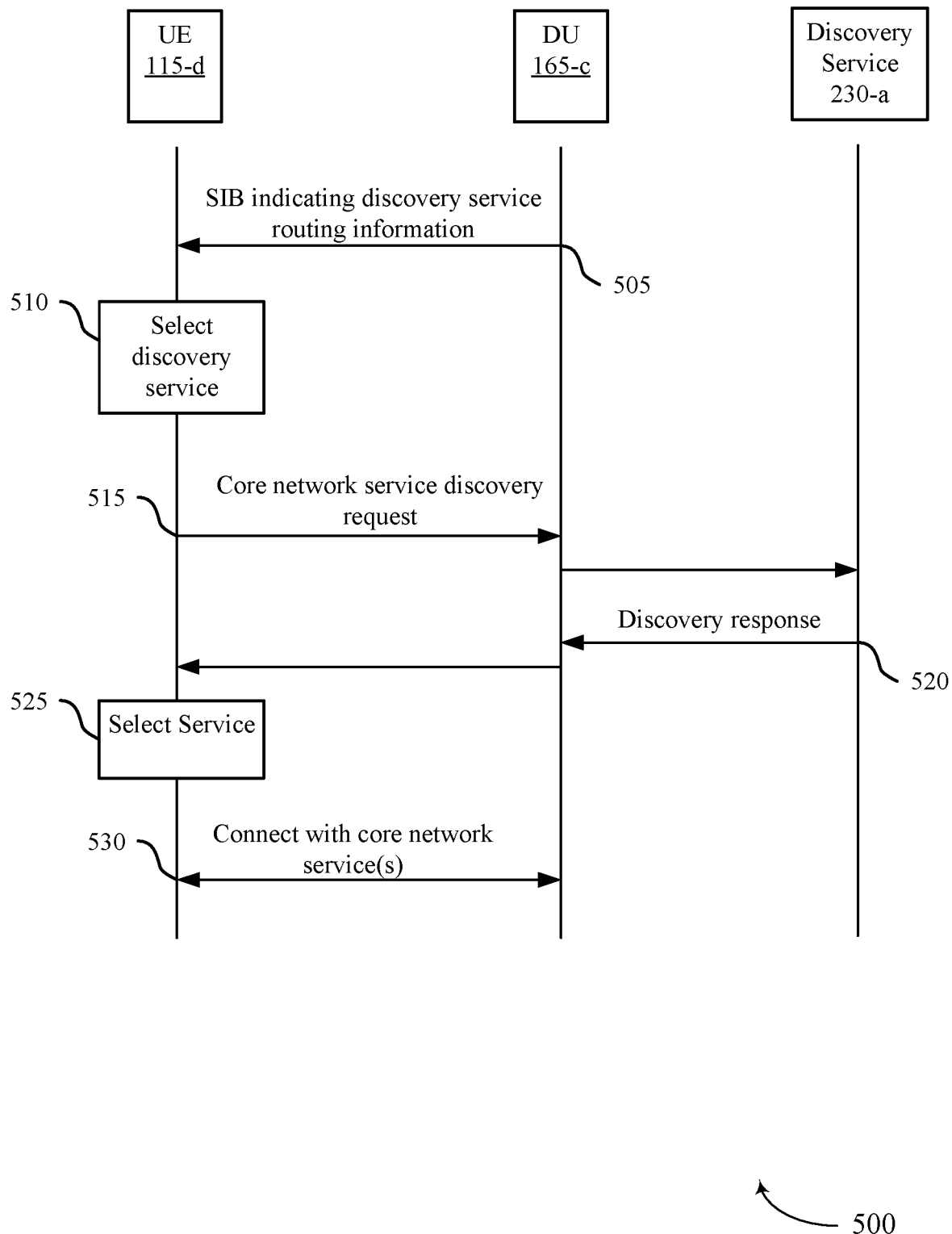
FIG. 5 illustrates an example of a process flow that supports discovery in a service-based wireless system in accordance with one or more aspects of the present disclosure.

FIG. 5 illustrates an example of a process flow 500 that supports discovery in a service-based wireless system in accordance with one or more aspects of the present disclosure. The process flow 500 may include a UE 115-d, which may be an example of a UE 115 as described herein. The process flow 500 may include a DU 165-c, which may be an example of a DU 165 as described herein. The process flow 500 may include a discovery service 230-a, which may be an example of a discovery service 230 as described herein. In the following description of the process flow 500, the operations between the UE 115-d, the DU 165-c, and the discovery service 230-a may be transmitted in a different order than the example order shown, or the operations performed the UE 115-d, the DU 165-c, and the discovery service 230-a may be performed in different orders or at different times. Some operations may also be omitted from the process flow 500, and other operations may be added to the process flow 500.

The process flow 500 illustrates an example query based direct discovery mode. At 505, the UE 115-d may receive control information from the DU 165-c indicating routing information for a discovery service 230-a for a set of core network services offered by a service-based network configured to interface with a RAN associated with the DU 165-c. For example, the UE 115-d may receive the control information via an SIB broadcast by the DU 165-c that advertises information for the discovery service 230-a (e.g., routing information such as an IP address, TCP port, or HTTP port associated with the discovery service 230-a). In some cases, each core network service of the set of core network services is associated with a respective API of a set of multiple APIs.

At 510, the UE 115-d may select the discovery service 230-a based on the control information.

At 515, the UE 115-d may transmit, to the DU 165-c, a discovery request that includes the routing information for the discovery service 230-a. The DU 165-c may communicate the discovery request to the discovery service 230-a based on the routing information. For example, the discovery request may be transmitted to the DU 165-c for relay to a network address associated with the discovery service 230-a, where the network address is based on the routing information.

At 520, the discovery service 230-a may communicate, to the DU 165-c, a discovery response including service information associated with the set of core network services in response to the discovery request. The DU 165-c may transmit the service information to the UE 115-d.

For example, the service information may include a list of core network services, and for each of the core network services: a service type (e.g., mobility, security, paging, registration, data service, SMS, location services, data service); specific type service information (e.g., certain capabilities of the services); information regarding how to enable the core network service (e.g., routing information/network address (e.g., an IP address, TCP port, or HTTP port); a network location (e.g., network edge); dependency on other core network services (e.g., a data service may depend on security and/or registration services); and whether further discovery information is available via the discovery service 230-a.

At 525, the UE 115-d may select one or more core network services of the set of core network services based on the service information. For example, the UE 115-d may automatically select one or more core network services based on capabilities required by the UE 115-d, preferences of the UE 115-d, and the service information. In some cases, the UE 115-d may automatically select additional core network services that the selected core network service is dependent upon (e.g., based on the service information). In some cases, a user may manually select services. For example, the UE 115-d may display a list of available core network services based on the service information. The order of displayed core network services and the display of the service information may be determined based on a configuration received from the user (e.g., a user preference or based on a home network).

At 530, the UE 115-d may connect with the selected core network service(s) via the DU 165-c. For example, the UE 115-d may transmit, to the DU 165-c, a service request indicating a core network service of the set of core network services. The DU 165-c may communicate the service request to the indicated core network service. The DU 165-c may transmit, to the UE 115-d, control information indicating a service context for communications between the UE 115-d and the indicated core network service. The UE 115-d may then communicate a message with the indicated core network service via the DU 165-c in accordance with the service context.

In some cases, the control information at 505 may indicate a set of core network services along with routing information for the discovery service 230-a and an indication that more information regarding the core network services is available from the discovery service 230-a. The UE 115-d may select the discovery service 230-a at 510 and transmit the discovery request at 515 based on the control information indicating the set of core network services. For example, the UE 115-d may select specific core network services from the set of core network services about which the UE 115-d for which to request additional service information. In some cases, the UE 115-d may select specific core network services about which to request information based on preferred service capabilities or a preferred service location (e.g., network edge).

In some cases, the UE 115-d may indicate preferred or requested service capabilities or network locations in the discovery request at 515. The discovery service 230-a may provide a list of core network services in the discovery response at 520 associated with the preferred or requested service capabilities or network locations. The UE 115-d may select core network services with which to connect at 525 from the list of core network services.

Figure 6:
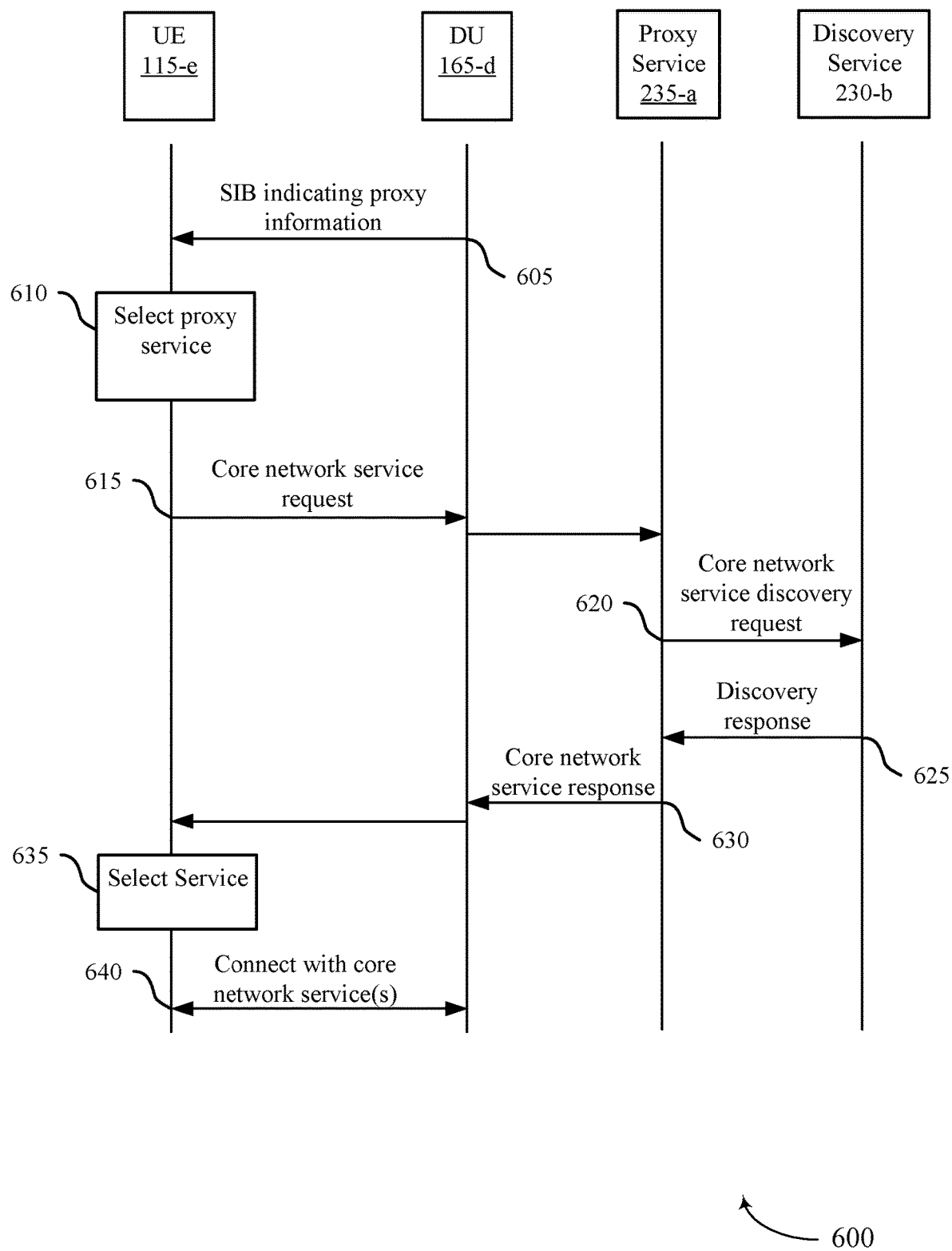
FIG. 6 illustrates an example of a process flow that supports discovery in a service-based wireless system in accordance with one or more aspects of the present disclosure.

FIG. 6 illustrates an example of a process flow 600 that supports discovery in a service-based wireless system in accordance with one or more aspects of the present disclosure. The process flow 600 may include a UE 115-e, which may be an example of a UE 115 as described herein. The process flow 600 may include a DU 165-d, which may be an example of a DU 165 as described herein. The process flow 500 may include a proxy service 235-a, which may be an example of a proxy service 235 as described herein. The process flow 600 may include a discovery service 230-b, which may be an example of a discovery service 230 as described herein. In the following description of the process flow 600, the operations between the UE 115-e, the DU 165-d, the proxy service 235-a, and the discovery service 230-b may be transmitted in a different order than the example order shown, or the operations performed the UE 115-e, the DU 165-d, the proxy service 235-a, and the discovery service 230-b may be performed in different orders or at different times. Some operations may also be omitted from the process flow 600, and other operations may be added to the process flow 600.

The process flow 600 illustrates an example query based indirect discovery mode. At 605, the UE 115-e may receive control information from the DU 165-d indicating routing information associated with (e.g., for) a proxy service 235-a configured to route communications between the UE 115-e and a discovery service 230-b for a set of core network services offered by a service-based network configured to interface with a RAN associated with the DU 165-d. In some cases, the proxy service 235-a may be configured to route communications between the UE 115-e and the set of core network services. Use of a proxy service may hide the topology of a service-based network from the UE 115-e. The UE 115-e may receive the control information via an SIB broadcast by the DU 165-d that advertises proxy information for the proxy service 235-a. In some cases, each core network service of the set of core network services is associated with a respective API of a set of multiple APIs.

At 610, the UE 115-e may select the proxy service 235-a based on the control information.

At 615, the UE 115-e may transmit, to the DU 165-d, a discovery request that includes the routing information for the proxy service 235-a. The DU 165-d may communicate the discovery request to the proxy service 235-a based on the routing information.

At 620, the proxy service 235-a may transmit the discovery request to the discovery service 230-b, for example, based on a network address of the discovery service 230-b known to the proxy service 235-a.

At 625, the discovery service 230-b may communicate, to the proxy service 235-a, a discovery response including service information associated with the set of core network services in response to the discovery request.

At 630, the proxy service 235-a may transmit, to the DU 165-d, a service response including the service information. The DU 165-d may transmit the service information to the UE 115-e.

For example, the service information may include a list of core network services, and for each of the core network services: a service type (e.g., mobility, security, paging, registration, data service, SMS, location services, data service); specific type service information (e.g., certain capabilities of the services); information regarding how to enable the core network service (e.g., proxy/routing information/network address (e.g., an IP address, TCP port, or HTTP port); a network location (e.g., network edge); dependency on other core network services (e.g., a data service may depend on security and/or registration services); and whether further discovery information is available via the discovery service 230-b.

At 635, the UE 115-e may select one or more core network services of the set of core network services based on the service information. For example, the UE 115-e may automatically select one or more core network services based on capabilities required by the UE 115-e, preferences of the UE 115-e, and the service information. In some cases, the UE 115-e may automatically select additional core network services that the selected core network service is dependent upon (e.g., based on the service information). In some cases, a user may manually select services. For example, the UE 115-e may display a list of available core network services based on the service information. The order of displayed core network services and the display of the service information may be determined based on a configuration received from the user (e.g., a user preference or based on a home network).

At 640, the UE 115-e may connect with the selected core network service(s) via the DU 165-d. For example, the UE 115-e may transmit, to the DU 165-d a service request indicating a core network service of the set of core network services. The DU 165-d may communicate the service request to the indicated core network service. The DU 165-d may transmit, to the UE 115-e, control information indicating a service context for communications between the UE 115-e and the indicated core network service. The UE 115-e may then communicate a message with the indicated core network service via the DU 165-d in accordance with the service context. In some cases, the UE 115-e may communicate with the core network service via the DU 165-d and the proxy service 235-a (e.g., the proxy service may route communications between the UE 115-e and the selected core network services based on service identifiers associated with the core network services). For example, network addresses associated with the core network services and the topology of the service-based network may be hidden from the UE 115-e.

In some cases, the control information at 605 may indicate a set of core network services along with routing information for the discovery service 230-b and an indication that more information regarding the core network services is available from the discovery service 230-b. The UE 115-e may select the proxy service 235-a at 610 and transmit the discovery request at 615 based on the control information indicating the set of core network services. For example, the UE 115-e may select specific core network services from the set of core network services about which the UE 115-e for which to request additional service information. In some cases, the UE 115-e may select specific services about which to request information based on preferred service capabilities or a preferred service location (e.g., network edge).

In some cases, the UE 115-e may indicate preferred or requested service capabilities or network locations in the discovery request at 615. The discovery service 230-b may provide a list of core network services in the discovery response at 625 associated with the preferred or requested service capabilities or network locations. The UE 115-e may select core network services with which to connect at 635 from the list of core network services.

Figure 7:
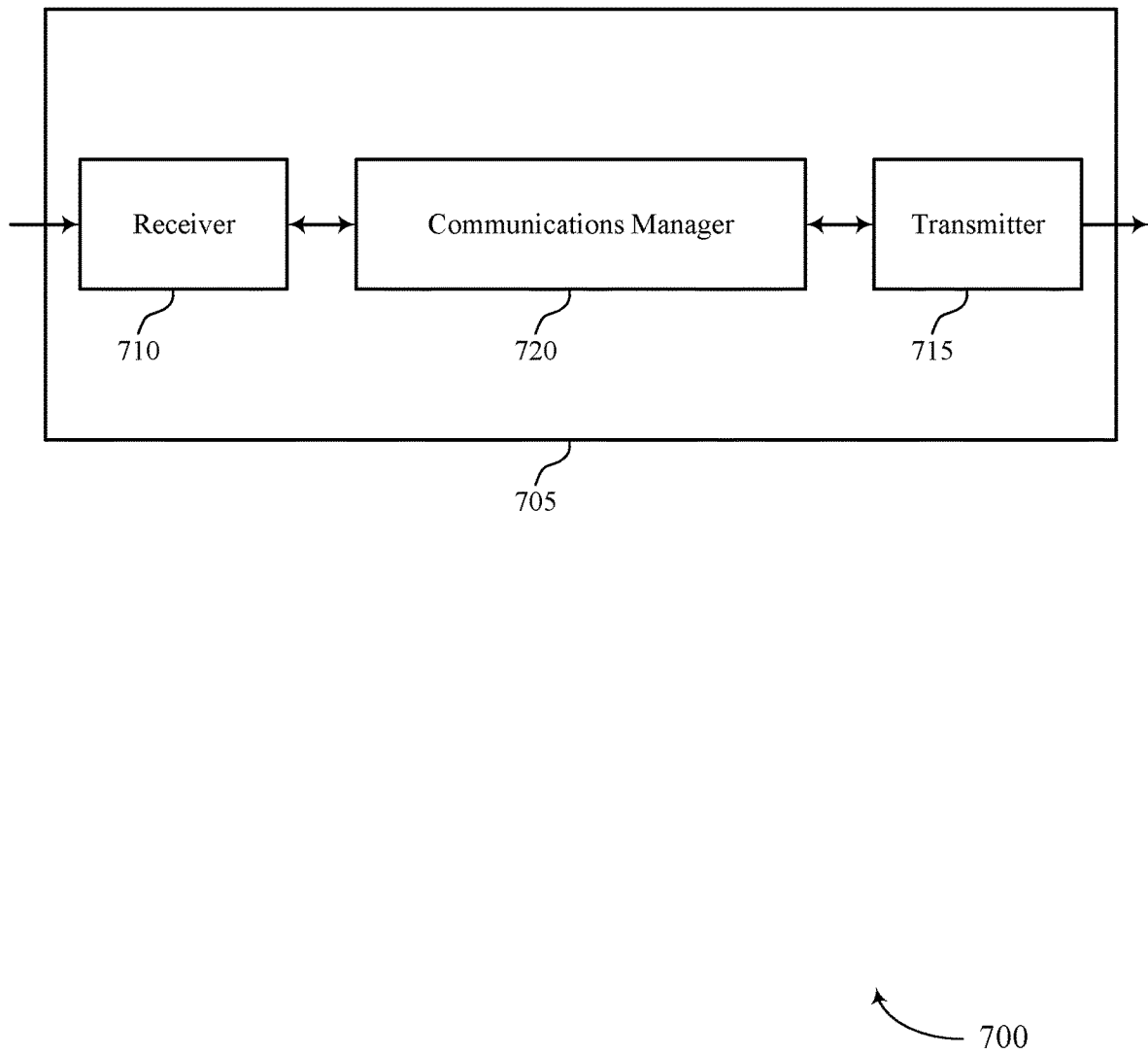
FIGS. 7 and 8 show block diagrams of devices that support discovery in a service-based wireless system in accordance with one or more aspects of the present disclosure.

FIG. 7 shows a block diagram 700 of a device 705 that supports discovery in a service-based wireless system in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to discovery in a service-based wireless system). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to discovery in a service-based wireless system). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of discovery in a service-based wireless system as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for receiving, from a DU, control information indicating routing information associated with a core network discovery service for a set of core network services offered by a service-based network configured to interface with a RAN associated with the DU. The communications manager 720 may be configured as or otherwise support a means for transmitting, to the DU and in response to the control information, a discovery request including the routing information. The communications manager 720 may be configured as or otherwise support a means for receiving, from the DU and in response to the discovery request, service information associated with the set of core network services.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources.

Figure 8:
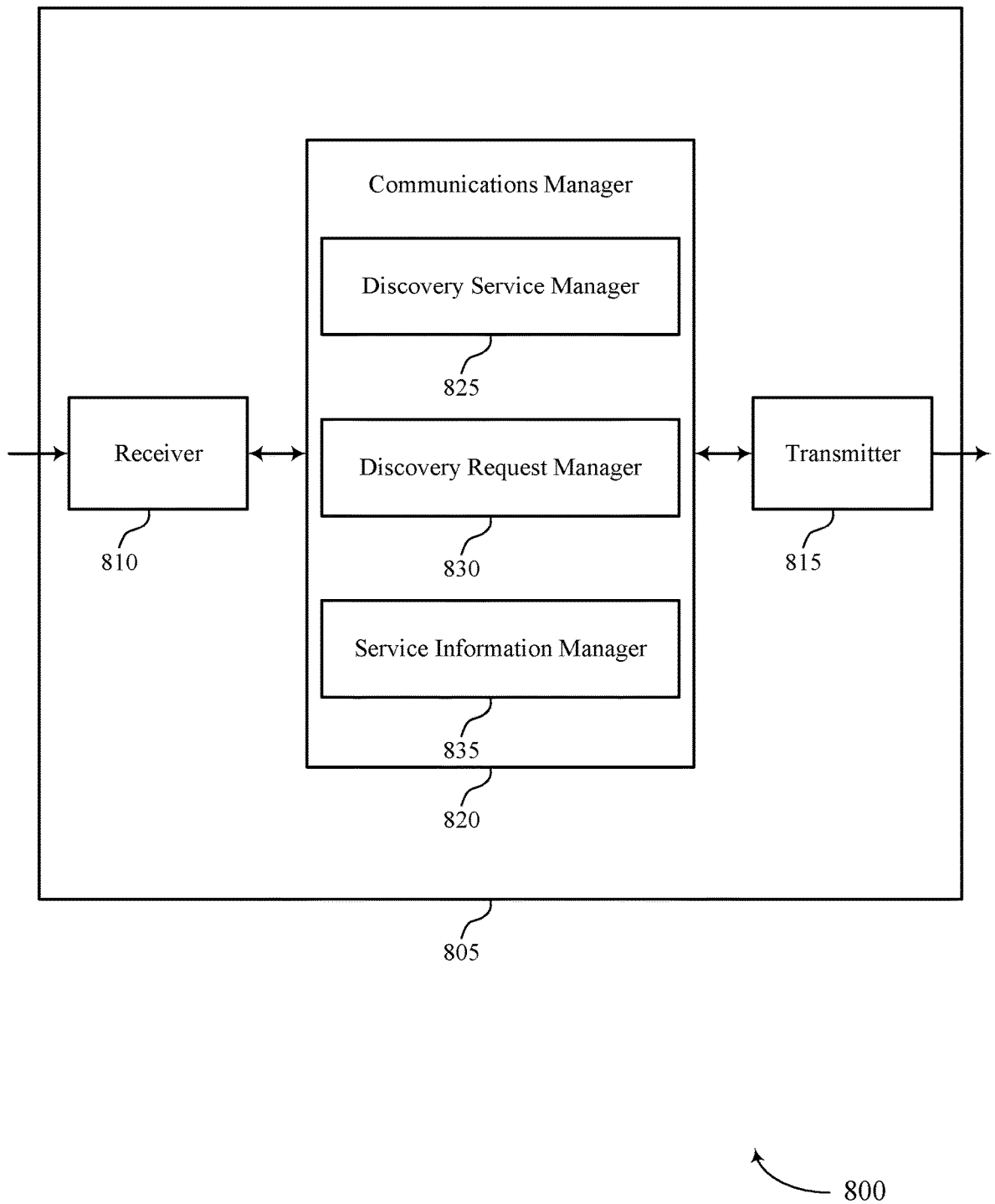

FIG. 8 shows a block diagram 800 of a device 805 that supports discovery in a service-based wireless system in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to discovery in a service-based wireless system). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to discovery in a service-based wireless system). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of discovery in a service-based wireless system as described herein. For example, the communications manager 820 may include a discovery service manager 825, a discovery request manager 830, a service information manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The discovery service manager 825 may be configured as or otherwise support a means for receiving, from a DU, control information indicating routing information associated with a core network discovery service for a set of core network services offered by a service-based network configured to interface with a RAN associated with the DU. The discovery request manager 830 may be configured as or otherwise support a means for transmitting, to the DU and in response to the control information, a discovery request including the routing information. The service information manager 835 may be configured as or otherwise support a means for receiving, from the DU and in response to the discovery request, service information associated with the set of core network services.

Figure 9:
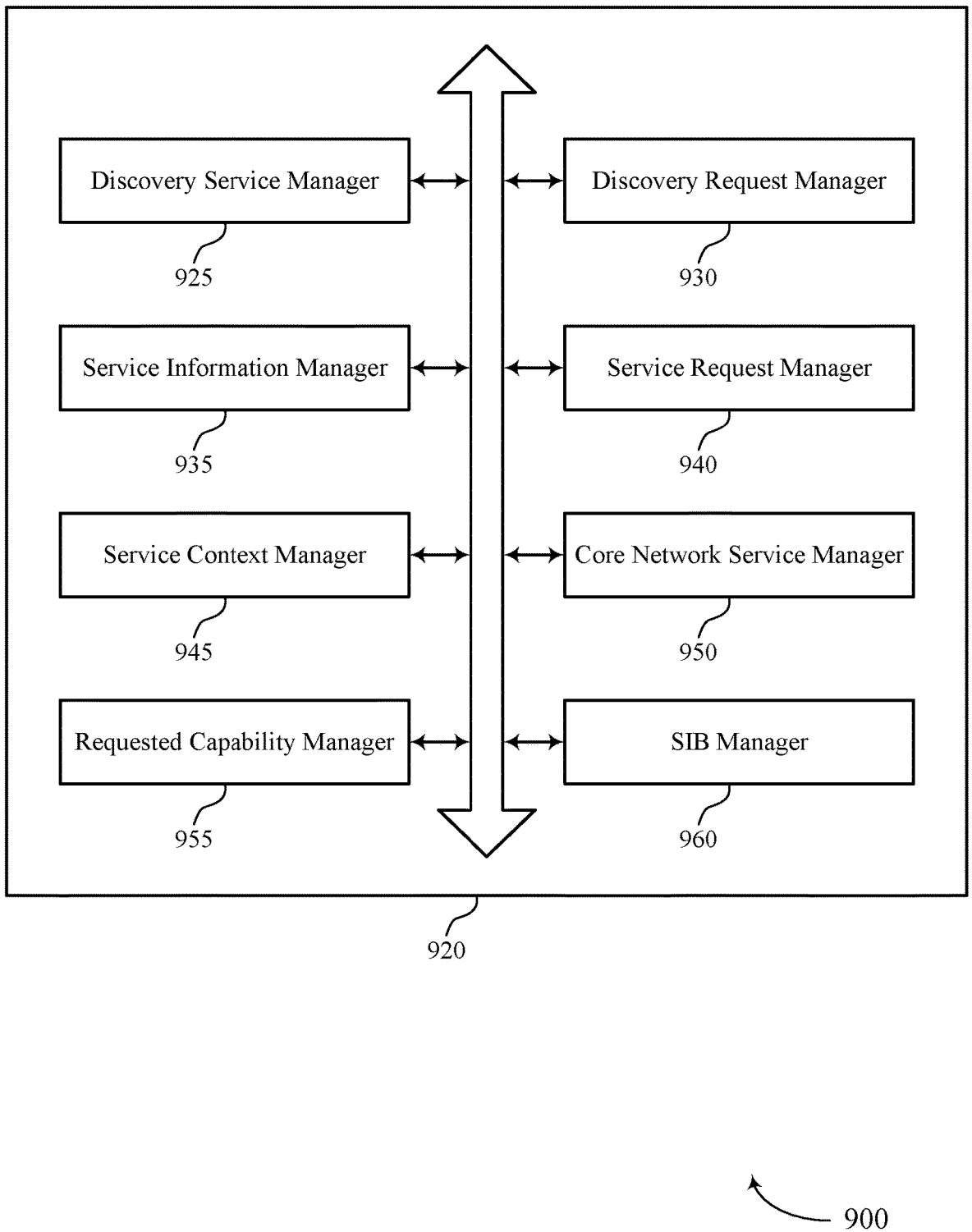
FIG. 9 shows a block diagram of a communications manager that supports discovery in a service-based wireless system in accordance with one or more aspects of the present disclosure.

FIG. 9 shows a block diagram 900 of a communications manager 920 that supports discovery in a service-based wireless system in accordance with one or more aspects of the present disclosure. The communications manager 920 may be an example of aspects of a communications manager 720, a communications manager 820, or both, as described herein. The communications manager 920, or various components thereof, may be an example of means for performing various aspects of discovery in a service-based wireless system as described herein. For example, the communications manager 920 may include a discovery service manager 925, a discovery request manager 930, a service information manager 935, a service request manager 940, a service context manager 945, a core network service manager 950, a requested capability manager 955, an SIB manager 960, or any combination thereof. Each of these components may communicate, directly or indirectly, with one another (e.g., via one or more buses).

The communications manager 920 may support wireless communication at a UE in accordance with examples as disclosed herein. The discovery service manager 925 may be configured as or otherwise support a means for receiving, from a DU, control information indicating routing information associated with a core network discovery service for a set of core network services offered by a service-based network configured to interface with a RAN associated with the DU. The discovery request manager 930 may be configured as or otherwise support a means for transmitting, to the DU and in response to the control information, a discovery request including the routing information. The service information manager 935 may be configured as or otherwise support a means for receiving, from the DU and in response to the discovery request, service information associated with the set of core network services.

In some examples, the service request manager 940 may be configured as or otherwise support a means for transmitting, to the DU and in response to the service information indicating the set of core network services, a service request indicating a core network service of the set of core network services. In some examples, the service context manager 945 may be configured as or otherwise support a means for receiving, from the DU and in response to the service request, second control information indicating a service context for communicating with the core network service. In some examples, the core network service manager 950 may be configured as or otherwise support a means for communicating, via the DU in accordance with the service context, a message with the core network service.

In some examples, the service information includes an indication of a dependency of the core network service on a second core network service, and the service request manager 940 may be configured as or otherwise support a means for transmitting, to the DU and based on the dependency, a second service request indicating the second core network service of the set of core network services. In some examples, the service information includes an indication of a dependency of the core network service on a second core network service, and the service context manager 945 may be configured as or otherwise support a means for receiving, from the DU and in response to the second service request, third control information indicating a second service context for communicating with the second core network service. In some examples, the service information includes an indication of a dependency of the core network service on a second core network service, and the core network service manager 950 may be configured as or otherwise support a means for communicating, via the DU and in accordance with the second service context, a second message with the second core network service, where communicating the message is based on communicating the second message.

In some examples, to support transmitting the discovery request, the requested capability manager 955 may be configured as or otherwise support a means for transmitting an indication of one or more requested service capabilities, where the service information includes a list of a subset of core network services of the set of core network services associated with the one or more requested service capabilities.

In some examples, the service request manager 940 may be configured as or otherwise support a means for transmitting, to the DU and in response to the service information, a service request indicating a selected core network service of the subset of core network services. In some examples, the service context manager 945 may be configured as or otherwise support a means for receiving, from the DU in response to the service request, second control information indicating a service context for communicating with the selected core network service. In some examples, the core network service manager 950 may be configured as or otherwise support a means for communicating, via the DU in accordance with the service context, a message with the selected core network service.

In some examples, to support transmitting the discovery request, the service request manager 940 may be configured as or otherwise support a means for transmitting an indication of a subset of core network services of the set of core network services, where the service information includes, for each of the subset of core network services, one or more of core network service dependency information, a service capability, a network address, or a network location.

In some examples, to support receiving the service information, the service information manager 935 may be configured as or otherwise support a means for receiving an indication of one or more of core network service dependency information, a service capability, or a network location associated with one or more of core network services of the set of core network services.

In some examples, the routing information is associated with a proxy service that is configured to route the discovery request to the core network discovery service.

In some examples, to support receiving the control information, the SIB manager 960 may be configured as or otherwise support a means for receiving a system information block message including the control information.

In some examples, the discovery request is transmitted to the DU for relay to a network address associated with the core network discovery service, the network address based on the routing information.

In some examples, each core network service of the set of core network services is associated with a respective API of a set of multiple APIs.

Figure 10:
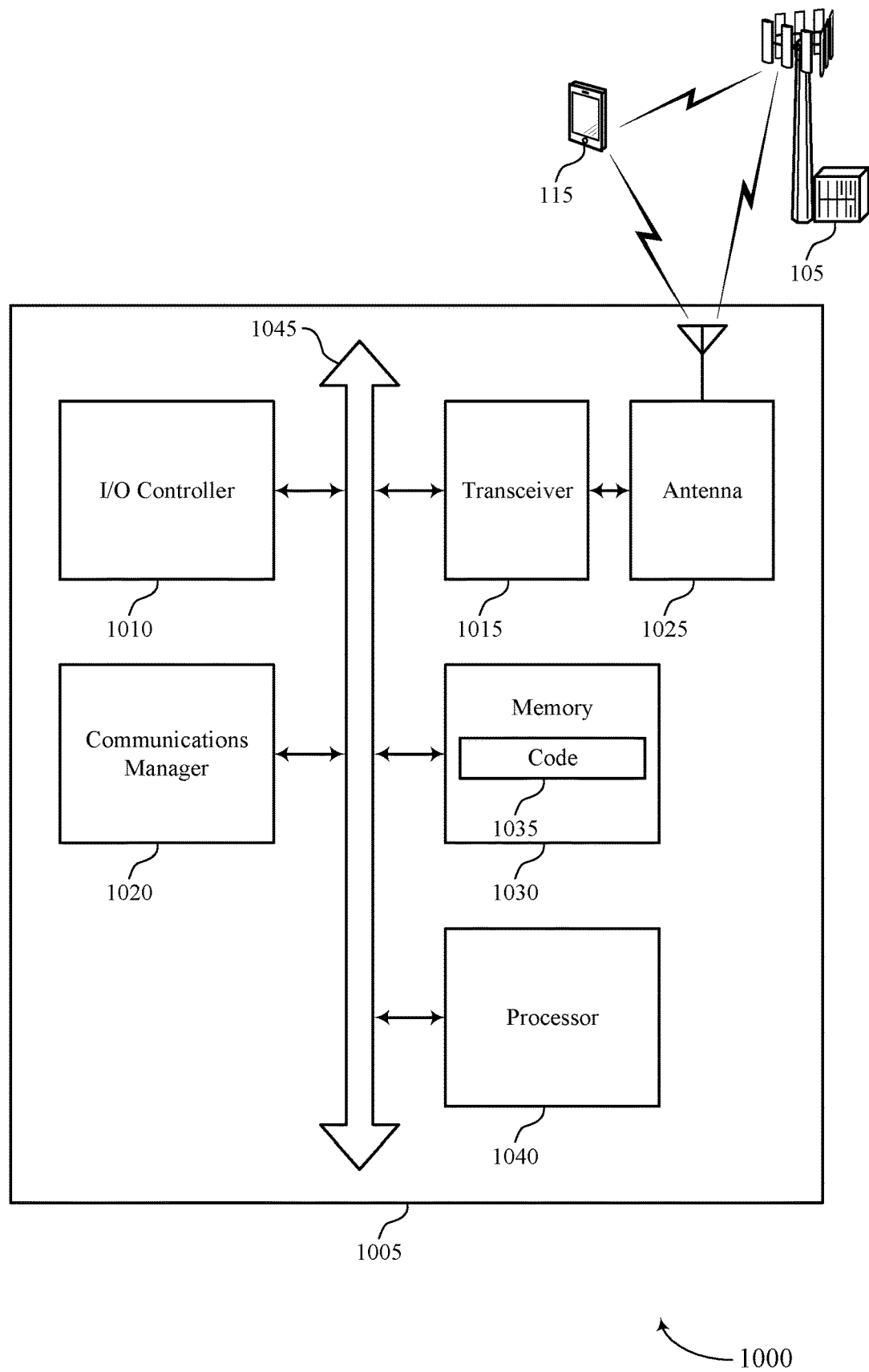
FIG. 10 shows a diagram of a system including a device that supports discovery in a service-based wireless system in accordance with one or more aspects of the present disclosure.

FIG. 10 shows a diagram of a system 1000 including a device 1005 that supports discovery in a service-based wireless system in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting discovery in a service-based wireless system). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a DU, control information indicating routing information associated with a core network discovery service for a set of core network services offered by a service-based network configured to interface with a RAN associated with the DU. The communications manager 1020 may be configured as or otherwise support a means for transmitting, to the DU and in response to the control information, a discovery request including the routing information. The communications manager 1020 may be configured as or otherwise support a means for receiving, from the DU and in response to the discovery request, service information associated with the set of core network services.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of discovery in a service-based wireless system as described herein, or the processor 1040 and the memory 1030 may be otherwise configured to perform or support such operations.

Figure 11:
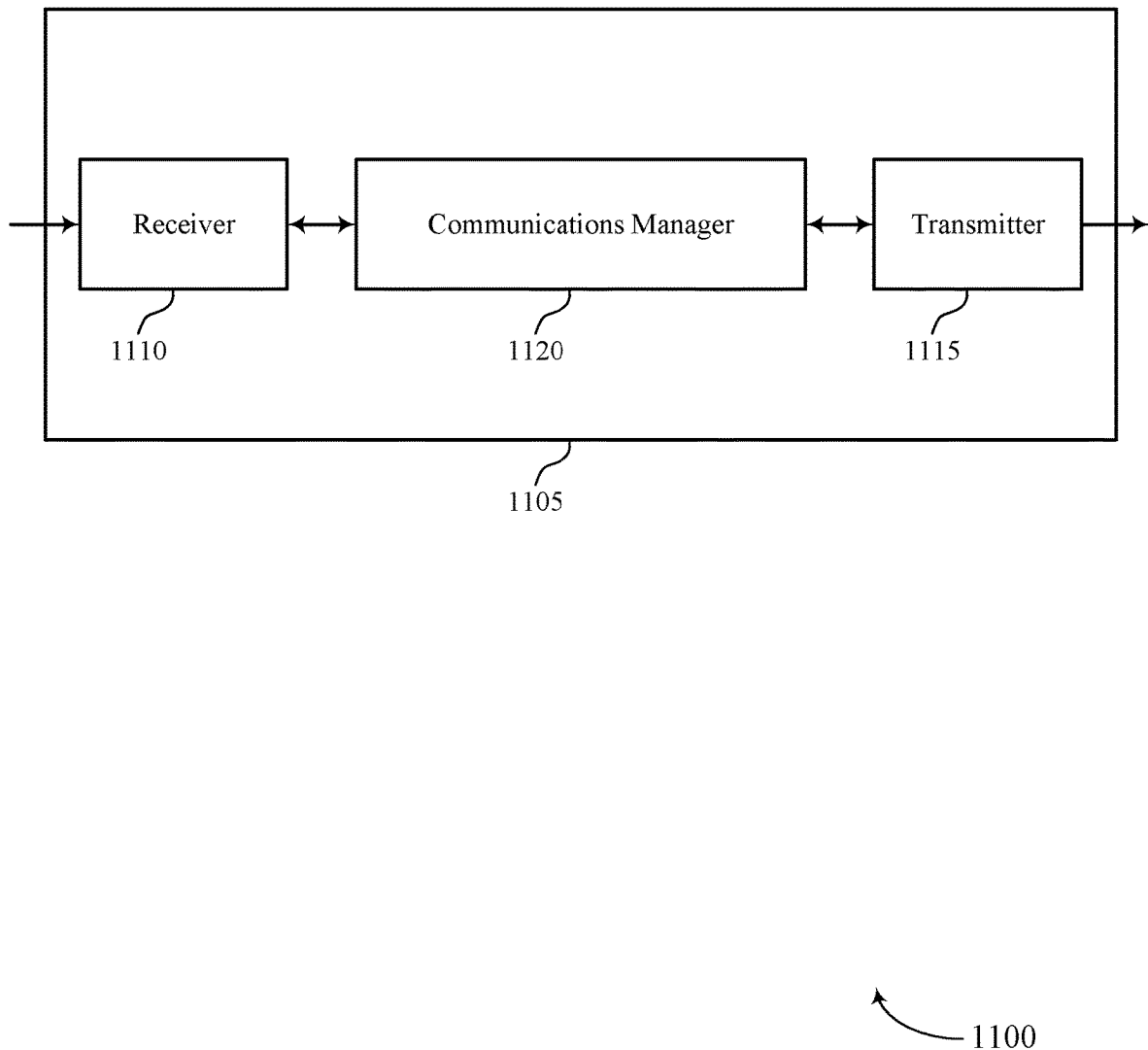
FIGS. 11 and 12 show block diagrams of devices that support discovery in a service-based wireless system in accordance with one or more aspects of the present disclosure.

FIG. 11 shows a block diagram 1100 of a device 1105 that supports discovery in a service-based wireless system in accordance with one or more aspects of the present disclosure. The device 1105 may be an example of aspects of a DU 165 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of discovery in a service-based wireless system as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a DU in accordance with examples as disclosed herein. For example, the communications manager 1120 may be configured as or otherwise support a means for transmitting, to a UE, control information indicating routing information associated with a core network discovery service for a set of core network services offered by a service-based network configured to interface with a RAN associated with the DU. The communications manager 1120 may be configured as or otherwise support a means for communicating, to the core network discovery service, a discovery request including routing information received from the UE. The communications manager 1120 may be configured as or otherwise support a means for communicating, to the UE, service information received from the core network discovery service in response to the discovery request, the service information associated with the set of core network services.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
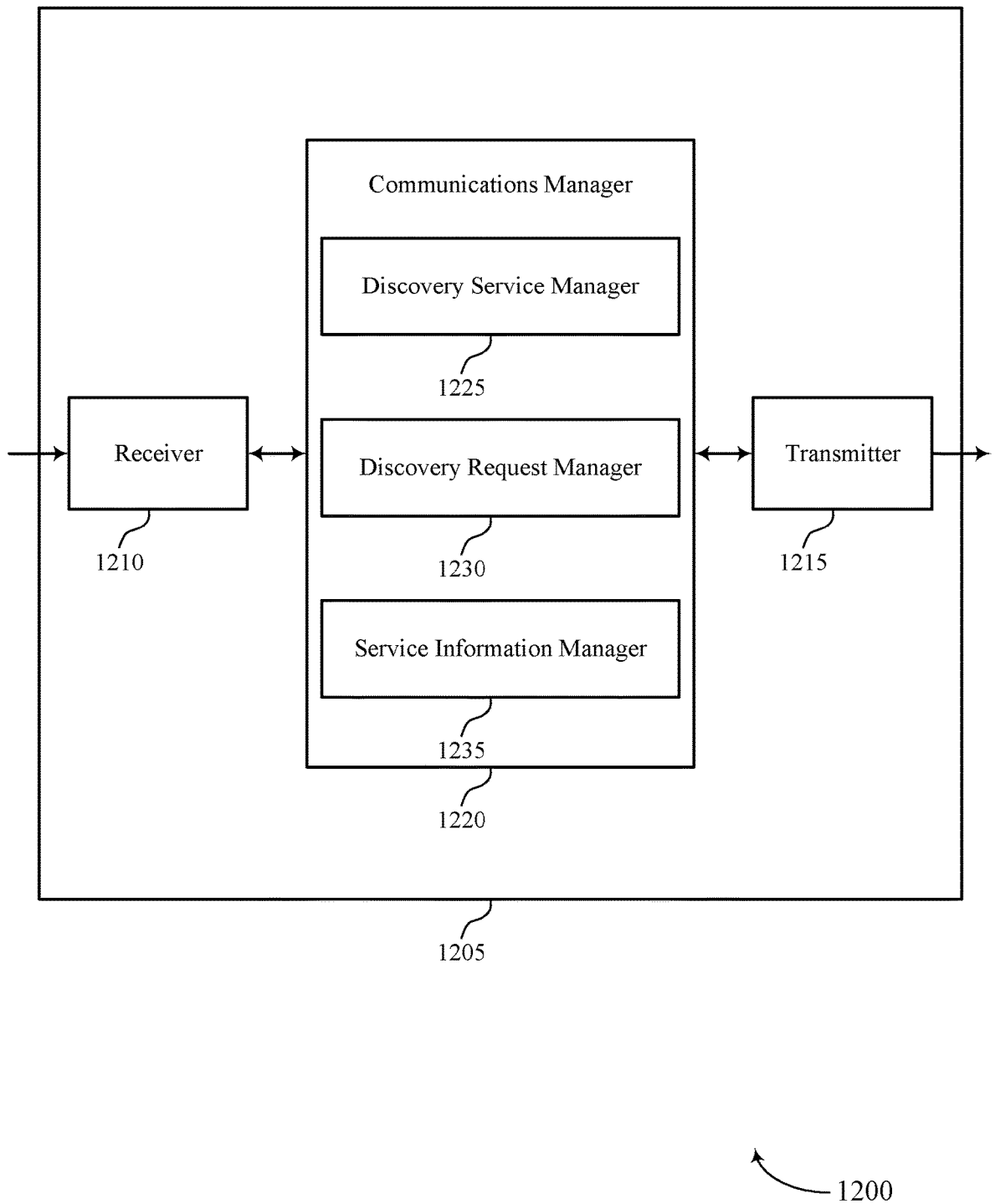

FIG. 12 shows a block diagram 1200 of a device 1205 that supports discovery in a service-based wireless system in accordance with one or more aspects of the present disclosure. The device 1205 may be an example of aspects of a device 1105 or a DU 165 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas.

Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of discovery in a service-based wireless system as described herein. For example, the communications manager 1220 may include a discovery service manager 1225, a discovery request manager 1230, a service information manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a DU in accordance with examples as disclosed herein. The discovery service manager 1225 may be configured as or otherwise support a means for transmitting, to a UE, control information indicating routing information associated with a core network discovery service for a set of core network services offered by a service-based network configured to interface with a RAN associated with the DU. The discovery request manager 1230 may be configured as or otherwise support a means for communicating, to the core network discovery service, a discovery request including routing information received from the UE. The service information manager 1235 may be configured as or otherwise support a means for communicating, to the UE, service information received from the core network discovery service in response to the discovery request, the service information associated with the set of core network services.

Figure 13:
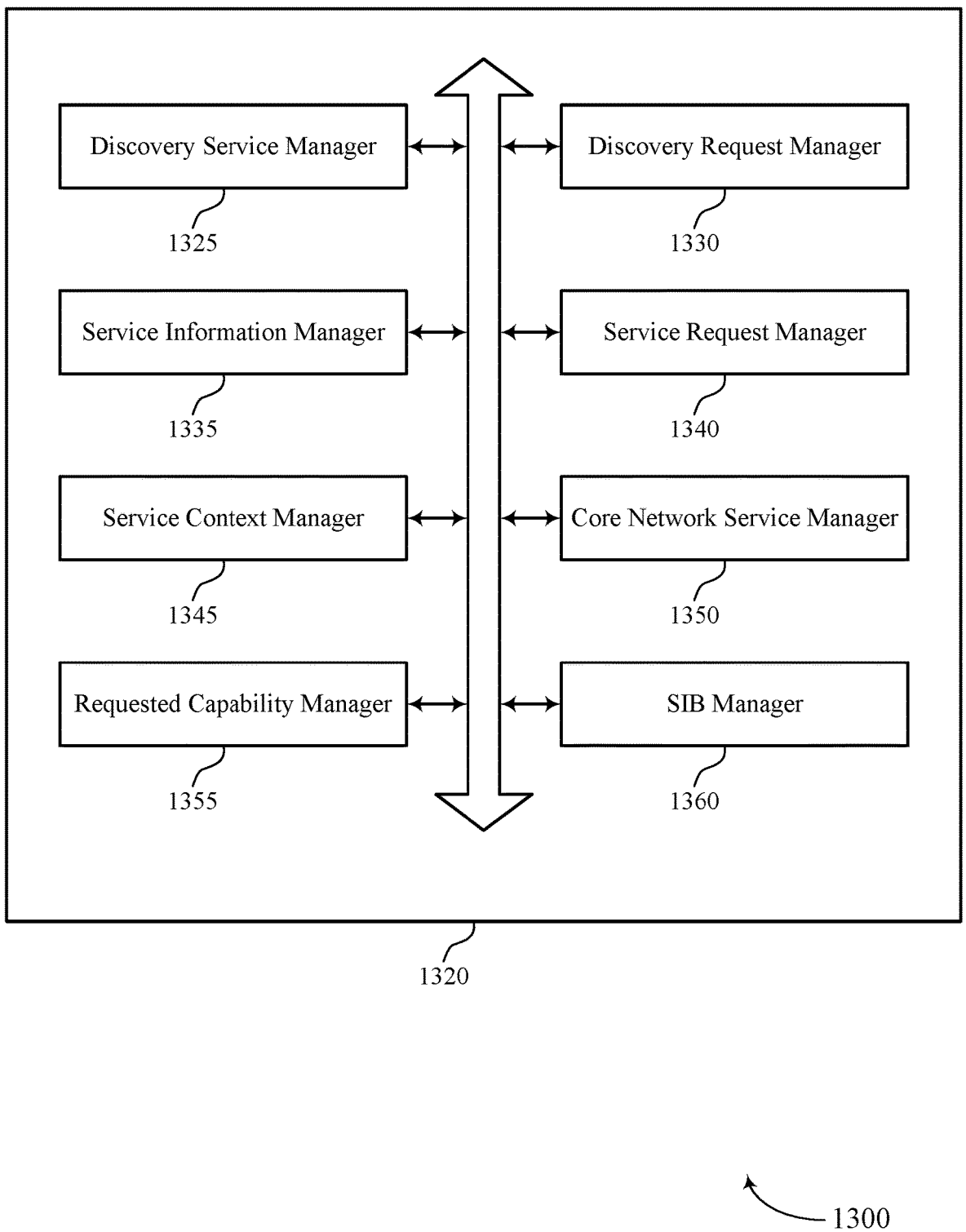
FIG. 13 shows a block diagram of a communications manager that supports discovery in a service-based wireless system in accordance with one or more aspects of the present disclosure.

FIG. 13 shows a block diagram 1300 of a communications manager 1320 that supports discovery in a service-based wireless system in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of discovery in a service-based wireless system as described herein. For example, the communications manager 1320 may include a discovery service manager 1325, a discovery request manager 1330, a service information manager 1335, a service request manager 1340, a service context manager 1345, a core network service manager 1350, a requested capability manager 1355, an SIB manager 1360, or any combination thereof. Each of these components may communicate, directly or indirectly, with one another (e.g., via one or more buses).

The communications manager 1320 may support wireless communications at a DU in accordance with examples as disclosed herein. The discovery service manager 1325 may be configured as or otherwise support a means for transmitting, to a UE, control information indicating routing information associated with a core network discovery service for a set of core network services offered by a service-based network configured to interface with a RAN associated with the DU. The discovery request manager 1330 may be configured as or otherwise support a means for communicating, to the core network discovery service, a discovery request including routing information received from the UE. The service information manager 1335 may be configured as or otherwise support a means for communicating, to the UE, service information received from the core network discovery service in response to the discovery request, the service information associated with the set of core network services.

In some examples, the service request manager 1340 may be configured as or otherwise support a means for receiving, from the UE and in response to the service information indicating the set of core network services, a service request indicating a core network service of the set of core network services. In some examples, the service context manager 1345 may be configured as or otherwise support a means for transmitting, to the UE and in response to the service request, second control information indicating a service context for communications between the UE and the core network service. In some examples, the core network service manager 1350 may be configured as or otherwise support a means for communicating, to the core network service, a message received from the UE in accordance with the service context.

In some examples, the service request manager 1340 may be configured as or otherwise support a means for receiving, from the UE and in response to the service information, a second service request indicating a second core network service of the set of core network services, where the service information includes an indication of a dependency of the core network service on the second core network service. In some examples, the service context manager 1345 may be configured as or otherwise support a means for transmitting, to the UE and in response to the second service request, third control information indicating a second service context for communications between the UE and the second core network service. In some examples, the core network service manager 1350 may be configured as or otherwise support a means for communicating, to the second core network service, a second message received from the UE in accordance with the second service context, where communicating the message is based on communicating the second message.

In some examples, to support communicating the discovery request, the requested capability manager 1355 may be configured as or otherwise support a means for receiving, from the UE, an indication of one or more requested service capabilities, where the service information includes a list of a subset of core network services of the set of core network services associated with the one or more requested service capabilities.

In some examples, the service request manager 1340 may be configured as or otherwise support a means for receiving, from the UE and in response to the service information, a service request indicating a selected core network service of the subset of core network services. In some examples, the service context manager 1345 may be configured as or otherwise support a means for transmitting, to the UE in response to the service request, second control information indicating a service context for communications between the UE and the selected core network service. In some examples, the core network service manager 1350 may be configured as or otherwise support a means for communicating, to the selected core network service, a message received from the UE in accordance with the service context.

In some examples, to support communicating the discovery request, the service request manager 1340 may be configured as or otherwise support a means for receiving, from the UE, an indication of a subset of core network services of the set of core network services, where the service information includes, for each of the subset of core network services, one or more of core network service dependency information, a service capability, a network address, or a network location.

In some examples, to support communicating the service information, the service information manager 1335 may be configured as or otherwise support a means for transmitting, to the UE, an indication of one or more of core network service dependency information, a service capability, or a network location associated with one or more of core network services of the set of core network services.

In some examples, the routing information is associated with a proxy service that is configured to route the discovery request to the core network discovery service and to route the service information from the core network discovery service to the UE via the DU, and communicating the discovery request to the core network discovery service includes transmitting the discovery request to the proxy service, and communicating the service information includes receiving the service information via the proxy service.

In some examples, to support transmitting the control information, the SIB manager 1360 may be configured as or otherwise support a means for transmitting a system information block message including the control information.

In some examples, each core network service of the set of core network services is associated with a respective API of a set of multiple APIs.

Figure 14:
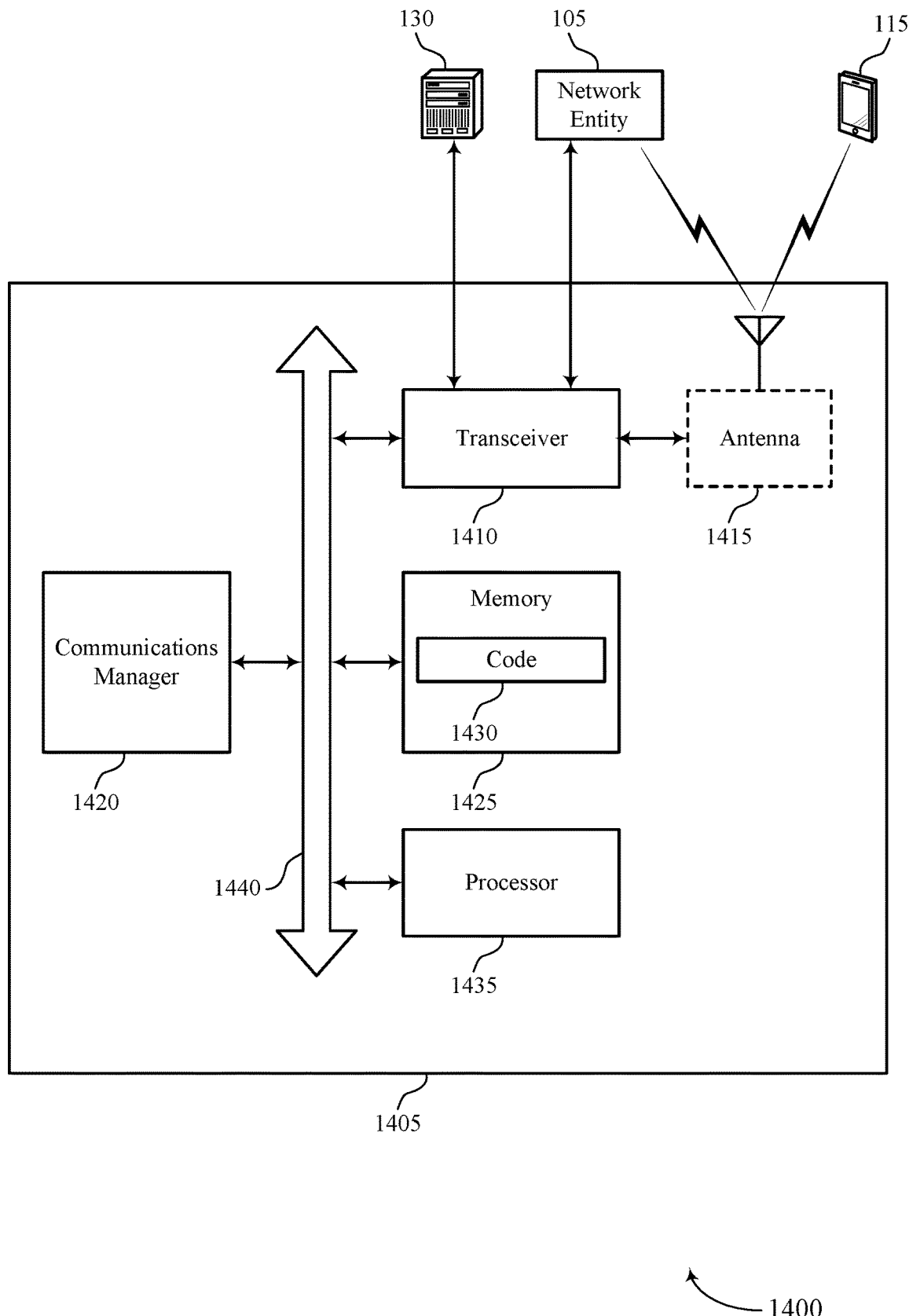
FIG. 14 shows a diagram of a system including a device that supports discovery in a service-based wireless system in accordance with one or more aspects of the present disclosure.

FIG. 14 shows a diagram of a system 1400 including a device 1405 that supports discovery in a service-based wireless system in accordance with one or more aspects of the present disclosure. The device 1405 may be an example of or include the components of a device 1105, a device 1205, or a DU 165 as described herein. The device 1405 may include components for bi-directional voice and data communications including components for transmitting and receiving communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting discovery in a service-based wireless system). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405 and may process information received from other components (such as inputs or signals) or output information to other components. For example, a chip or modem of the device 1405 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1405 may transmit information output from the chip or modem. In some implementations, the second interface may refer to an interface between the processing system of the chip or modem and a receiver, such that the device 1405 may obtain information or signal inputs, and the information may be passed to the processing system. A person having ordinary skill in the art will readily recognize that the first interface also may obtain information or signal inputs, and the second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105 and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a DU in accordance with examples as disclosed herein. For example, the communications manager 1420 may be configured as or otherwise support a means for transmitting, to a UE, control information indicating routing information associated with a core network discovery service for a set of core network services offered by a service-based network configured to interface with a RAN associated with the DU. The communications manager 1420 may be configured as or otherwise support a means for communicating, to the core network discovery service, a discovery request including routing information received from the UE. The communications manager 1420 may be configured as or otherwise support a means for communicating, to the UE, service information received from the core network discovery service in response to the discovery request, the service information associated with the set of core network services.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, and improved utilization of processing capability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of discovery in a service-based wireless system as described herein, or the processor 1435 and the memory 1425 may be otherwise configured to perform or support such operations.

Figure 15:
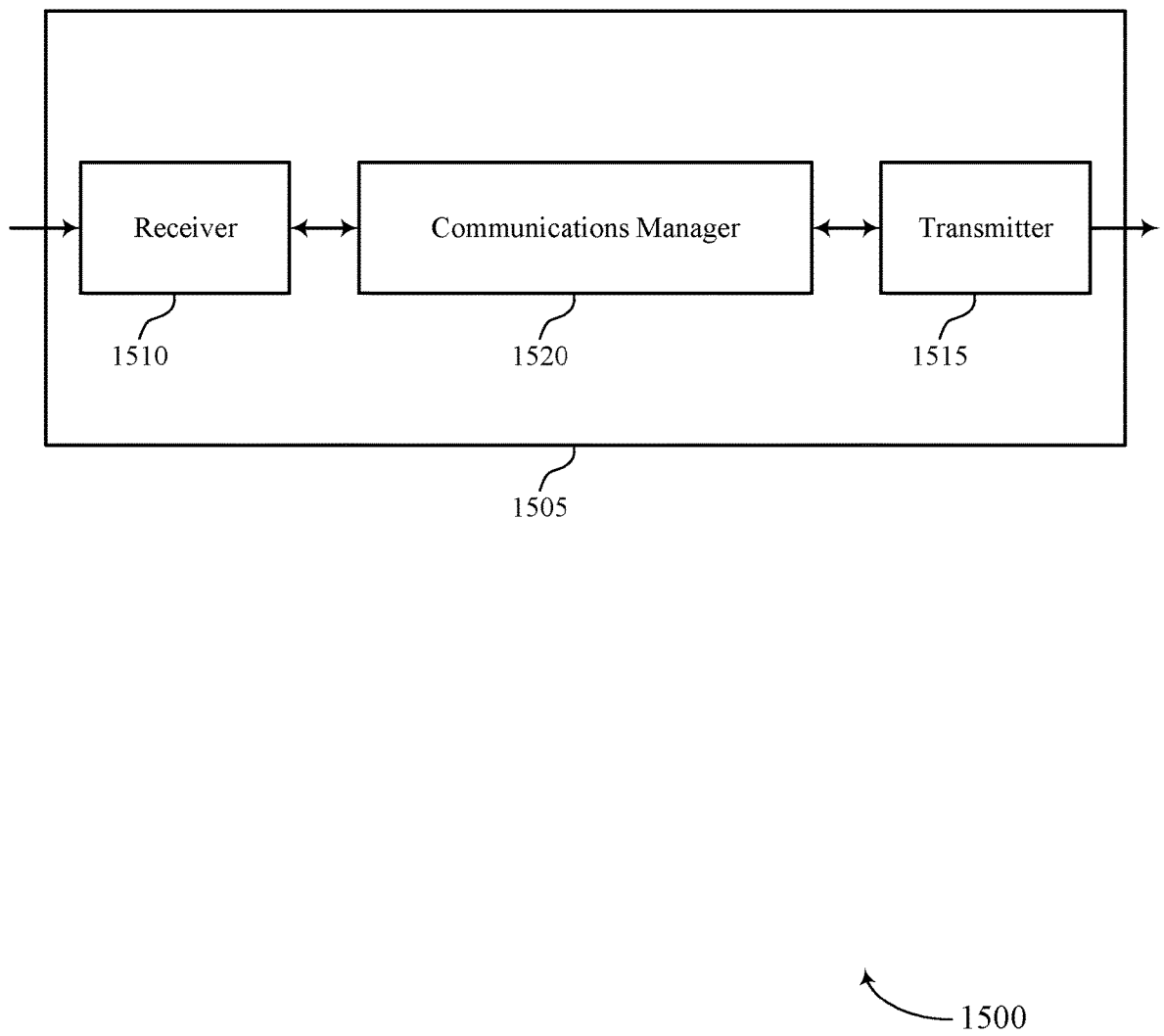
FIGS. 15 and 16 show block diagrams of devices that support discovery in a service-based wireless system in accordance with one or more aspects of the present disclosure.

FIG. 15 shows a block diagram 1500 of a device 1505 that supports discovery in a service-based wireless system in accordance with one or more aspects of the present disclosure. The device 1505 may be an example of aspects of a discovery service 230 (e.g., a core network discovery service) as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to discovery in a service-based wireless system). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to discovery in a service-based wireless system). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of discovery in a service-based wireless system as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1520 may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a core network discovery service in accordance with examples as disclosed herein. For example, the communications manager 1520 may be configured as or otherwise support a means for receiving, from a UE via a DU, a discovery request including routing information associated with the core network discovery service, the core network discovery service for a set of core network services offered by a service-based network configured to interface with a RAN associated with the DU. The communications manager 1520 may be configured as or otherwise support a means for transmitting, to the DU for relay to the UE and in response to the discovery request, service information associated with the set of core network services.

By including or configuring the communications manager 1520 in accordance with examples as described herein, the device 1505 (e.g., a processor controlling or otherwise coupled with the receiver 1510, the transmitter 1515, the communications manager 1520, or a combination thereof) may support techniques for reduced processing, reduced power consumption, and more efficient utilization of communication resources.

Figure 16:
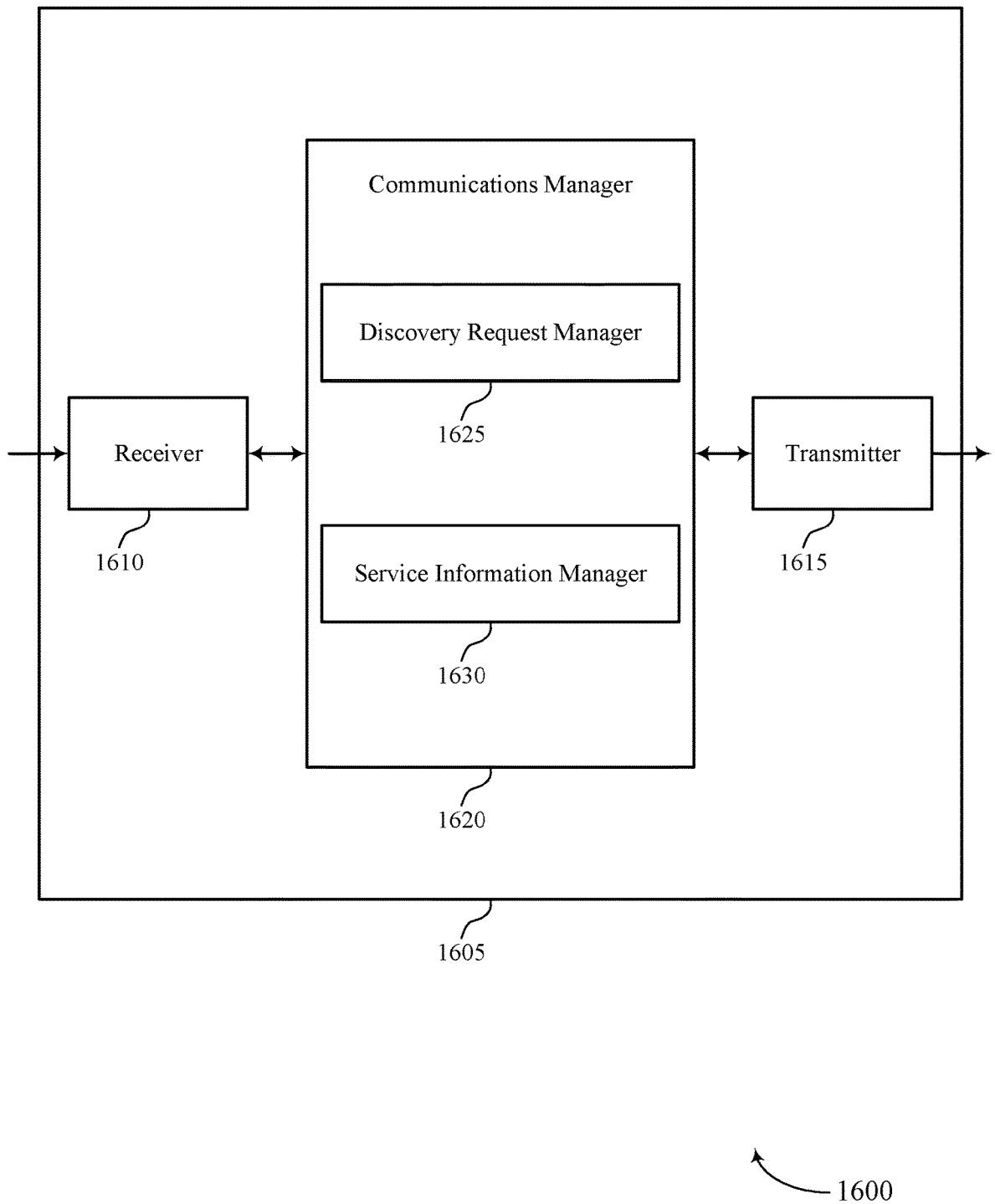

FIG. 16 shows a block diagram 1600 of a device 1605 that supports discovery in a service-based wireless system in accordance with one or more aspects of the present disclosure. The device 1605 may be an example of aspects of a device 1505 or a discovery service 230 (e.g., a core network discovery service) as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to discovery in a service-based wireless system). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to discovery in a service-based wireless system). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of discovery in a service-based wireless system as described herein. For example, the communications manager 1620 may include a discovery request manager 1625 a service information manager 1630, or any combination thereof. The communications manager 1620 may be an example of aspects of a communications manager 1520 as described herein. In some examples, the communications manager 1620, or various components thereof, may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communications at a core network discovery service in accordance with examples as disclosed herein. The discovery request manager 1625 may be configured as or otherwise support a means for receiving, from a UE via a DU, a discovery request including routing information associated with the core network discovery service, the core network discovery service for a set of core network services offered by a service-based network configured to interface with a RAN associated with the DU. The service information manager 1630 may be configured as or otherwise support a means for transmitting, to the DU for relay to the UE and in response to the discovery request, service information associated with the set of core network services.

Figure 17:
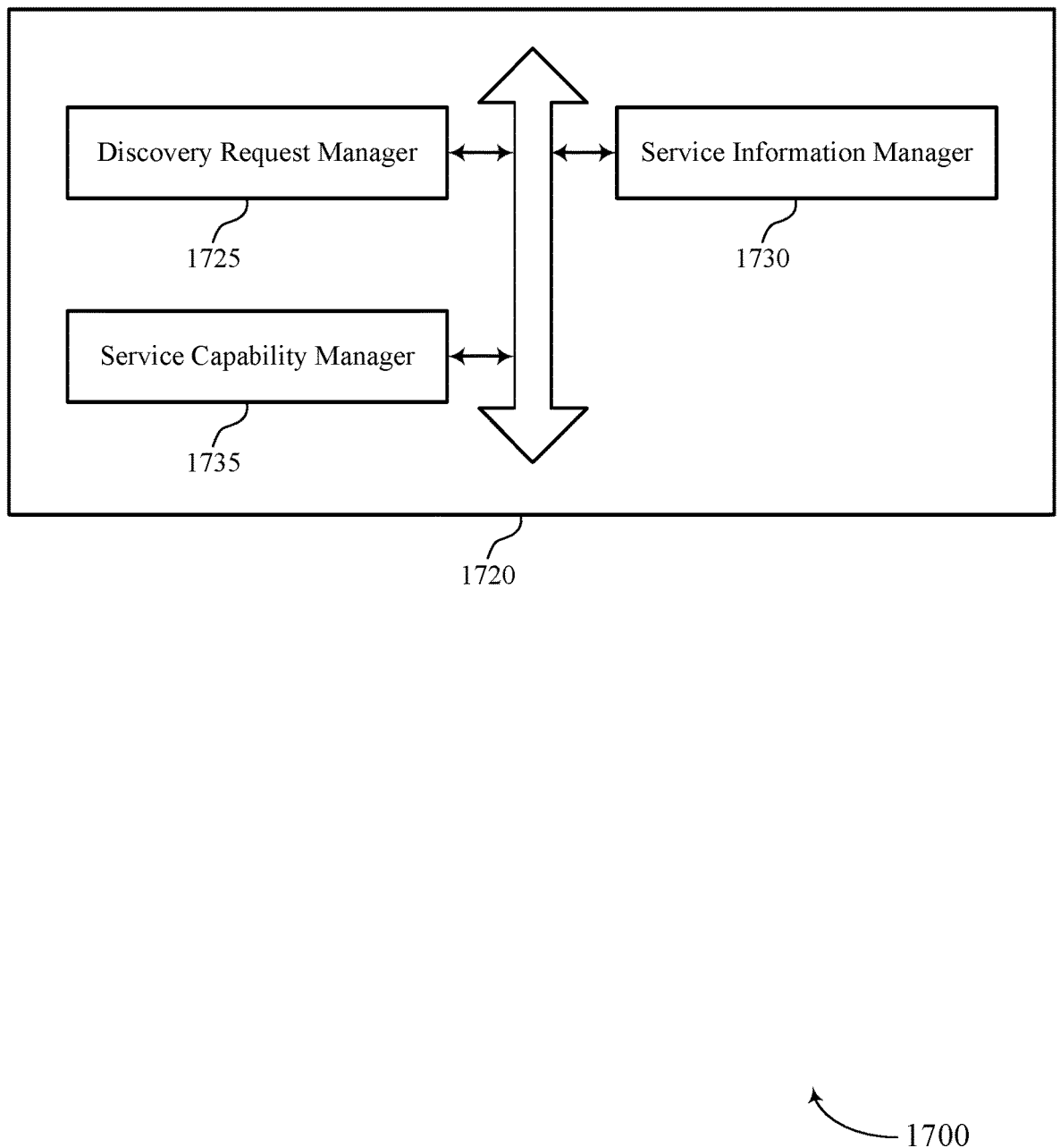
FIG. 17 shows a block diagram of a communications manager that supports discovery in a service-based wireless system in accordance with one or more aspects of the present disclosure.

FIG. 17 shows a block diagram 1700 of a communications manager 1720 that supports discovery in a service-based wireless system in accordance with one or more aspects of the present disclosure. The communications manager 1720 may be an example of aspects of a communications manager 1520, a communications manager 1620, or both, as described herein. The communications manager 1720, or various components thereof, may be an example of means for performing various aspects of discovery in a service-based wireless system as described herein. For example, the communications manager 1720 may include a discovery request manager 1725, a service information manager 1730, a service capability manager 1735, or any combination thereof. Each of these components may communicate, directly or indirectly, with one another (e.g., via one or more buses).

The communications manager 1720 may support wireless communications at a core network discovery service in accordance with examples as disclosed herein. The discovery request manager 1725 may be configured as or otherwise support a means for receiving, from a UE via a DU, a discovery request including routing information associated with the core network discovery service, the core network discovery service for a set of core network services offered by a service-based network configured to interface with a RAN associated with the DU. The service information manager 1730 may be configured as or otherwise support a means for transmitting, to the DU for relay to the UE and in response to the discovery request, service information associated with the set of core network services.

In some examples, to support receiving the discovery request, the service capability manager 1735 may be configured as or otherwise support a means for receiving an indication of one or more requested service capabilities, where the service information includes a list of a subset of core network services of the set of core network services associated with the one or more requested service capabilities.

In some examples, to support receiving the discovery request, the discovery request manager 1725 may be configured as or otherwise support a means for receiving an indication of a subset of core network services of the set of core network services, where the service information includes, for each of the subset of core network services, one or more of core network service dependency information, a service capability, a network address, or a network location.

In some examples, to support transmitting the service information, the service information manager 1730 may be configured as or otherwise support a means for transmitting an indication of one or more of core network service dependency information, a service capability, or a network location associated with one or more of core network services of the set of core network services.

In some examples, the routing information is associated with (e.g., for) a proxy service that is configured to route the discovery request to the core network discovery service and to route the service information to the UE via the DU. In some examples, receiving the discovery request includes receiving the discovery request from the DU via the proxy service. In some examples, transmitting the service information to the DU includes transmitting the service information via the proxy service.

Figure 18:
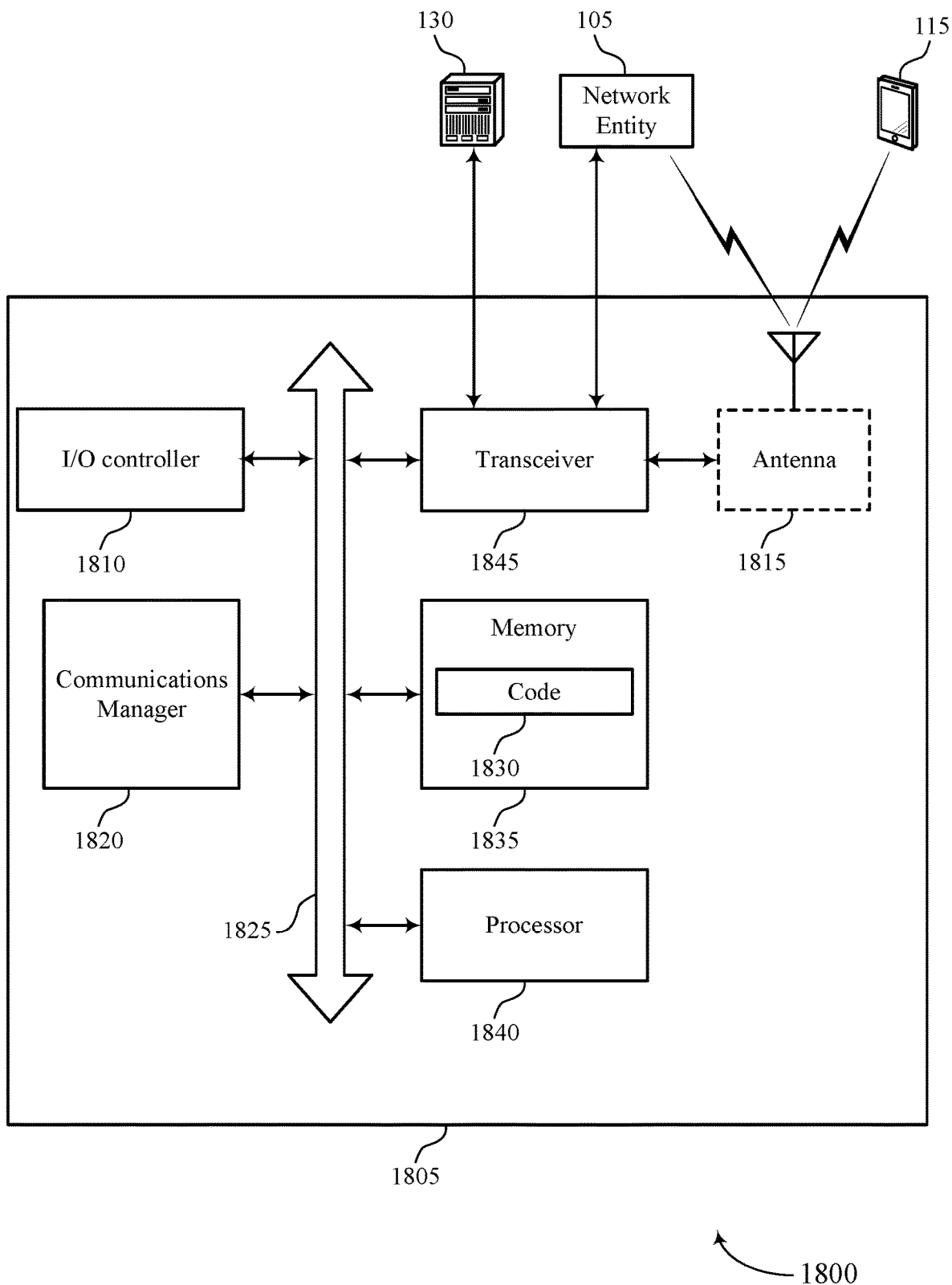
FIG. 18 shows a diagram of a system including a device that supports discovery in a service-based wireless system in accordance with one or more aspects of the present disclosure.

FIG. 18 shows a diagram of a system 1800 including a device 1805 that supports discovery in a service-based wireless system in accordance with one or more aspects of the present disclosure. The device 1805 may be an example of or include the components of a device 1505, a device 1605, or a discovery service 230 (e.g., a core network discovery service) as described herein. The device 1805 may include components for bi-directional voice and data communications including components for transmitting and receiving communications, such as a communications manager 1820, an I/O controller 1810, an antenna 1815, code 1830, a memory 1835, a processor 1840, and a transceiver 1845. These components may be in electronic communication or otherwise coupled (e.g., operatively, communicatively, functionally, electronically, electrically) via one or more buses (e.g., a bus 1825).

The I/O controller 1810 may manage input and output signals for the device 1805. The I/O controller 1810 may also manage peripherals not integrated into the device 1805. In some cases, the I/O controller 1810 may represent a physical connection or port to an external peripheral. In some cases, the I/O controller 1810 may utilize an operating system such as iOS®, ANDROID®, MS-DOS®, MS-WINDOWS®, OS/2®, UNIX®, LINUX®, or another known operating system. Additionally, or alternatively, the I/O controller 1810 may represent or interact with a modem, a keyboard, a mouse, a touchscreen, or a similar device. In some cases, the I/O controller 1810 may be implemented as part of a processor, such as the processor 1840. In some cases, a user may interact with the device 1805 via the I/O controller 1810 or via hardware components controlled by the I/O controller 1810.

The memory 1835 may include RAM and ROM. The memory 1835 may store computer-readable, computer-executable code 1830 including instructions that, when executed by the processor 1840, cause the device 1805 to perform various functions described herein. The code 1830 may be stored in a non-transitory computer-readable medium such as system memory or another type of memory. In some cases, the code 1830 may not be directly executable by the processor 1840 but may cause a computer (e.g., when compiled and executed) to perform functions described herein. In some cases, the memory 1835 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1835) to cause the device 1805 to perform various functions (e.g., functions or tasks supporting discovery in a service-based wireless system). For example, the device 1805 or a component of the device 1805 may include a processor 1840 and memory 1835 coupled with or to the processor 1840, the processor 1840 and memory 1835 configured to perform various functions described herein.

In some cases, the device 1805 may include a single antenna 1815. However, in some other cases, the device 1805 may have more than one antenna 1815, which may be capable of concurrently transmitting or receiving multiple wireless transmissions. The transceiver 1845 may communicate bi-directionally, via the one or more antennas 1815, wired, or wireless links as described herein. For example, the transceiver 1845 may represent a wireless transceiver and may communicate bi-directionally with another wireless transceiver. The transceiver 1845 may also include a modem to modulate the packets, to provide the modulated packets to one or more antennas 1815 for transmission, and to demodulate packets received from the one or more antennas 1815. The transceiver 1845, or the transceiver 1845 and one or more antennas 1815, may be an example of a transmitter 1515, a transmitter 1615, a receiver 1510, a receiver 1610, or any combination thereof or component thereof, as described herein.

The communications manager 1820 may support wireless communications at a core network discovery service in accordance with examples as disclosed herein. For example, the communications manager 1820 may be configured as or otherwise support a means for receiving, from a UE via a DU, a discovery request including routing information associated with the core network discovery service, the core network discovery service for a set of core network services offered by a service-based network configured to interface with a RAN associated with the DU. The communications manager 1820 may be configured as or otherwise support a means for transmitting, to the DU for relay to the UE and in response to the discovery request, service information associated with the set of core network services.

By including or configuring the communications manager 1820 in accordance with examples as described herein, the device 1805 may support techniques for improved communication reliability, reduced latency, improved user experience related to reduced processing, reduced power consumption, more efficient utilization of communication resources, improved coordination between devices, and improved utilization of processing capability.

In some examples, the communications manager 1820 may be configured to perform various operations (e.g., receiving, monitoring, transmitting) using or otherwise in cooperation with the transceiver 1845, the one or more antennas 1815, or any combination thereof. Although the communications manager 1820 is illustrated as a separate component, in some examples, one or more functions described with reference to the communications manager 1820 may be supported by or performed by the processor 1840, the memory 1835, the code 1830, or any combination thereof. For example, the code 1830 may include instructions executable by the processor 1840 to cause the device 1805 to perform various aspects of discovery in a service-based wireless system as described herein, or the processor 1840 and the memory 1835 may be otherwise configured to perform or support such operations.

Figure 19:
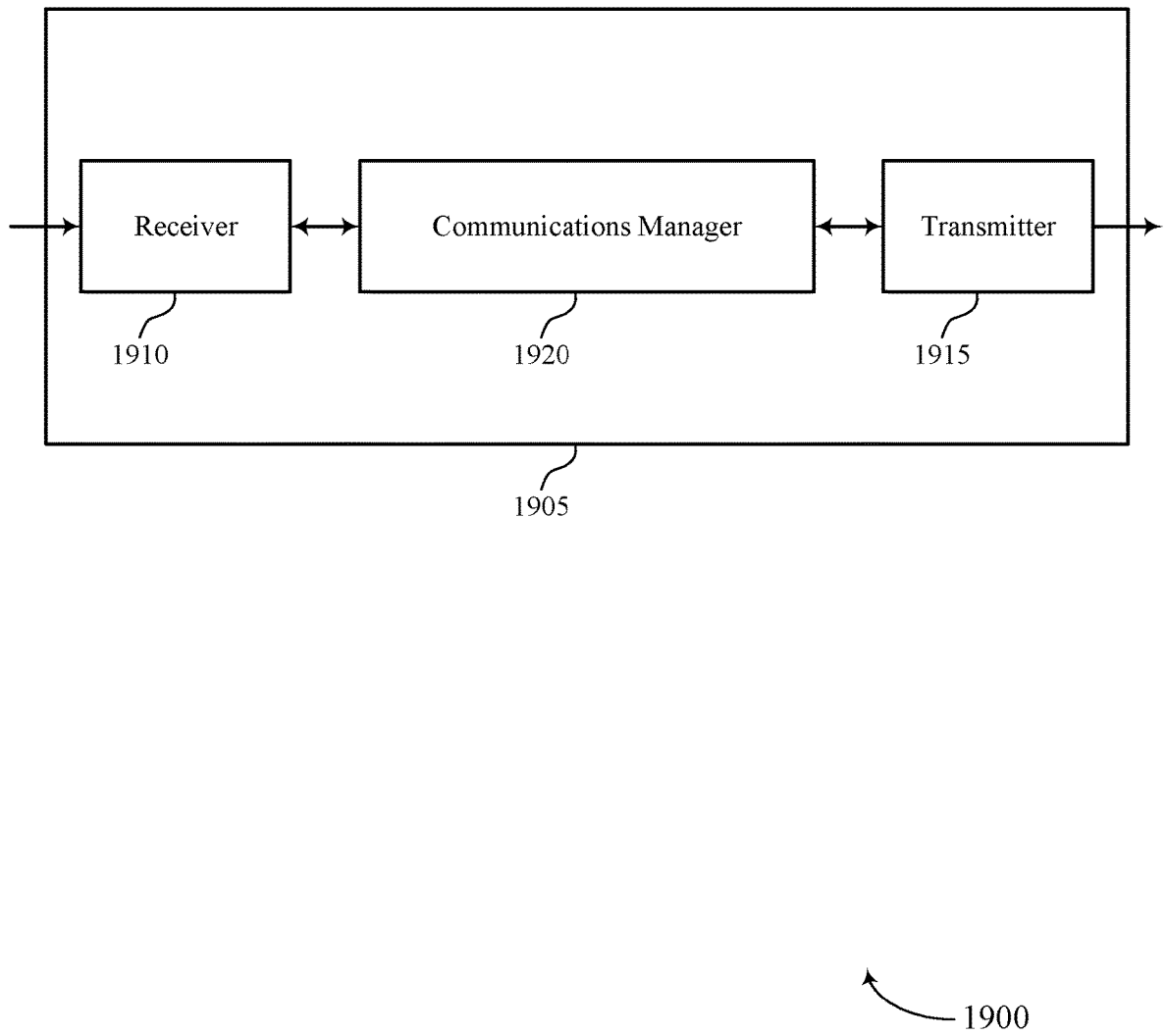
FIGS. 19 and 20 show block diagrams of devices that support discovery in a service-based wireless system in accordance with one or more aspects of the present disclosure.

FIG. 19 shows a block diagram 1900 of a device 1905 that supports discovery in a service-based wireless system in accordance with one or more aspects of the present disclosure. The device 1905 may be an example of aspects of a proxy service 235 as described herein. The device 1905 may include a receiver 1910, a transmitter 1915, and a communications manager 1920. The device 1905 may also include a processor. Each of these components may be in communication with one another (e.g., via one or more buses).

The receiver 1910 may provide a means for receiving information such as packets, user data, control information, or any combination thereof associated with various information channels (e.g., control channels, data channels, information channels related to discovery in a service-based wireless system). Information may be passed on to other components of the device 1905. The receiver 1910 may utilize a single antenna or a set of multiple antennas.

The transmitter 1915 may provide a means for transmitting signals generated by other components of the device 1905. For example, the transmitter 1915 may transmit information such as packets, user data, control information, or any combination thereof associated with various information channels (e.g., control channels, data channels, information channels related to discovery in a service-based wireless system). In some examples, the transmitter 1915 may be co-located with a receiver 1910 in a transceiver module. The transmitter 1915 may utilize a single antenna or a set of multiple antennas.

The communications manager 1920, the receiver 1910, the transmitter 1915, or various combinations thereof or various components thereof may be examples of means for performing various aspects of discovery in a service-based wireless system as described herein. For example, the communications manager 1920, the receiver 1910, the transmitter 1915, or various combinations or components thereof may support a method for performing one or more of the functions described herein.

In some examples, the communications manager 1920, the receiver 1910, the transmitter 1915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1920, the receiver 1910, the transmitter 1915, or various combinations or components thereof may be implemented in code (e.g., as communications management software or firmware) executed by a processor. If implemented in code executed by a processor, the functions of the communications manager 1920, the receiver 1910, the transmitter 1915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1920 may be configured to perform various operations (e.g., receiving, obtaining, monitoring, outputting, transmitting) using or otherwise in cooperation with the receiver 1910, the transmitter 1915, or both. For example, the communications manager 1920 may receive information from the receiver 1910, send information to the transmitter 1915, or be integrated in combination with the receiver 1910, the transmitter 1915, or both to obtain information, output information, or perform various other operations as described herein.

The communications manager 1920 may support wireless communications at a proxy service in accordance with examples as disclosed herein. For example, the communications manager 1920 may be configured as or otherwise support a means for receiving, from a UE via a DU, a discovery request including routing information associated with the proxy service. The communications manager 1920 may be configured as or otherwise support a means for transmitting the discovery request to a core network discovery service associated with a set of core network services offered by a service-based network configured to interface with a RAN associated with the DU. The communications manager 1920 may be configured as or otherwise support a means for receiving, from the core network discovery service and in response to the discovery request, service information associated with the set of core network services. The communications manager 1920 may be configured as or otherwise support a means for transmitting the service information to the DU for relay to the UE.

By including or configuring the communications manager 1920 in accordance with examples as described herein, the device 1905 (e.g., a processor controlling or otherwise coupled with the receiver 1910, the transmitter 1915, the communications manager 1920, or a combination thereof) may support techniques for reduced processing, reduced power consumption, and more efficient utilization of communication resources.

Figure 20:
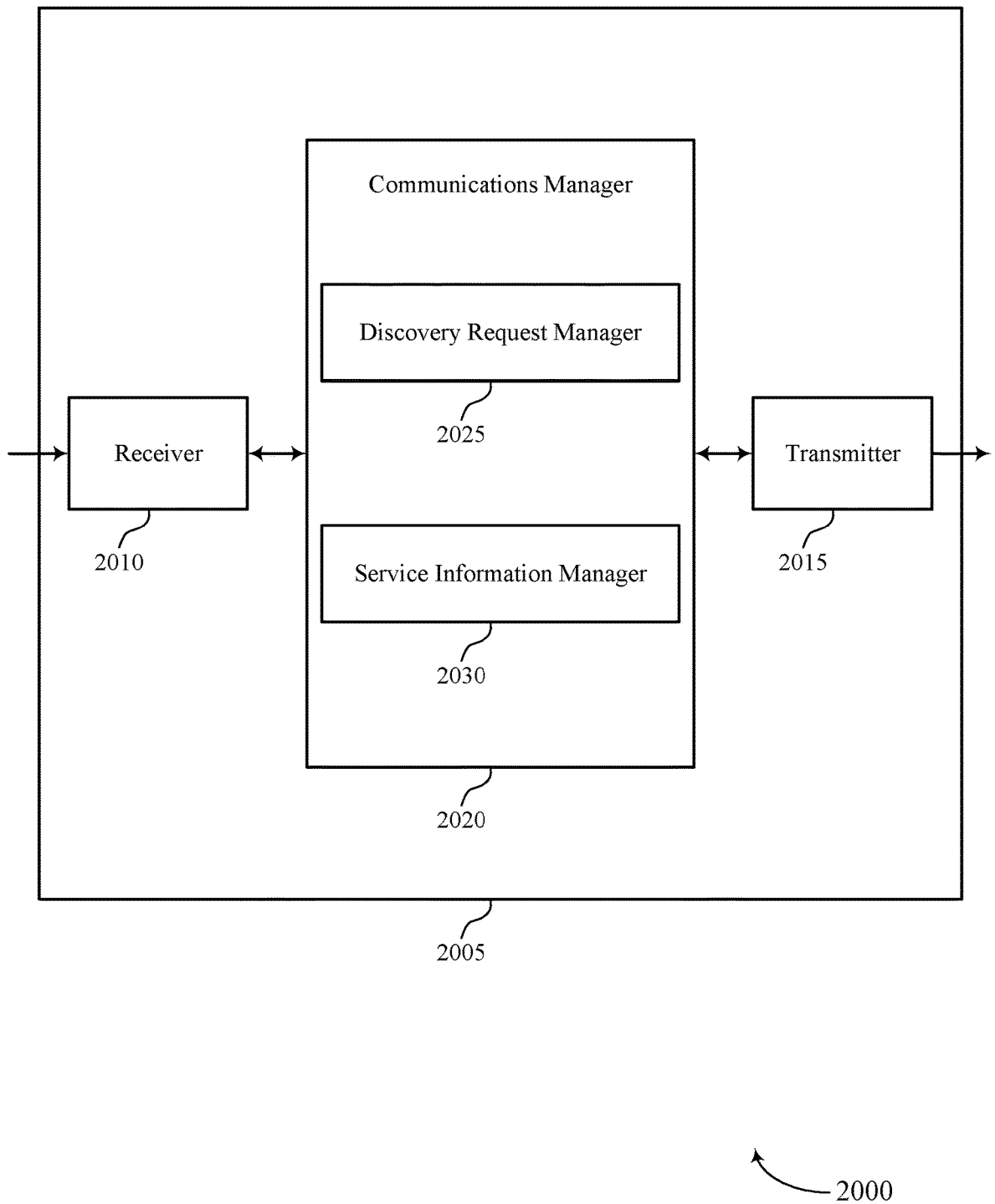

FIG. 20 shows a block diagram 2000 of a device 2005 that supports discovery in a service-based wireless system in accordance with one or more aspects of the present disclosure. The device 2005 may be an example of aspects of a device 1905 or a proxy service 235 as described herein. The device 2005 may include a receiver 2010, a transmitter 2015, and a communications manager 2020. The device 2005 may also include a processor. Each of these components may be in communication with one another (e.g., via one or more buses).

The receiver 2010 may provide a means for receiving information such as packets, user data, control information, or any combination thereof associated with various information channels (e.g., control channels, data channels, information channels related to discovery in a service-based wireless system). Information may be passed on to other components of the device 2005. The receiver 2010 may utilize a single antenna or a set of multiple antennas.

The transmitter 2015 may provide a means for transmitting signals generated by other components of the device 2005. For example, the transmitter 2015 may transmit information such as packets, user data, control information, or any combination thereof associated with various information channels (e.g., control channels, data channels, information channels related to discovery in a service-based wireless system). In some examples, the transmitter 2015 may be co-located with a receiver 2010 in a transceiver module. The transmitter 2015 may utilize a single antenna or a set of multiple antennas.

The device 2005, or various components thereof, may be an example of means for performing various aspects of discovery in a service-based wireless system as described herein. For example, the communications manager 2020 may include a discovery request manager 2025 a service information manager 2030, or any combination thereof. The communications manager 2020 may be an example of aspects of a communications manager 1920 as described herein. In some examples, the communications manager 2020, or various components thereof, may be configured to perform various operations (e.g., receiving, obtaining, monitoring, outputting, transmitting) using or otherwise in cooperation with the receiver 2010, the transmitter 2015, or both. For example, the communications manager 2020 may receive information from the receiver 2010, send information to the transmitter 2015, or be integrated in combination with the receiver 2010, the transmitter 2015, or both to obtain information, output information, or perform various other operations as described herein.

The communications manager 2020 may support wireless communications at a proxy service in accordance with examples as disclosed herein. The discovery request manager 2025 may be configured as or otherwise support a means for receiving, from a UE via a DU, a discovery request including routing information associated with the proxy service. The discovery request manager 2025 may be configured as or otherwise support a means for transmitting the discovery request to a core network discovery service associated with a set of core network services offered by a service-based network configured to interface with a RAN associated with the DU. The service information manager 2030 may be configured as or otherwise support a means for receiving, from the core network discovery service and in response to the discovery request, service information associated with the set of core network services. The service information manager 2030 may be configured as or otherwise support a means for transmitting the service information to the DU for relay to the UE.

Figure 21:
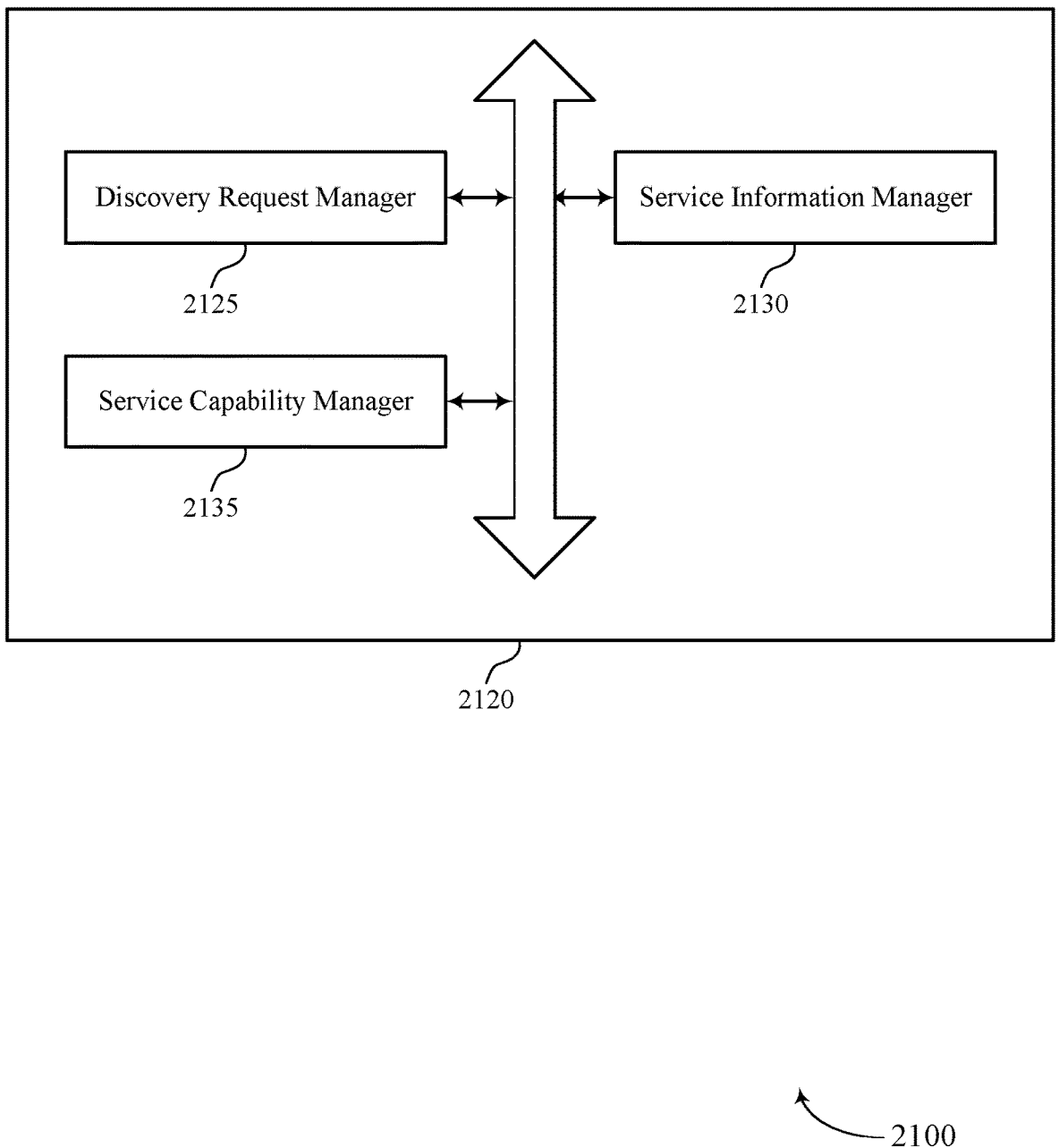
FIG. 21 shows a block diagram of a communications manager that supports discovery in a service-based wireless system in accordance with one or more aspects of the present disclosure.

FIG. 21 shows a block diagram 2100 of a communications manager 2120 that supports discovery in a service-based wireless system in accordance with one or more aspects of the present disclosure. The communications manager 2120 may be an example of aspects of a communications manager 1920, a communications manager 2020, or both, as described herein. The communications manager 2120, or various components thereof, may be an example of means for performing various aspects of discovery in a service-based wireless system as described herein. For example, the communications manager 2120 may include a discovery request manager 2125, a service information manager 2130, a service capability manager 2135, or any combination thereof. Each of these components may communicate, directly or indirectly, with one another (e.g., via one or more buses).

The communications manager 2120 may support wireless communications at a proxy service in accordance with examples as disclosed herein. The discovery request manager 2125 may be configured as or otherwise support a means for receiving, from a UE via a DU, a discovery request including routing information associated with the proxy service. In some examples, the discovery request manager 2125 may be configured as or otherwise support a means for transmitting the discovery request to a core network discovery service associated with a set of core network services offered by a service-based network configured to interface with a RAN associated with the DU. The service information manager 2130 may be configured as or otherwise support a means for receiving, from the core network discovery service and in response to the discovery request, service information associated with the set of core network services. In some examples, the service information manager 2130 may be configured as or otherwise support a means for transmitting the service information to the DU for relay to the UE.

In some examples, to support receiving the discovery request, the service capability manager 2135 may be configured as or otherwise support a means for receiving an indication of one or more requested service capabilities, where the service information includes a list of a subset of core network services of the set of core network services associated with the one or more requested service capabilities.

In some examples, to support receiving the discovery request, the service information manager 2130 may be configured as or otherwise support a means for receiving an indication of a subset of core network services of the set of core network services, where the service information includes, for each of the subset of core network services, one or more of core network service dependency information, a service capability, a network address, or a network location.

In some examples, the service information includes one or more of core network service dependency information, a service capability, or a network location associated with one or more of core network services of the set of core network services.

Figure 22:
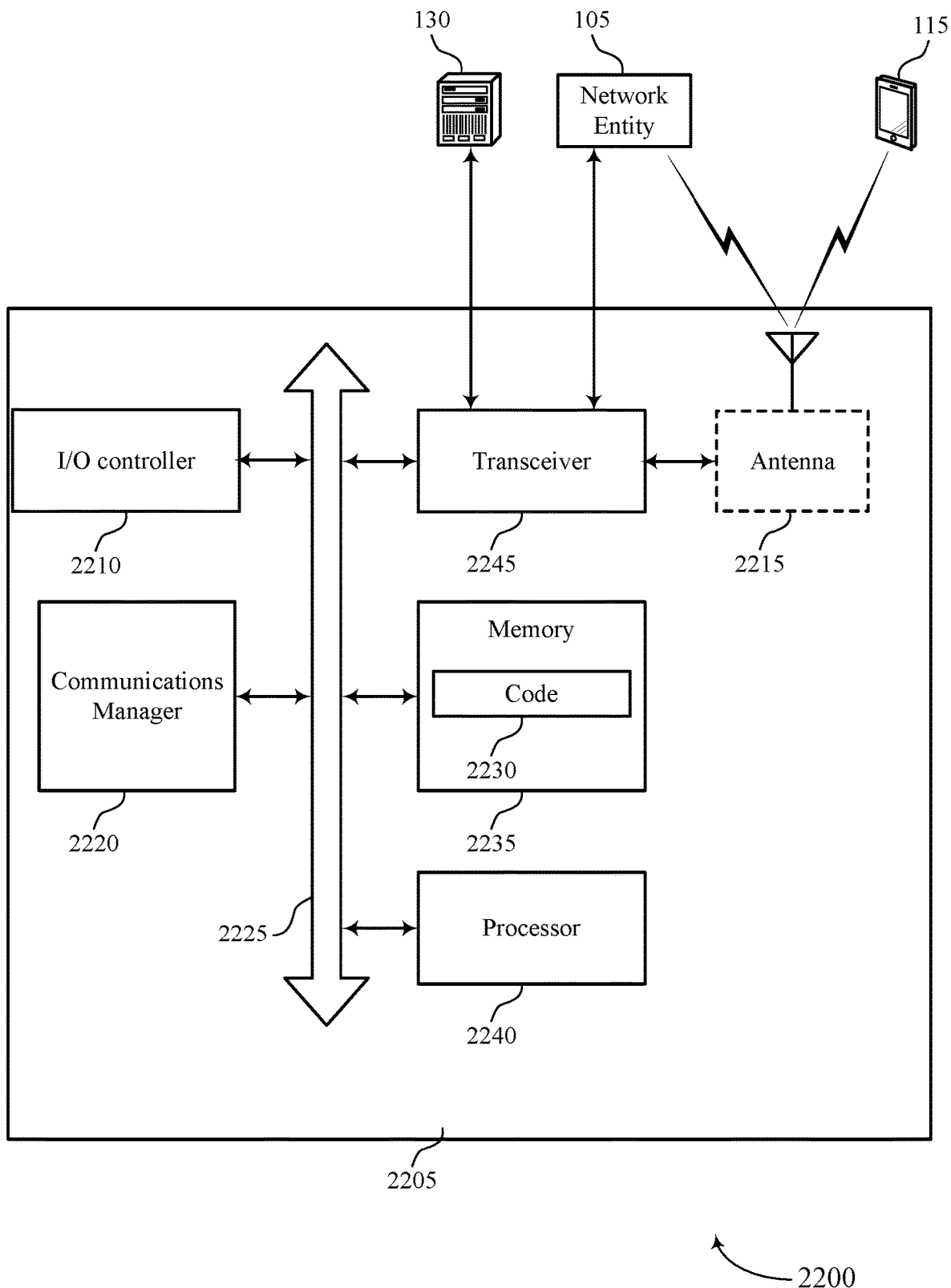
FIG. 22 shows a diagram of a system including a device that supports discovery in a service-based wireless system in accordance with one or more aspects of the present disclosure.

FIG. 22 shows a diagram of a system 2200 including a device 2205 that supports discovery in a service-based wireless system in accordance with one or more aspects of the present disclosure. The device 2205 may be an example of or include the components of a device 1905, a device 2005, or a proxy service 235 as described herein. The device 2205 may include components for bi-directional voice and data communications including components for transmitting and receiving communications, such as a communications manager 2220, an I/O controller 2210, an antenna 2215, code 2230, a memory 2235, a processor 2240, and a transceiver 2245. These components may be in electronic communication or otherwise coupled (e.g., operatively, communicatively, functionally, electronically, electrically) via one or more buses (e.g., a bus 2225).

The I/O controller 2210 may manage input and output signals for the device 2205. The I/O controller 2210 may also manage peripherals not integrated into the device 2205. In some cases, the I/O controller 2210 may represent a physical connection or port to an external peripheral. In some cases, the I/O controller 2210 may utilize an operating system such as iOS®, ANDROID®, MS-DOS®, MS-WINDOWS®, OS/2®, UNIX®, LINUX®, or another known operating system. Additionally, or alternatively, the I/O controller 2210 may represent or interact with a modem, a keyboard, a mouse, a touchscreen, or a similar device. In some cases, the I/O controller 2210 may be implemented as part of a processor, such as the processor 2240. In some cases, a user may interact with the device 2205 via the I/O controller 2210 or via hardware components controlled by the I/O controller 2210.

The memory 2235 may include RAM and ROM. The memory 2235 may store computer-readable, computer-executable code 2230 including instructions that, when executed by the processor 2240, cause the device 2205 to perform various functions described herein. The code 2230 may be stored in a non-transitory computer-readable medium such as system memory or another type of memory. In some cases, the code 2230 may not be directly executable by the processor 2240 but may cause a computer (e.g., when compiled and executed) to perform functions described herein. In some cases, the memory 2235 may contain, among other things, a BIOS which may control basic hardware or software operation such as the interaction with peripheral components or devices.

The processor 2240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2240 may be configured to operate a memory array using a memory controller. In some other cases, a memory controller may be integrated into the processor 2240. The processor 2240 may be configured to execute computer-readable instructions stored in a memory (e.g., the memory 2235) to cause the device 2205 to perform various functions (e.g., functions or tasks supporting discovery in a service-based wireless system). For example, the device 2205 or a component of the device 2205 may include a processor 2240 and memory 2235 coupled with or to the processor 2240, the processor 2240 and memory 2235 configured to perform various functions described herein.

In some cases, the device 2205 may include a single antenna 2215. However, in some other cases, the device 2205 may have more than one antenna 2215, which may be capable of concurrently transmitting or receiving multiple wireless transmissions. The transceiver 2245 may communicate bi-directionally, via the one or more antennas 2215, wired, or wireless links as described herein. For example, the transceiver 2245 may represent a wireless transceiver and may communicate bi-directionally with another wireless transceiver. The transceiver 2245 may also include a modem to modulate the packets, to provide the modulated packets to one or more antennas 2215 for transmission, and to demodulate packets received from the one or more antennas 2215. The transceiver 2245, or the transceiver 2245 and one or more antennas 2215, may be an example of a transmitter 1915, a transmitter 2015, a receiver 1910, a receiver 2010, or any combination thereof or component thereof, as described herein.

The communications manager 2220 may support wireless communications at a proxy service in accordance with examples as disclosed herein. For example, the communications manager 2220 may be configured as or otherwise support a means for receiving, from a UE via a DU, a discovery request including routing information associated with the proxy service. The communications manager 2220 may be configured as or otherwise support a means for transmitting the discovery request to a core network discovery service associated with a set of core network services offered by a service-based network configured to interface with a RAN associated with the DU. The communications manager 2220 may be configured as or otherwise support a means for receiving, from the core network discovery service and in response to the discovery request, service information associated with the set of core network services. The communications manager 2220 may be configured as or otherwise support a means for transmitting the service information to the DU for relay to the UE.

By including or configuring the communications manager 2220 in accordance with examples as described herein, the device 2205 may support techniques for improved communication reliability, reduced latency, improved user experience related to reduced processing, reduced power consumption, more efficient utilization of communication resources, improved coordination between devices, and improved utilization of processing capability.

In some examples, the communications manager 2220 may be configured to perform various operations (e.g., receiving, monitoring, transmitting) using or otherwise in cooperation with the transceiver 2245, the one or more antennas 2215, or any combination thereof. Although the communications manager 2220 is illustrated as a separate component, in some examples, one or more functions described with reference to the communications manager 2220 may be supported by or performed by the processor 2240, the memory 2235, the code 2230, or any combination thereof. For example, the code 2230 may include instructions executable by the processor 2240 to cause the device 2205 to perform various aspects of discovery in a service-based wireless system as described herein, or the processor 2240 and the memory 2235 may be otherwise configured to perform or support such operations.

Figure 23:
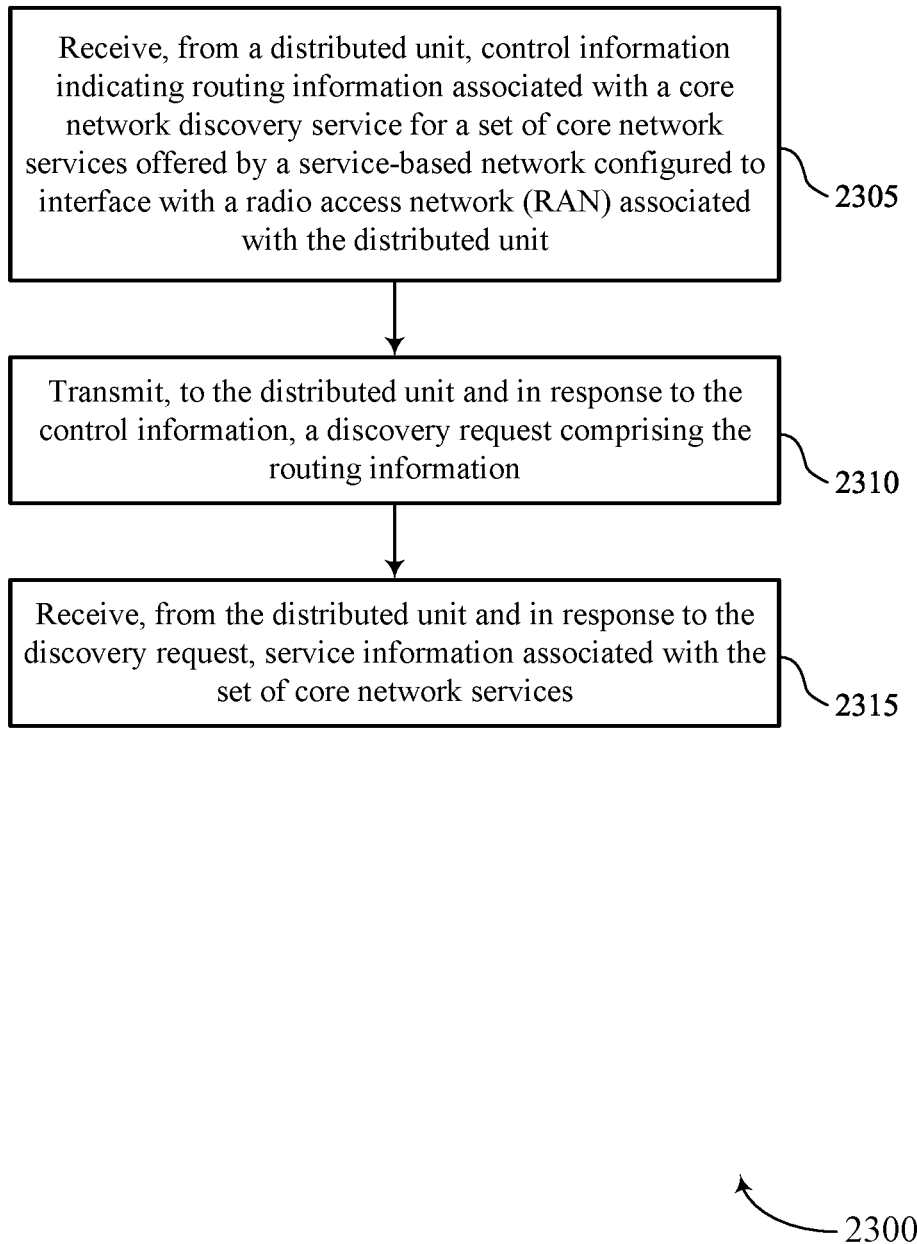
FIGS. 23 through 28 show flowcharts illustrating methods that support discovery in a service-based wireless system in accordance with one or more aspects of the present disclosure.

FIG. 23 shows a flowchart illustrating a method 2300 that supports discovery in a service-based wireless system in accordance with one or more aspects of the present disclosure. The operations of the method 2300 may be implemented by a UE or its components as described herein. For example, the operations of the method 2300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 2305, the method may include receiving, from a DU, control information indicating routing information associated with a core network discovery service for a set of core network services offered by a service-based network configured to interface with a RAN associated with the DU. The operations of 2305 may be performed in accordance with examples as disclosed herein. In some examples, aspects of the operations of 2305 may be performed by a discovery service manager 925 as described with reference to FIG. 9.

At 2310, the method may include transmitting, to the DU and in response to the control information, a discovery request including the routing information. The operations of 2310 may be performed in accordance with examples as disclosed herein. In some examples, aspects of the operations of 2310 may be performed by a discovery request manager 930 as described with reference to FIG. 9.

At 2315, the method may include receiving, from the DU and in response to the discovery request, service information associated with the set of core network services. The operations of 2315 may be performed in accordance with examples as disclosed herein. In some examples, aspects of the operations of 2315 may be performed by a service information manager 935 as described with reference to FIG. 9.

Figure 24:
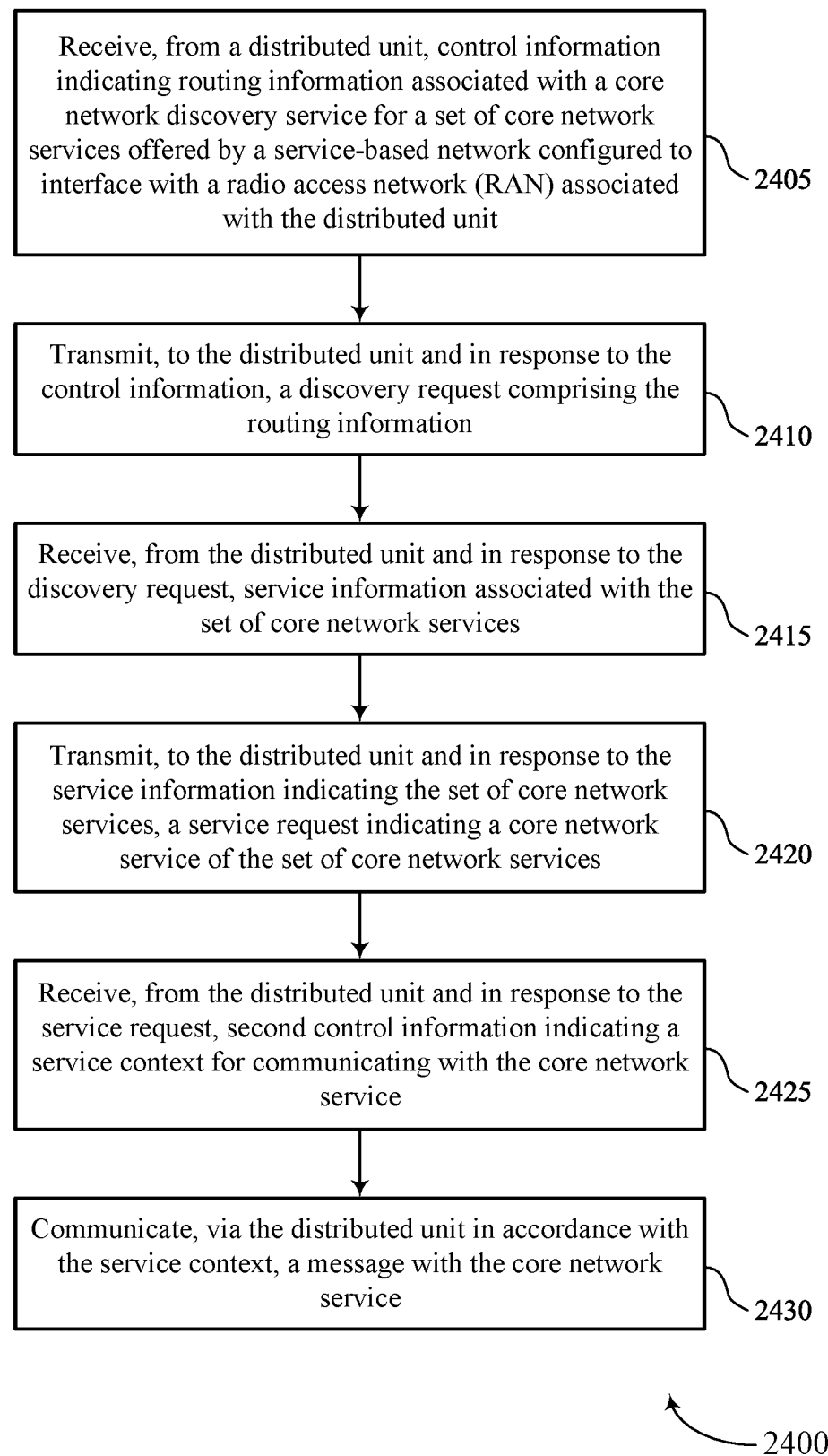

FIG. 24 shows a flowchart illustrating a method 2400 that supports discovery in a service-based wireless system in accordance with one or more aspects of the present disclosure. The operations of the method 2400 may be implemented by a UE or its components as described herein. For example, the operations of the method 2400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 2405, the method may include receiving, from a DU, control information indicating routing information associated with a core network discovery service for a set of core network services offered by a service-based network configured to interface with a RAN associated with the DU. The operations of 2405 may be performed in accordance with examples as disclosed herein. In some examples, aspects of the operations of 2405 may be performed by a discovery service manager 925 as described with reference to FIG. 9.

At 2410, the method may include transmitting, to the DU and in response to the control information, a discovery request including the routing information. The operations of 2410 may be performed in accordance with examples as disclosed herein. In some examples, aspects of the operations of 2410 may be performed by a discovery request manager 930 as described with reference to FIG. 9.

At 2415, the method may include receiving, from the DU and in response to the discovery request, service information associated with the set of core network services. The operations of 2415 may be performed in accordance with examples as disclosed herein. In some examples, aspects of the operations of 2415 may be performed by a service information manager 935 as described with reference to FIG. 9.

At 2420, the method may include transmitting, to the DU and in response to the service information indicating the set of core network services, a service request indicating a core network service of the set of core network services. The operations of 2420 may be performed in accordance with examples as disclosed herein. In some examples, aspects of the operations of 2420 may be performed by a service request manager 940 as described with reference to FIG. 9.

At 2425, the method may include receiving, from the DU and in response to the service request, second control information indicating a service context for communicating with the core network service. The operations of 2425 may be performed in accordance with examples as disclosed herein. In some examples, aspects of the operations of 2425 may be performed by a service context manager 945 as described with reference to FIG. 9.

At 2430, the method may include communicating, via the DU in accordance with the service context, a message with the core network service. The operations of 2430 may be performed in accordance with examples as disclosed herein. In some examples, aspects of the operations of 2430 may be performed by a core network service manager 950 as described with reference to FIG. 9.

Figure 25:
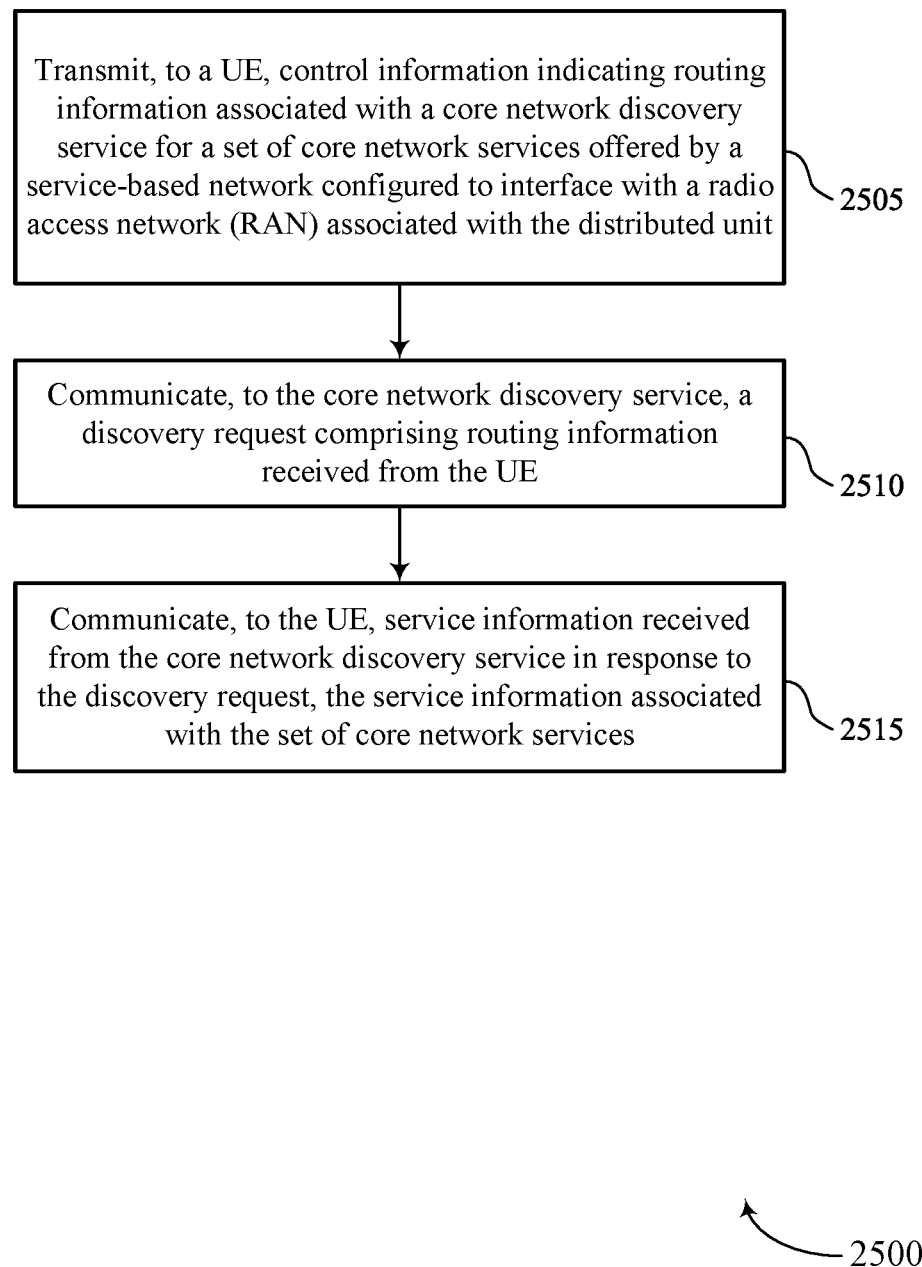

FIG. 25 shows a flowchart illustrating a method 2500 that supports discovery in a service-based wireless system in accordance with one or more aspects of the present disclosure. The operations of the method 2500 may be implemented by a DU or its components as described herein. For example, the operations of the method 2500 may be performed by a DU as described with reference to FIGS. 1 through 6 and 11 through 14. In some examples, a DU may execute a set of instructions to control the functional elements of the DU to perform the described functions. Additionally, or alternatively, the DU may perform aspects of the described functions using special-purpose hardware.

At 2505, the method may include transmitting, to a UE, control information indicating routing information associated with a core network discovery service for a set of core network services offered by a service-based network configured to interface with a RAN associated with the DU. The operations of 2505 may be performed in accordance with examples as disclosed herein. In some examples, aspects of the operations of 2505 may be performed by a discovery service manager 1325 as described with reference to FIG. 13.

At 2510, the method may include communicating, to the core network discovery service, a discovery request including routing information received from the UE. The operations of 2510 may be performed in accordance with examples as disclosed herein. In some examples, aspects of the operations of 2510 may be performed by a discovery request manager 1330 as described with reference to FIG. 13.

At 2515, the method may include communicating, to the UE, service information received from the core network discovery service in response to the discovery request, the service information associated with the set of core network services. The operations of 2515 may be performed in accordance with examples as disclosed herein. In some examples, aspects of the operations of 2515 may be performed by a service information manager 1335 as described with reference to FIG. 13.

Figure 26:
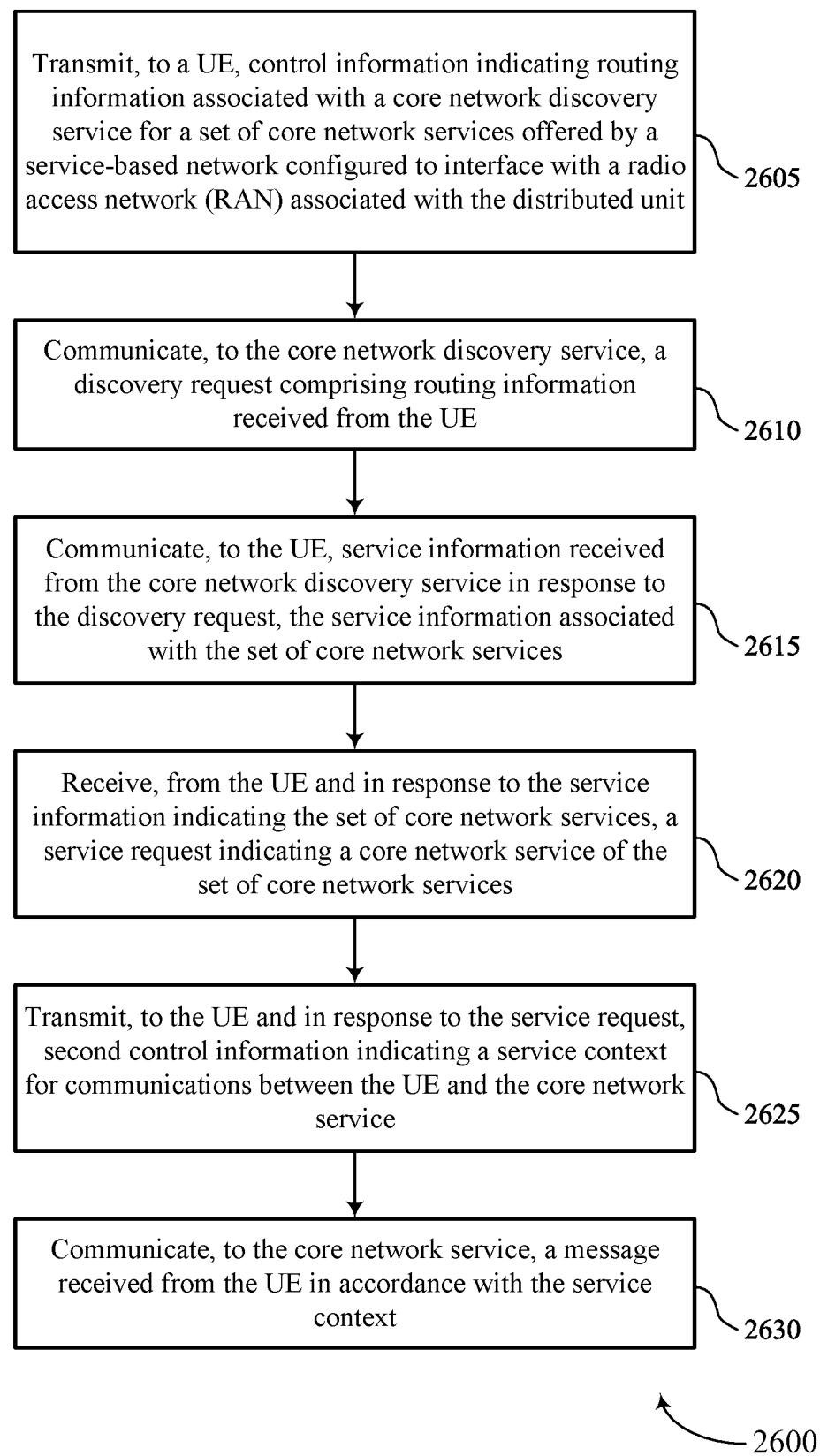

FIG. 26 shows a flowchart illustrating a method 2600 that supports discovery in a service-based wireless system in accordance with one or more aspects of the present disclosure. The operations of the method 2600 may be implemented by a DU or its components as described herein. For example, the operations of the method 2600 may be performed by a DU as described with reference to FIGS. 1 through 6 and 11 through 14. In some examples, a DU may execute a set of instructions to control the functional elements of the DU to perform the described functions. Additionally, or alternatively, the DU may perform aspects of the described functions using special-purpose hardware.

At 2605, the method may include transmitting, to a UE, control information indicating routing information associated with a core network discovery service for a set of core network services offered by a service-based network configured to interface with a RAN associated with the DU. The operations of 2605 may be performed in accordance with examples as disclosed herein. In some examples, aspects of the operations of 2605 may be performed by a discovery service manager 1325 as described with reference to FIG. 13.

At 2610, the method may include communicating, to the core network discovery service, a discovery request including routing information received from the UE. The operations of 2610 may be performed in accordance with examples as disclosed herein. In some examples, aspects of the operations of 2610 may be performed by a discovery request manager 1330 as described with reference to FIG. 13.

At 2615, the method may include communicating, to the UE, service information received from the core network discovery service in response to the discovery request, the service information associated with the set of core network services. The operations of 2615 may be performed in accordance with examples as disclosed herein. In some examples, aspects of the operations of 2615 may be performed by a service information manager 1335 as described with reference to FIG. 13.

At 2620, the method may include receiving, from the UE and in response to the service information indicating the set of core network services, a service request indicating a core network service of the set of core network services. The operations of 2620 may be performed in accordance with examples as disclosed herein. In some examples, aspects of the operations of 2620 may be performed by a service request manager 1340 as described with reference to FIG. 13.

At 2625, the method may include transmitting, to the UE and in response to the service request, second control information indicating a service context for communications between the UE and the core network service. The operations of 2625 may be performed in accordance with examples as disclosed herein. In some examples, aspects of the operations of 2625 may be performed by a service context manager 1345 as described with reference to FIG. 13.

At 2630, the method may include communicating, to the core network service, a message received from the UE in accordance with the service context. The operations of 2630 may be performed in accordance with examples as disclosed herein. In some examples, aspects of the operations of 2630 may be performed by a core network service manager 1350 as described with reference to FIG. 13.

Figure 27:
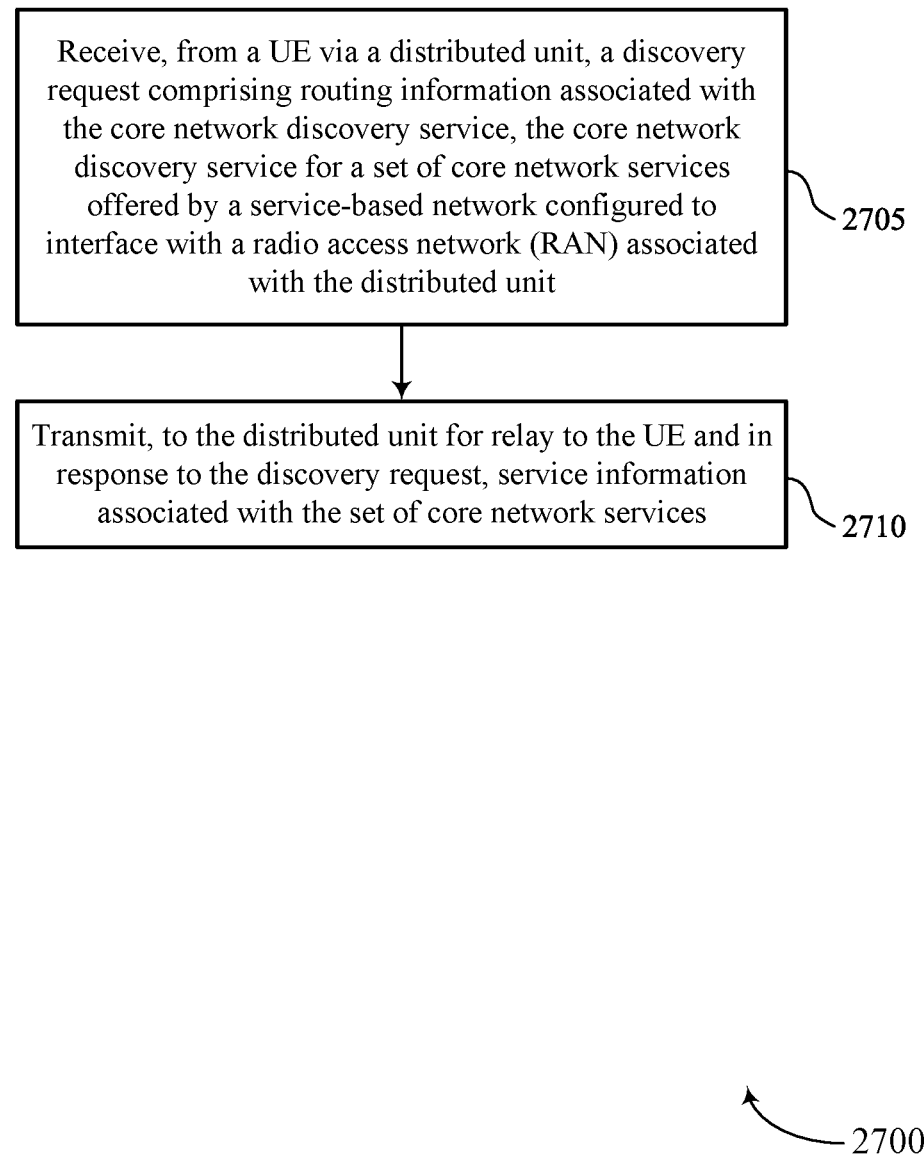

FIG. 27 shows a flowchart illustrating a method 2700 that supports discovery in a service-based wireless system in accordance with one or more aspects of the present disclosure. The operations of the method 2700 may be implemented by a core network discovery service or its components as described herein. For example, the operations of the method 2700 may be performed by a core network discovery service as described with reference to FIGS. 1 through 6 and 15 through 18. In some examples, a core network discovery service may execute a set of instructions to control the functional elements of the core network discovery service to perform the described functions. Additionally, or alternatively, the core network discovery service may perform aspects of the described functions using special-purpose hardware.

At 2705, the method may include receiving, from a UE via a DU, a discovery request including routing information associated with the core network discovery service, the core network discovery service for a set of core network services offered by a service-based network configured to interface with a RAN associated with the DU. The operations of 2705 may be performed in accordance with examples as disclosed herein. In some examples, aspects of the operations of 2705 may be performed by a discovery request manager 1725 as described with reference to FIG. 17.

At 2710, the method may include transmitting, to the DU for relay to the UE and in response to the discovery request, service information associated with the set of core network services. The operations of 2710 may be performed in accordance with examples as disclosed herein. In some examples, aspects of the operations of 2710 may be performed by a service information manager 1730 as described with reference to FIG. 17.

Figure 28:
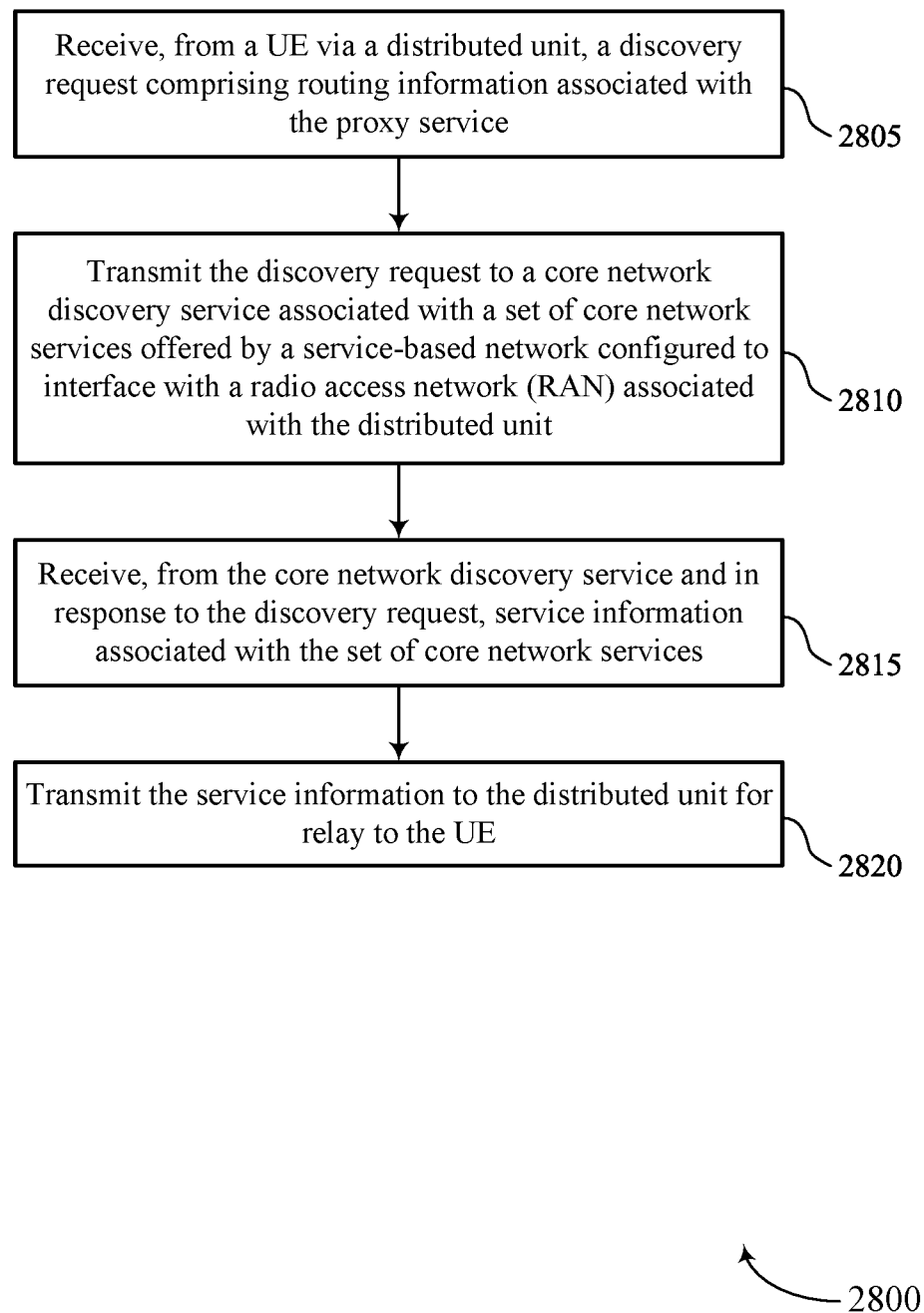

FIG. 28 shows a flowchart illustrating a method 2800 that supports discovery in a service-based wireless system in accordance with one or more aspects of the present disclosure. The operations of the method 2800 may be implemented by a proxy service or its components as described herein. For example, the operations of the method 2800 may be performed by a proxy service as described with reference to FIGS. 1 through 6 and 19 through 22. In some examples, a proxy service may execute a set of instructions to control the functional elements of the proxy service to perform the described functions. Additionally, or alternatively, the proxy service may perform aspects of the described functions using special-purpose hardware.

At 2805, the method may include receiving, from a UE via a DU, a discovery request including routing information associated with the proxy service. The operations of 2805 may be performed in accordance with examples as disclosed herein. In some examples, aspects of the operations of 2805 may be performed by a discovery request manager 2125 as described with reference to FIG. 21.

At 2810, the method may include transmitting the discovery request to a core network discovery service associated with a set of core network services offered by a service-based network configured to interface with a RAN associated with the DU. The operations of 2810 may be performed in accordance with examples as disclosed herein. In some examples, aspects of the operations of 2810 may be performed by a discovery request manager 2125 as described with reference to FIG. 21.

At 2815, the method may include receiving, from the core network discovery service and in response to the discovery request, service information associated with the set of core network services. The operations of 2815 may be performed in accordance with examples as disclosed herein. In some examples, aspects of the operations of 2815 may be performed by a service information manager 2130 as described with reference to FIG. 21.

At 2820, the method may include transmitting the service information to the DU for relay to the UE. The operations of 2820 may be performed in accordance with examples as disclosed herein. In some examples, aspects of the operations of 2820 may be performed by a service information manager 2130 as described with reference to FIG. 21.

The following provides an overview of aspects of the present disclosure:

Aspect 1: A method for wireless communication at a UE, comprising: receiving, from a DU, control information indicating routing information associated with a core network discovery service for a set of core network services offered by a service-based network configured to interface with a RAN associated with the DU; transmitting, to the DU and in response to the control information, a discovery request comprising the routing information; and receiving, from the DU and in response to the discovery request, service information associated with the set of core network services.

Aspect 2: The method of aspect 1, further comprising: transmitting, to the DU and in response to the service information indicating the set of core network services, a service request indicating a core network service of the set of core network services; receiving, from the DU and in response to the service request, second control information indicating a service context for communicating with the core network service; and communicating, via the DU in accordance with the service context, a message with the core network service.

Aspect 3: The method of aspect 2, wherein the service information comprises an indication of a dependency of the core network service on a second core network service, the method further comprising: transmitting, to the DU and based on the dependency, a second service request indicating the second core network service of the set of core network services; receiving, from the DU and in response to the second service request, third control information indicating a second service context for communicating with the second core network service; and communicating, via the DU and in accordance with the second service context, a second message with the second core network service, wherein communicating the message is based on communicating the second message.

Aspect 4: The method of any of aspects 1 through 3, wherein transmitting the discovery request comprises: transmitting an indication of one or more requested service capabilities, wherein the service information comprises a list of a subset of core network services of the set of core network services associated with the one or more requested service capabilities.

Aspect 5: The method of aspect 4, further comprising: transmitting, to the DU and in response to the service information, a service request indicating a selected core network service of the subset of core network services; receiving, from the DU in response to the service request, second control information indicating a service context for communicating with the selected core network service; and communicating, via the DU in accordance with the service context, a message with the selected core network service.

Aspect 6: The method of any of aspects 1 through 5, wherein the control information indicates the set of core network services, and wherein transmitting the discovery request comprises: transmitting an indication of a subset of core network services of the set of core network services, wherein the service information comprises, for each of the subset of core network services, one or more of core network service dependency information, a service capability, a network address, or a network location.

Aspect 7: The method of any of aspects 1 through 6, wherein receiving the service information comprises: receiving an indication of one or more of core network service dependency information, a service capability, or a network location associated with one or more of core network services of the set of core network services.

Aspect 8: The method of any of aspects 1 through 7, wherein the routing information is associated with a proxy service that is configured to route the discovery request to the core network discovery service.

Aspect 9: The method of any of aspects 1 through 8, wherein receiving the control information comprises: receiving an SIB message comprising the control information.

Aspect 10: The method of any of aspects 1 through 9, wherein the discovery request is transmitted to the DU for relay to a network address associated with the core network discovery service, the network address based on the routing information.

Aspect 11: The method of any of aspects 1 through 10, wherein each core network service of the set of core network services is associated with a respective application programming interface of a plurality of application programming interfaces.

Aspect 12: A method for wireless communications at a DU, comprising: transmitting, to a UE, control information indicating routing information associated with a core network discovery service for a set of core network services offered by a service-based network configured to interface with a RAN associated with the DU; communicating, to the core network discovery service, a discovery request comprising routing information received from the UE; and communicating, to the UE, service information received from the core network discovery service in response to the discovery request, the service information associated with the set of core network services.

Aspect 13: The method of aspect 12, further comprising: receiving, from the UE and in response to the service information indicating the set of core network services, a service request indicating a core network service of the set of core network services; transmitting, to the UE and in response to the service request, second control information indicating a service context for communications between the UE and the core network service; and communicating, to the core network service, a message received from the UE in accordance with the service context.

Aspect 14: The method of aspect 13, further comprising: receiving, from the UE and in response to the service information, a second service request indicating a second core network service of the set of core network services, wherein the service information comprises an indication of a dependency of the core network service on the second core network service; transmitting, to the UE and in response to the second service request, third control information indicating a second service context for communications between the UE and the second core network service; and communicating, to the second core network service, a second message received from the UE in accordance with the second service context, wherein communicating the message is based on communicating the second message.

Aspect 15: The method of any of aspects 12 through 14, wherein communicating the discovery request comprises:

receiving, from the UE, an indication of one or more requested service capabilities, wherein the service information comprises a list of a subset of core network services of the set of core network services associated with the one or more requested service capabilities.

Aspect 16: The method of aspect 15, further comprising: receiving, from the UE and in response to the service information, a service request indicating a selected core network service of the subset of core network services; transmitting, to the UE in response to the service request, second control information indicating a service context for communications between the UE and the selected core network service; and communicating, to the selected core network service, a message received from the UE in accordance with the service context.

Aspect 17: The method of any of aspects 12 through 16, wherein the control information indicates the set of core network services, and wherein communicating the discovery request further comprises: receiving, from the UE, an indication of a subset of core network services of the set of core network services, wherein the service information comprises, for each of the subset of core network services, one or more of core network service dependency information, a service capability, a network address, or a network location.

Aspect 18: The method of any of aspects 12 through 17, wherein communicating the service information comprises: transmitting, to the UE, an indication of one or more of core network service dependency information, a service capability, or a network location associated with one or more of core network services of the set of core network services.

Aspect 19: The method of any of aspects 12 through 18, wherein the routing information is associated with a proxy service that is configured to route the discovery request to the core network discovery service and to route the service information from the core network discovery service to the UE via the DU, and communicating the discovery request to the core network discovery service comprises transmitting the discovery request to the proxy service, and communicating the service information comprises receiving the service information via the proxy service.

Aspect 20: The method of any of aspects 12 through 19, wherein transmitting the control information comprises: transmitting an SIB message comprising the control information.

Aspect 21: The method of any of aspects 12 through 20, wherein each core network service of the set of core network services is associated with a respective application programming interface of a plurality of application programming interfaces.

Aspect 22: A method for wireless communications at a core network discovery service, comprising: receiving, from a UE via a DU, a discovery request comprising routing information associated with the core network discovery service, the core network discovery service for a set of core network services offered by a service-based network configured to interface with a RAN associated with the DU; and transmitting, to the DU for relay to the UE and in response to the discovery request, service information associated with the set of core network services.

Aspect 23: The method of aspect 22, wherein receiving the discovery request comprises: receiving an indication of one or more requested service capabilities, wherein the service information comprises a list of a subset of core network services of the set of core network services associated with the one or more requested service capabilities.

Aspect 24: The method of any of aspects 22 through 23, wherein receiving the discovery request comprises: receiving an indication of a subset of core network services of the set of core network services, wherein the service information comprises, for each of the subset of core network services, one or more of core network service dependency information, a service capability, a network address, or a network location.

Aspect 25: The method of any of aspects 22 through 24, wherein transmitting the service information comprises: transmitting an indication of one or more of core network service dependency information, a service capability, or a network location associated with one or more of core network services of the set of core network services.

Aspect 26: The method of any of aspects 22 through 25, wherein the routing information is associated with a proxy service that is configured to route the discovery request to the core network discovery service and to route the service information to the UE via the DU, receiving the discovery request comprises receiving the discovery request from the DU via the proxy service, and transmitting the service information to the DU comprises transmitting the service information via the proxy service.

Aspect 27: A method for wireless communications at a proxy service, comprising: receiving, from a UE via a DU, a discovery request comprising routing information associated with the proxy service; transmitting the discovery request to a core network discovery service associated with a set of core network services offered by a service-based network configured to interface with a RAN associated with the DU; receiving, from the core network discovery service and in response to the discovery request, service information associated with the set of core network services; and transmitting the service information to the DU for relay to the UE.

Aspect 28: The method of aspect 27, wherein receiving the discovery request comprises: receiving an indication of one or more requested service capabilities, wherein the service information comprises a list of a subset of core network services of the set of core network services associated with the one or more requested service capabilities.

Aspect 29: The method of any of aspects 27 through 28, wherein receiving the discovery request comprises: receiving an indication of a subset of core network services of the set of core network services, wherein the service information comprises, for each of the subset of core network services, one or more of core network service dependency information, a service capability, a network address, or a network location.

Aspect 30: The method of any of aspects 27 through 29, wherein the service information comprises one or more of core network service dependency information, a service capability, or a network location associated with one or more of core network services of the set of core network services.

Aspect 31: An apparatus for wireless communication at a UE, comprising a processor; memory coupled with the processor; and instructions stored in the memory and executable by the processor to cause the apparatus to perform a method of any of aspects 1 through 11.

Aspect 32: An apparatus for wireless communication at a UE, comprising at least one means for performing a method of any of aspects 1 through 11.

Aspect 33: A non-transitory computer-readable medium storing code for wireless communication at a UE, the code comprising instructions executable by a processor to perform a method of any of aspects 1 through 11.

Aspect 34: An apparatus for wireless communications at a DU, comprising a processor; memory coupled with the processor; and instructions stored in the memory and executable by the processor to cause the apparatus to perform a method of any of aspects 12 through 21.

Aspect 35: An apparatus for wireless communications at a DU, comprising at least one means for performing a method of any of aspects 12 through 21.

Aspect 36: A non-transitory computer-readable medium storing code for wireless communications at a DU, the code comprising instructions executable by a processor to perform a method of any of aspects 12 through 21.

Aspect 37: An apparatus for wireless communications at a core network discovery service, comprising a processor; memory coupled with the processor; and instructions stored in the memory and executable by the processor to cause the apparatus to perform a method of any of aspects 22 through 26.

Aspect 38: An apparatus for wireless communications at a core network discovery service, comprising at least one means for performing a method of any of aspects 22 through 26.

Aspect 39: A non-transitory computer-readable medium storing code for wireless communications at a core network discovery service, the code comprising instructions executable by a processor to perform a method of any of aspects 22 through 26.

Aspect 40: An apparatus for wireless communications at a proxy service, comprising a processor; memory coupled with the processor; and instructions stored in the memory and executable by the processor to cause the apparatus to perform a method of any of aspects 27 through 30.

Aspect 41: An apparatus for wireless communications at a proxy service, comprising at least one means for performing a method of any of aspects 27 through 30.

Aspect 42: A non-transitory computer-readable medium storing code for wireless communications at a proxy service, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a distributed unit, control information indicating routing information associated with a core network discovery service for a set of core network services offered by a service-based network configured to interface with a radio access network (RAN) associated with the distributed unit;
   transmitting, to the distributed unit and in response to the control information, a discovery request comprising the routing information; and
   receiving, from the distributed unit and in response to the discovery request, service information associated with the set of core network services, the service information comprising a respective network address or respective proxy information for accessing each of the set of core network services.

2. The method of claim 1, further comprising:
   transmitting, to the distributed unit and in response to the service information indicating the set of core network services, a service request indicating a core network service of the set of core network services;
   receiving, from the distributed unit and in response to the service request, second control information indicating a service context for communicating with the core network service; and
   communicating, via the distributed unit in accordance with the service context, a message with the core network service.

3. The method of claim 2, wherein the service information comprises an indication of a dependency of the core network service on a second core network service, the method further comprising:
   transmitting, to the distributed unit and based on the dependency, a second service request indicating the second core network service of the set of core network services;
   receiving, from the distributed unit and in response to the second service request, third control information indicating a second service context for communicating with the second core network service; and
   communicating, via the distributed unit and in accordance with the second service context, a second message with the second core network service, wherein communicating the message is based on communicating the second message.

4. The method of claim 1, wherein transmitting the discovery request comprises:
   transmitting an indication of one or more requested service capabilities, wherein the service information comprises a list of a subset of core network services of the set of core network services associated with the one or more requested service capabilities.

5. The method of claim 4, further comprising:
   transmitting, to the distributed unit and in response to the service information, a service request indicating a selected core network service of the subset of core network services;
   receiving, from the distributed unit in response to the service request, second control information indicating a service context for communicating with the selected core network service; and
   communicating, via the distributed unit in accordance with the service context, a message with the selected core network service.

6. The method of claim 1, wherein the control information indicates the set of core network services, and wherein transmitting the discovery request comprises:
   transmitting an indication of a subset of core network services of the set of core network services, wherein the service information comprises, for each of the subset of core network services, one or more of core network service dependency information, a service capability or a network location.

7. The method of claim 1, wherein receiving the service information comprises:
   receiving an indication of one or more of core network service dependency information, a service capability, or a network location associated with one or more of core network services of the set of core network services.

8. The method of claim 1, wherein the routing information is associated with a proxy service that is configured to route the discovery request to the core network discovery service.

9. The method of claim 1, wherein receiving the control information comprises:
   receiving a system information block message comprising the control information.

10. The method of claim 1, wherein the discovery request is transmitted to the distributed unit for relay to a network address associated with the core network discovery service, the network address based on the routing information.

11. The method of claim 1, wherein each core network service of the set of core network services is associated with a respective application programming interface of a plurality of application programming interfaces.

12. The method of claim 1, wherein each of the set of core network services are hosted at one or more components of a cloud-based network, and wherein each of the set of core network services are associated with the respective network address.

13. The method of claim 1, wherein each respective network address is one of an internet protocol IP address, a transmission control protocol port, or a Hypertext Transfer Protocol port associated with each core network service.

14. The method of claim 2, wherein transmission of the service request is based at least in part on the respective network address or proxy information for accessing the core network service.

15. A method for wireless communications at a distributed unit, comprising:
transmitting, to a user equipment (UE), control information indicating routing information associated with a core network discovery service for a set of core network services offered by a service-based network configured to interface with a radio access network (RAN) associated with the distributed unit;
communicating, to the core network discovery service, a discovery request comprising routing information received from the UE; and
communicating, to the UE, service information received from the core network discovery service in response to the discovery request, the service information associated with the set of core network services, the service information comprising a respective network address or respective proxy information for accessing each of the set of core network services.

16. The method of claim 15, further comprising:
receiving, from the UE and in response to the service information indicating the set of core network services, a service request indicating a core network service of the set of core network services;
transmitting, to the UE and in response to the service request, second control information indicating a service context for communications between the UE and the core network service; and
communicating, to the core network service, a message received from the UE in accordance with the service context.

17. The method of claim 16, further comprising:
receiving, from the UE and in response to the service information, a second service request indicating a second core network service of the set of core network services, wherein the service information comprises an indication of a dependency of the core network service on the second core network service;
transmitting, to the UE and in response to the second service request, third control information indicating a second service context for communications between the UE and the second core network service; and
communicating, to the second core network service, a second message received from the UE in accordance with the second service context, wherein communicating the message is based on communicating the second message.

18. The method of claim 12, wherein communicating the discovery request comprises:
receiving, from the UE, an indication of one or more requested service capabilities, wherein the service information comprises a list of a subset of core network services of the set of core network services associated with the one or more requested service capabilities.

19. The method of claim 18, further comprising:
receiving, from the UE and in response to the service information, a service request indicating a selected core network service of the subset of core network services;
transmitting, to the UE in response to the service request, second control information indicating a service context for communications between the UE and the selected core network service; and
communicating, to the selected core network service, a message received from the UE in accordance with the service context.

20. The method of claim 15, wherein the control information indicates the set of core network services, and wherein communicating the discovery request further comprises:
receiving, from the UE, an indication of a subset of core network services of the set of core network services, wherein the service information comprises, for each of the subset of core network services, one or more of core network service dependency information, a service capability, or a network location.

21. The method of claim 15, wherein communicating the service information comprises:
transmitting, to the UE, an indication of one or more of core network service dependency information, a service capability, or a network location associated with one or more of core network services of the set of core network services.

22. The method of claim 15, wherein the routing information is associated with a proxy service that is configured to route the discovery request to the core network discovery service and to route the service information from the core network discovery service to the UE via the distributed unit, and communicating the discovery request to the core network discovery service comprises transmitting the discovery request to the proxy service, and communicating the service information comprises receiving the service information via the proxy service.

23. The method of claim 15, wherein transmitting the control information comprises:
transmitting a system information block message comprising the control information.

24. The method of claim 15, wherein each core network service of the set of core network services is associated with a respective application programming interface of a plurality of application programming interfaces.

25. A method for wireless communications at a core network discovery service, comprising:
receiving, from a user equipment (UE) via a distributed unit, a discovery request comprising routing information associated with the core network discovery service, the core network discovery service for a set of core network services offered by a service-based network configured to interface with a radio access network (RAN) associated with the distributed unit; and
transmitting, to the distributed unit for relay to the UE and in response to the discovery request, service information associated with the set of core network services, the service information comprising a respective network address or respective proxy information for accessing each of the set of core network services.

26. The method of claim 25, wherein receiving the discovery request comprises:

receiving an indication of one or more requested service capabilities, wherein the service information comprises a list of a subset of core network services of the set of core network services associated with the one or more requested service capabilities.

27. The method of claim 25, wherein receiving the discovery request comprises:
receiving an indication of a subset of core network services of the set of core network services, wherein the service information comprises, for each of the subset of core network services, one or more of core network service dependency information, a service capability, or a network location.

28. The method of claim 25, wherein transmitting the service information comprises:
transmitting an indication of one or more of core network service dependency information, a service capability, or a network location associated with one or more of core network services of the set of core network services.

29. The method of claim 25, wherein the routing information is associated with a proxy service that is configured to route the discovery request to the core network discovery service and to route the service information to the UE via the distributed unit, wherein receiving the discovery request comprises receiving the discovery request from the distributed unit via the proxy service, and wherein transmitting the service information to the distributed unit comprises transmitting the service information via the proxy service.

30. An apparatus for wireless communication at a user equipment (UE), comprising:
one or more processors; and
one or more memories coupled with the one or more processors, wherein the one or more memories comprise instructions executable by the one or more processors to cause the apparatus to:
receive, from a distributed unit, control information indicating routing information associated with a core network discovery service for a set of core network services offered by a service-based network configured to interface with a radio access network (RAN) associated with the distributed unit;
transmit, to the distributed unit and in response to the control information, a discovery request comprising the routing information; and
receive, from the distributed unit and in response to the discovery request, service information associated with the set of core network services, the service information comprising a respective network address or respective proxy information for accessing each of the set of core network services.

* * * * *